United States Patent
Suresh et al.

(10) Patent No.: US 10,895,802 B1
(45) Date of Patent: Jan. 19, 2021

(54) DEEP LEARNING AND INTELLIGENT SENSING SYSTEMS FOR PORT OPERATIONS

(71) Applicant: Buffalo Automation Group, Inc., Amherst, NY (US)

(72) Inventors: Thiru Vikram Suresh, Amherst, NY (US); Mohit Arvind Khakharia, Amherst, NY (US); Miguel Ojielong Chang Lee, Amherst, NY (US); Brian Huang, Amherst, NY (US); Trevor McDonough, Amherst, NY (US); Chris X Edwards, Amherst, NY (US)

(73) Assignee: Buffalo Automation Group, Inc., Amherst, NY (US)

( * ) Notice: Subject to any disclaimer, the term of this patent is extended or adjusted under 35 U.S.C. 154(b) by 0 days.

(21) Appl. No.: 16/991,905

(22) Filed: Aug. 12, 2020

Related U.S. Application Data

(60) Provisional application No. 62/885,936, filed on Aug. 13, 2019.

(51) Int. Cl.
*G03B 17/56* (2006.01)
*G01S 7/02* (2006.01)
(Continued)

(52) U.S. Cl.
CPC .............. *G03B 17/561* (2013.01); *G01S 7/02* (2013.01); *G01S 13/86* (2013.01); *G01S 13/865* (2013.01);
(Continued)

(58) Field of Classification Search
None
See application file for complete search history.

(56) References Cited

U.S. PATENT DOCUMENTS

| | | | | |
|---|---|---|---|---|
| 3,707,717 A | * | 12/1972 | Frielinghaus | G01S 13/874 |
| | | | | 342/23 |
| 3,721,950 A | * | 3/1973 | Jorgensen | G01S 13/785 |
| | | | | 367/2 |

(Continued)

FOREIGN PATENT DOCUMENTS

| | | | | |
|---|---|---|---|---|
| EP | 1873052 A2 | * | 1/2008 | G01S 13/937 |

OTHER PUBLICATIONS

M. Kastek et al, "Multisensor system for the protection of critical infrastructure of seaport"; Proceedings of SPIE—The International Society for Optical Engineering; May 2012; Bellingham, WA, USA; DOI: 10.1117/12.918595. (Year: 2012).*

(Continued)

*Primary Examiner* — Bernarr E Gregory
(74) *Attorney, Agent, or Firm* — Knobbe, Martens, Olson & Bear, LLP

(57) ABSTRACT

A support structure includes a mounting pole and a mounting frame supported by the mounting pole. The mounting frame includes a vertical base and a horizontal arm projecting away from the vertical base in a first direction. The support structure further includes a first and second camera mount coupled to the vertical base, and a LIDAR mount and a radar mount coupled to the horizontal arm. An omnidirectional camera is coupled to the first camera mount and extends a first distance away from the mounting frame in a first direction that is perpendicular to the vertical base of the mounting frame. A thermal camera is coupled to the second camera mount and oriented in the first direction. A LIDAR unit is coupled to the LIDAR mount, and a radar unit is coupled to the radar mount.

20 Claims, 31 Drawing Sheets

(51) Int. Cl.
*G01S 13/86* (2006.01)
*H04N 5/232* (2006.01)
*H04N 5/33* (2006.01)
*G01S 17/89* (2020.01)
*G01S 13/00* (2006.01)
*G01S 17/00* (2020.01)

(52) U.S. Cl.
CPC ............ *G01S 13/867* (2013.01); *G01S 17/89* (2013.01); *H04N 5/23238* (2013.01); *H04N 5/33* (2013.01)

(56) References Cited

U.S. PATENT DOCUMENTS

| | | | | | |
|---|---|---|---|---|---|
| 4,063,240 | A  * | 12/1977 | Isbister | ................. | G01S 13/874 342/21 |
| 5,134,409 | A  * | 7/1992  | De Groot | .............. | G01S 13/867 342/52 |
| 6,249,241 | B1 * | 6/2001  | Jordan | .................. | G01S 13/937 342/41 |
| 7,808,426 | B1 * | 10/2010 | Smith, Jr. | ............. | G01S 13/003 342/123 |
| 7,830,302 | B1 * | 11/2010 | Smith, Jr. | ............. | G01S 13/003 342/123 |
| 7,940,206 | B2 * | 5/2011  | Nohara | .................. | G01S 7/292 342/59 |
| 8,031,109 | B2 * | 10/2011 | Barrick | ................. | H01Q 21/28 342/175 |
| 10,288,468 | B2 * | 5/2019 | Littleford | ................ | G01S 13/34 |
| 2005/0122250 | A1 * | 6/2005 | Taylor | ................... | G01S 13/937 342/41 |
| 2009/0096867 | A1 * | 4/2009 | Skjelten | ................ | G01S 13/937 348/113 |
| 2010/0097262 | A1 * | 4/2010 | Hong | .................... | G01S 13/867 342/52 |
| 2014/0086454 | A1 * | 3/2014 | Bauer | ..................... | G01S 13/867 382/107 |
| 2014/0159960 | A1 * | 6/2014 | Mueller | ................... | G01S 1/68 342/385 |
| 2015/0042505 | A1 * | 2/2015 | Hope | ....................... | G01S 13/937 342/41 |
| 2015/0119081 | A1 * | 4/2015 | Ayoob | ................. | G01C 21/005 455/456.3 |
| 2015/0205760 | A1 * | 7/2015 | Hershey | .................... | G06N 5/04 702/181 |
| 2015/0241560 | A1 * | 8/2015 | Lee | ....................... | G01S 13/867 701/454 |
| 2016/0001701 | A1 * | 1/2016 | Pagliani | ............... | G01S 13/867 701/36 |
| 2020/0047861 | A1 * | 2/2020 | Suresh | .................. | G01S 13/937 |

OTHER PUBLICATIONS

M. Kastek et al, "Multisensor System for the Protection Abovewater of Seaport"; in the journal, "Hydroacoustics"; vol. 16; pp. 101-112; Polish Acoustical Society of the Polish Academy of Sciences; Gdansk, Poland. (Year: 2013).*

* cited by examiner

Picture: Example of Image Segmentation.

DEEP LEARNING AND INTELLIGENT SENSING SYSTEMS FOR PORT OPERATIONS

CROSS-REFERENCE TO RELATED APPLICATIONS

This application claims priority to U.S. Provisional Patent Application No. 62/885,936, filed Aug. 13, 2019, entitled "DEEP LEARNING AND INTELLIGENT SENSING SYSTEMS FOR PORT OPERATIONS," the disclosure of which is hereby incorporated by reference in its entirety.

FIELD

The present disclosure relates to control systems for ports or other maritime infrastructure. More particular, the disclosure relates to facilitating navigation of maritime vessels in or around ports or other maritime infrastructure by collecting and/or processing real-time data for use in port navigation.

BACKGROUND

Human error due to inability, fatigue, distraction, or attention lapses frequently leads to maritime accidents both at sea and near ports. For example, recreational boating accidents historically cause hundreds of fatalities and thousands of injuries each year in the United States. Even commercial maritime vessels with an experienced captain or crew experience the same shortcomings and difficulties.

Some maritime vessels may include autopilot options that rely on satellite-based localization systems, a digital compass, and a digital nautical chart to navigate. However, such systems generally cannot detect dynamic nautical features that are not marked on their nautical charts, such as other vessels or debris. Furthermore, such systems are reactive (for example, they respond only after the boat senses a change in tide, wind, heading, or other conditions) rather than predictive, which can limit their ability to avoid collisions.

Navigating in or around a port or other maritime infrastructure can pose its own set of difficulties. For example, a maritime vessel either in or seeking to enter a port is generally subject to the orders of a port authority in respect to its entry, departure, draught, berth, anchorage, location, speed, direction and means and method of movement, etc. Although some modern vessels tend to have bow-thrusters and azimuth-thrusters to aid maneuverability, port authorities often require vessels to use local pilots and tugboats for maneuvering in or around the port. However, even the operations of the local pilots are inefficient and error prone. For example, many local pilots use email and walkie-talkies during navigation, loading, unloading, and scheduling.

Some vessels include a "Pilot Plug" that provides the means to enable an individual, such as the local pilot, to connect (e.g., via the local pilot's laptop) to the vessel and access an Automatic Identification System (AIS) that displays other vessels using AIS in the vicinity. However, not all vessels are fitted with AIS, and AIS may not provide location or other information about those vessels on which AIS is not fitted or not switched on. Thus, AIS and other similar systems may not be practical for collision avoidance.

SUMMARY

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

A support structure can be configured to be placed at or proximate to a port. The support structure can include a mounting frame and a plurality of sensing devices supported by the mounting frame. The plurality of sensor devices can include a camera, a LIDAR unit, a radar unit.

The support structure of the preceding paragraph may also include any combination of the following features described in this paragraph, among others described herein. The support structure can include one or more mounting poles supporting the mounting frame. The mounting frame can include a vertical base and a horizontal arm projecting away from the vertical base in a first direction. The first direction is perpendicular to a longitudinal axis of the vertical base. The horizontal arm can be a first horizontal arm projecting away from an upper portion of the vertical base in the first direction. The mounting frame further can include a second horizontal arm projecting away from a lower portion of the vertical base in the first direction.

The support structure of any of the preceding paragraphs may also include any combination of the following features described in this paragraph, among others described herein. The support structure can include a camera mount coupled to the vertical base of the mounting frame and configured to support the camera. The camera can be an omnidirectional camera. The camera can be coupled to the camera mount and extends a first distance away from the mounting frame in a first direction that can be perpendicular to the vertical base of the mounting frame. The camera can be a thermal camera. The camera can be oriented in the first direction. The camera can be a pan tilt zoom (PTZ) camera. The camera can be an omnidirectional, and wherein the plurality of sensors further can include a thermal camera. The thermal camera can be proximate the LIDAR unit relative to the omnidirectional camera. The thermal camera can be proximate the radar unit relative to the omnidirectional camera. The omnidirectional camera can be proximate the LIDAR unit relative to the thermal camera. The omnidirectional camera can be proximate the radar unit relative to the thermal camera.

The support structure of any of the preceding paragraphs may also include any combination of the following features described in this paragraph, among others described herein. The support structure can include a LIDAR mount coupled to the horizontal arm of the mounting frame. The LIDAR unit can be coupled to the LIDAR mount. The LIDAR unit can be a first LIDAR unit and the LIDAR unit can be a first LIDAR mount. The support structure can further include a second LIDAR mount coupled to the vertical base of the mounting frame; and a second LIDAR unit coupled to the LIDAR mount and extending a second distance away from the mounting frame in the first direction. The support structure can include a LIDAR mount coupled to the vertical base of the mounting frame and configured to support the LIDAR unit. The LIDAR unit can be coupled to the LIDAR mount and extends a second distance away from the mounting frame in the first direction. At least one of the LIDAR unit, the first LIDAR unit, or the second LIDAR unit can be a scanning and/or panoramic LIDAR. The LIDAR unit can be implemented as a spherically scanning rotated LIDAR, which is rotated simultaneously along two-axis.

The support structure of any of the preceding paragraphs may also include any combination of the following features described in this paragraph, among others described herein. The support structure can include a radar mount coupled to the horizontal arm of the mounting frame and extending away from the mounting frame in a second direction. The second direction can be perpendicular to the first direction. The second direction can be parallel to a longitudinal axis of the vertical base of the mounting frame. The second direction can be parallel to the first direction.

The support structure of any of the preceding paragraphs may also include any combination of the following features described in this paragraph, among others described herein. The plurality of sensing devices can include a compass. The compass can be implemented using one or more satellites, gyroscopes or magnetic sensors. The support structure can include a compass mount configured to support the compass. The plurality of sensing devices can include a weather station. The support structure can include a weather station mount configured to support the weather station. The weather station can be an ultrasound weather station.

The support structure of any of the preceding paragraphs may also include any combination of the following features described in this paragraph, among others described herein. The support structure can include a radio communications unit configured for line-of-sight communications. The radio communications unit can be a fluidmesh radio unit. The radio communications unit may be not enabled for non-line of sight communications. The support structure can include a control unit coupled to the mounting frame. The radio communications unit can be part of or supported by the control unit. The control unit can be in communications with the plurality of sensing devices. The the radar unit can include a Frequency-Modulated Continuous Wave radar sensor. The one or more mounting poles can be configured to secure to ground. The one or more mounting poles can be configured to secure to a high-elevation structure.

The support structure of any of the preceding paragraphs may also include any combination of the following features described in this paragraph, among others described herein. The LIDAR unit can be proximate the mounting frame relative to the radar unit. The radar unit can be proximate the mounting frame relative to the LIDAR unit. The radar mount can be the LIDAR mount. The vertical base can be coupled to the horizontal arm at a 90 degree angle. The compass mount extends away from the radar mount in a third direction. The third direction can be opposite the first direction.

A system for providing maritime navigation assistance can include a plurality of support structures spatially distributed in fixed locations at or proximate to a maritime port. Each of the plurality of support structures can include a plurality of sensors and a control unit. The plurality of sensors can be configured to collect port information corresponding to at least one of one or more nautical features of the port, one or more maritime vessels in or around the port, or one or more maritime objects in or around the port. The control unit can be in communication with the plurality of sensors and can be configured to obtain the port information.

The system of the preceding paragraph may also include any combination of the following features described in this paragraph, among others described herein. The plurality of support structures can include a support structure of the preceding paragraphs. The plurality of sensors can include at least a LIDAR unit, a radar unit, a compass unit, a thermal camera, and an omnidirectional camera. The plurality of support structures can be spatially distributed such that a particular support structure of the plurality of support structures can be within a line-of-sight of at least one other support structure of the plurality of support structures. The plurality of support structures can be spatially distributed such that each support structure of the plurality of support structures can be within a line-of-sight of at least one other support structure of the plurality of support structures. The plurality of support structures can be spatially distributed such that a particular support structure of the plurality of support structures can be within a line-of-sight of at least two other support structures of the plurality of support structures. The plurality of support structures can be spatially distributed such that each support structure of the plurality of support structures can be within a line-of-sight of at least two other support structures of the plurality of support structures.

The system of any of the preceding paragraphs may also include any combination of the following features described in this paragraph, among others described herein. At least one of the plurality of support structures can be positioned onshore. Each of the plurality of support structures can be positioned onshore. At least one of the plurality of support structures can be positioned offshore. The control unit of each of the plurality of support structures can be configured to generate a graphical display of at least a portion of the port based at least in part on the port information. The control unit of each of the plurality of support structures can be further configured to exchange port data with at least one other support structure of the plurality of support structures; and update the graphical display of at least a portion of the port based at least in part on the port data received from the at least one other support structure. A user computing device can communicate with a particular support structure of the plurality of support structures to remotely access the graphical display of the particular support structure.

The system of any of the preceding paragraphs may also include any combination of the following features described in this paragraph, among others described herein. The system can include a remote server in communication with the plurality of support structures. The remote server can be configured to generate a master graphical display based at least in part on communications with the plurality of support structures. The one or more maritime objects can include at least one of an iceberg, debris, a bridge, a shoreline, an on-shore vehicle, a person, or animal. The one or more maritime objects can include at least one of a range, angle, velocity, or distance of corresponding to the one or more maritime vessels. The port information can include data relating to at least one of weather formations, safety alerts, safety bulletins, sea conditions, wind speed, wind direction, sunlight, UV Index, or accumulation, rain duration, or rain intensity. The one or more nautical features of the port include at least one of a shoreline, a landmark, a shoal, a wreck, an obstruction, a boundary of a regulated area, a fixed aid for navigation, or a floating aid for navigation.

A system for generating a three dimensional map of objects configured to be used for navigating one or more ships in the port can include a first sensor assembly fixed in location and in proximity to water of the port; a second sensor assembly fixed in location at a first distance away from the first sensor assembly; and a first hardware processor in electronic communication with the first sensor assembly. The first hardware processor configured to maintain a first local copy of a first three dimensional map of objects in the port. The system can further include a second hardware processor in electronic communication with the second sensor assembly. The second first hardware processor can be configured to maintain a second local copy of a second three dimensional map of the objects in the port. The system can include a first radio associated with the first sensor assembly. The first radio can have a first range. The system can include a second radio associated with the second sensor assembly. The second radio can have a second range. The first distance can be less than a smaller of the first range and the second range. The second hardware processor can be configured to update the second local copy based at least in part on the first local copy.

The system of any of the preceding paragraphs may also include any combination of the following features described in this paragraph, among others described herein. The first distance can be at least one of about 5%, 10%, 15%, 20%, 25%, 30%, 35%, 40%, 45%, 50%, 55%, 60%, 65%, 70%, 75%, 80%, 85%, 90%, 95%, or 100% of at least one of the first range of the second range. The system can include a first support structure and a second support structure. The first support structure can include the first sensor assembly, the first hardware processor, and the first radio. The second support structure can include the second sensor assembly, the second hardware processor, and the second radio. The second hardware processor can be configured to receive the first local copy as part of a transmission from the first radio to the second radio. The second hardware processor can be configured to receive the first local copy from a wired connection associated with the first hardware processor. The first hardware processor can be configured to generate the first three dimensional map of objects in the port. The second hardware processor can be configured to generate the second three dimensional map of objects in the port. The first hardware processor can be configured to generate the first three dimensional map of objects in the port based at least in part on data collected by one or more sensors of the first sensor assembly. The second hardware processor can be configured to generate the second three dimensional map of objects in the port based at least in part on data collected by one or more sensors of the second sensor assembly. The first hardware processor can be configured to maintain the second three dimensional map of objects in the port based at least in part on data collected by one or more sensors of the first sensor assembly or the second local copy. At least one of the first radio of the second radio can be configured for line-of-sight communications and can be not enabled for non-line of sight communications. At least one of the first support structure or the second support structure can be the support structure of any of the preceding paragraphs.

A method for generating a three dimensional map of objects in a port. The three dimensional map can be used for navigating one or more ships in the port. The method can include maintaining, using a first hardware processor in electronic communication with a first sensor assembly, a first three dimensional map of objects in the port. The first sensor assembly can be fixed in location and can be in proximity to water of the port. The method can include receiving a copy of a second three dimensional map of the objects in the port. The second three dimensional map of the objects in the port can be maintained using a second hardware processor in electronic communication with a second sensor assembly. The second sensor assembly can be fixed in location at a first distance away from the first sensor assembly. The method can include updating the first three dimensional map based at least in part on the copy of the second three dimensional map.

The method of any of the preceding paragraphs may also include any combination of the following steps or features described in this paragraph, among others described herein. The method can include communicating a copy of the first three dimensional map to the second hardware processor. The method can include communicating a copy of the first three dimensional map to the second hardware processor via a wired connection associated with the first sensor assembly. The method can include communicating a copy of the first three dimensional map to the second hardware processor via a first radio associated with the first sensor assembly, the first radio having a first range. The copy of the first three dimensional map can be received by a second radio associated with the second sensor assembly, the second radio having a second range. The first distance can be less than a smaller of the first range and the second range. The first distance can be at least one of about 5%, 10%, 15%, 20%, 25%, 30%, 35%, 40%, 45%, 50%, 55%, 60%, 65%, 70%, 75%, 80%, 85%, 90%, 95%, or 100% of at least one of the first range of the second range.

The method of any of the preceding paragraphs may also include any combination of the following steps or features described in this paragraph, among others described herein. At least one of the first radio of the second radio can be configured for line-of-sight communications. At least one of the first radio of the second radio can be a fluidmesh radio unit. At least one of the first radio of the second radio can be not enabled for non-line of sight communications. A first support structure can include the first sensor assembly, the first hardware processor, and the first radio. A second support structure can include the second sensor assembly, the second hardware processor, and the second radio. The method can include generating the first three dimensional map of objects in the port. The method can include generating the first three dimensional map of objects in the port based at least in part on data collected by one or more sensors of the first sensor assembly. The method can include generating the first three dimensional map of objects in the port based at least in part on data collected by one or more sensors of the first sensor assembly and the second local copy. At least one of the first support structure or the second support structure can include one or more features of the support structure of any of the previous paragraphs.

A support structure configured to be placed at or proximate to a port. The support structure can include one or more mounting poles; a mounting frame supported by the one or more mounting poles; a first camera mount coupled to the vertical base of the mounting frame; an omnidirectional camera coupled to the first camera mount and extending a first distance away from the mounting frame in a first direction that can be perpendicular to the vertical base of the mounting frame; a second camera mount coupled to the vertical base of the mounting frame; a thermal camera coupled to the second camera mount and oriented in the first direction; a LIDAR mount coupled to the horizontal arm of the mounting frame; a LIDAR unit coupled to the LIDAR mount; a radar mount coupled to the horizontal arm of the mounting frame and extending away from the mounting frame in a second direction that can be perpendicular to the first direction and parallel to the vertical base of the mounting frame; and a radar unit coupled to the radar mount. The mounting frame can include a vertical base and a horizontal arm projecting away from the vertical base in the first direction.

The support structure of the preceding paragraph may also include any combination of the aspects or features of the support structure of any of the preceding paragraphs.

A system for generating a three dimensional map of objects in a port. The three dimensional map configured to be used for navigating one or more ships in the port. The system can include a first LIDAR unit having a first range, a second LIDAR unit having a second range, and a hardware processor configured to generate a three dimensional map based on first data received from the first LIDAR unit and second data received from second LIDAR unit. The first range can be substantially larger than the first range.

The system of any of the preceding paragraphs may also include any combination of the following features described in this paragraph, among others described herein. The system further can include a mounting frame. The first LIDAR unit can be coupled to an upper portion of the mounting frame and the second LIDAR unit can be coupled to a lower portion of the mounting frame. The first LIDAR can be positioned vertically above the second LIDAR. The first LIDAR can be positioned vertically above the second LIDAR. The second LIDAR can be coupled to the mounting frame via a LIDAR mount that extends away from the mounting frame in a first direction such that the second LIDAR can be located a first distance away from the mounting frame. The second LIDAR can be configured to rotate around a first axis. The system can include an apparatus configured to rotate the second LIDAR around a second axis that can be perpendicular to the first axis. The second LIDAR can be concurrently rotated along two axes. The two axes can be orthogonal. The two axes can be perpendicular. The second LIDAR can be a spherically scanning rotated LIDAR. The first LIDAR can be a scanning LIDAR. At least one of the first LIDAR or the second LIDAR can be a panoramic LIDAR. The second range can be about 120 meters. The first range can be about 1000 meters. The first range can be at least 2, 3, 4, 5, or 10 times larger than the second range. The second range can correspond to a conical or spherical boundary of an area. A scanned area of the first LIDAR can at least partially overlap with a scanned area of the second LIDAR.

BRIEF DESCRIPTION OF THE DRAWINGS

Various embodiments will be described hereinafter with reference to the accompanying drawings. These embodiments are illustrated and described by example only, and are not intended to limit the scope of the disclosure. In the drawings, similar elements have similar reference numerals.

DETAILED DESCRIPTION

Figure 1:
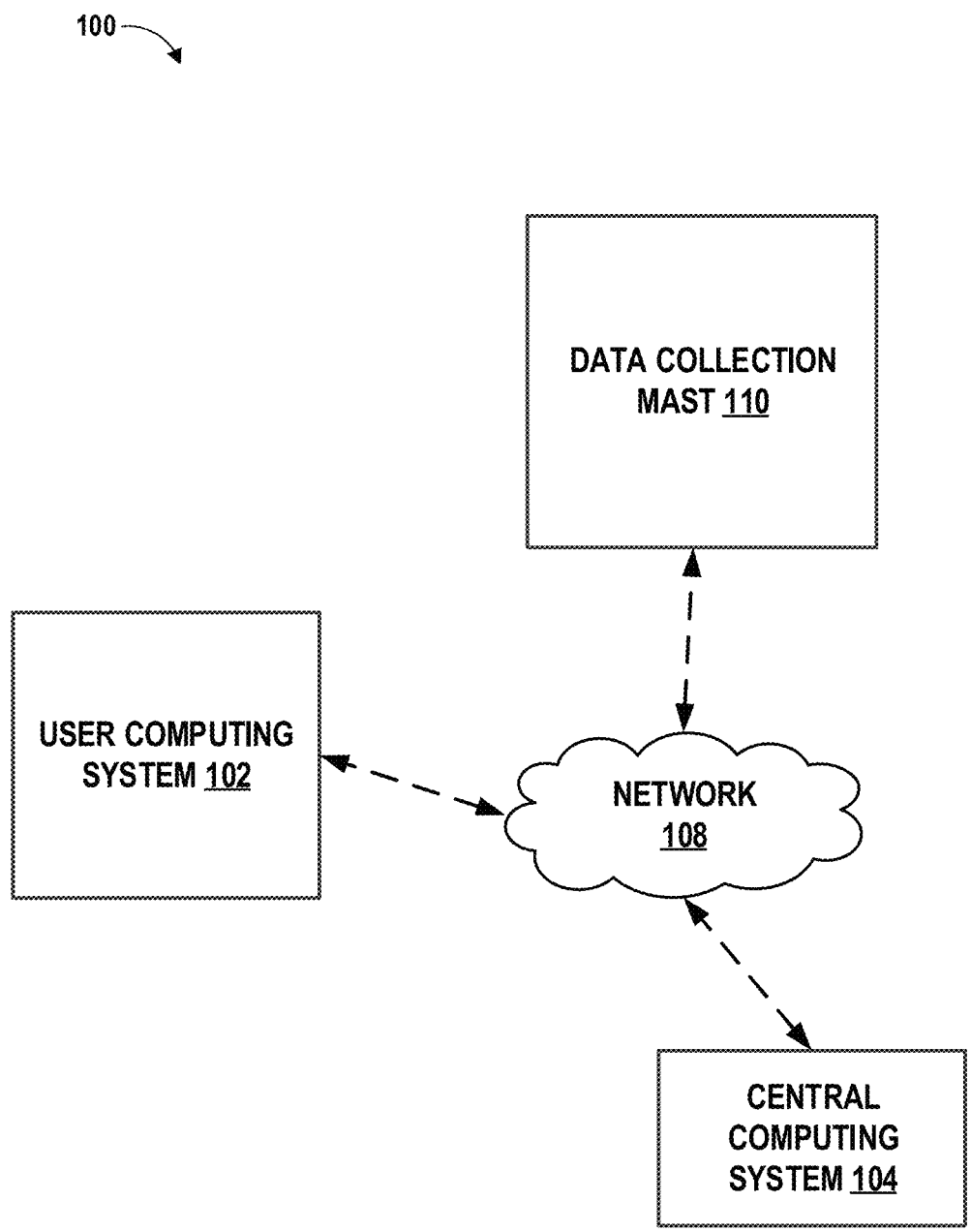
FIG. 1 illustrates a block diagram of a system for providing maritime navigation assistance.

Although certain embodiments and examples are described below, those of skill in the art will appreciate that the disclosure extends beyond the specifically disclosed embodiments or uses and obvious modifications and equivalents thereof. Thus, it is intended that the scope of the disclosure herein disclosed should not be limited by any particular embodiments described below.

In the present disclosure, reference is made to vessel. As used herein, the terms "vessel" is used broadly to define any vessel, boat or craft designed, used or capable of being used solely or partly for marine travel or navigation, whether self-propelled or not and without regard to the method of propulsion. By way of non-limiting example, a vessel can be a personal non-powered vessel, a recreational powered vessel, a sailing yacht, a cargo ship, a cruise ship, a coast guard boat, a naval vessel, a barge, a tugboat, a fishing vessel, a workboat, an under-powered vessel, an anchored vessel, a submarine, or a raft. Furthermore, the term "vessel" and "maritime vessel" are used interchangeably.

As used herein, the term "maritime object" or similar term, is used broadly to refer to any object, barrier, or natural phenomena that may provide a physical hazard or potential hazard to any vessel or the navigation of any vessel or potentially damage docks and other port infrastructure. By way of non-limiting example, a maritime object can include an onshore item, and offshore item, a vessel, an iceberg, debris, a bridge, a shoreline, a vehicle (e.g., truck, forklift, car, train, crane, airplane, etc.), a dynamic nautical feature, a static nautical feature, a person, or animal.

INTRODUCTION

The present disclosure provides a port navigation assistance system for collecting and processing real-time data for use in port navigation and a method of operating the same. The port navigation assistance system leverages data obtained from onshore and offshore support structures to provide port navigation assistance, for example by identifying and classifying objects (for example, boats, ships, icebergs, plain sea, vehicles, people, hazards and other possible objects), predicting or scheduling movements, providing a visual indication of the surroundings, etc.

The port navigation assistance system can employ various support structures on poles or other high-elevation structures in and around ports, offshore drilling facilities, offshore wind farms, flotillas and inland waterways. The location of the support structures can conform to a mast distribution policy to ensure fluid wired or wireless communications between the support structures as well as full coverage of the area. By collecting and processing data from the support structures, various navigation tools can be developed to aid navigation of a port. For example, a graphical display (for example, a real-time 3D map) can be generated and overlaid with guidance data to provide a visual indication of the surroundings, as well as guidance information. By providing the graphical display to ships, barges, tugs, workboats, or other maritime vessels, the system can remove line-of-sight restrictions and provide substantially comprehensive real-time situational awareness. In some cases, the graphical display can aid in dredging, raising, lowering, or navigating through bridges, etc.

Environment Overview

FIG. 1 illustrates a block diagram of a system 100 for providing maritime navigation assistance. The system 100 includes a number of user computing systems 102, a number of support structures 110, a central computing system 104, and a network 108. To simplify discussion and not to limit the present disclosure, FIG. 1 illustrates only one user computing system 102, one support structure 110, and one central computing system 104, though multiple devices or systems may be used. Furthermore, it will be understood that the system 100 can include fewer or different systems or components, as desired.

Any of the foregoing devices or systems of the system 100 may communicate via a network 108. Although only one network 108 is illustrated, multiple distinct and/or distributed networks 108 may exist. The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet. Furthermore, various networking topologies may be employed, such as a point-to-point network, a daisy chained network, a bus network, a mesh network or a hybrid network. Any of the devices or systems of the system 100 can communicate wirelessly, for example, using Bluetooth, infrared, Wi-Fi, cellular, radio frequency (RF), ultra-wideband, or other wireless technology. In addition or alternatively, wired technologies, including fiber-optic, may be used for communications.

The support structure 110 can facilitate maritime navigation, such as navigation in or around a maritime port. For example, the support structure 110 can, among other things, collect or process port information, generate a graphical representation (e.g., a map) of a port based on the port information, communicate port data with or receive port data from other support structures 110 or a central computing system 104, update its graphical representation of the port based on received port data, generate guidance data for port navigation assistance, provide a user computing system 102 access to its graphical representation of the port and/or guidance data, etc.

The number of support structures 110 used or implemented by the system 100 may vary across embodiments. For example, the system 100 may include between one and five support structures 110, between five and 10 support structures 110, or more than 10 support structures 110. In some cases, the number of support structures 110 used in the system 100 is based on a mast distribution policy, which is further described herein. For simplicity, the support structure 110 may be described in the singular or the plurality. However, it should be understood that any description of the support structure 110 or the support structures 110 may apply to one or more of the support structures 110 and may or may not apply to each of the support structures 110.

The central computing system 104 can facilitate maritime navigation. For example, the central computing system 104 can obtain port data from or communicate port data to one or more of the support structures 110 or the user computing systems 102, generate a graphical representation (e.g., a map) of a port based on the port information, update its graphical representation of the port based on received port data, generate guidance data for port navigation assistance, provide a user computing system 102 access to its graphical representation of the port and/or guidance data, etc. In some cases, the graphical representation generated by the central computing system 104 can include real-time or near real-time data.

The user computing system 102 can be controlled by a user and may include any type of computing system. For example, the user computing system 102 may include a desktop, laptop, a Pilot Plug Display, a wearable device (for example, smart watch, glass with computing functionality, etc.), or a wireless mobile device (for example, smart phones, PDAs, tablets, or the like), to name a few. The user computing system 102 can communicate with the support structure 110 or the central computing system 104 to retrieve or access port data or updates thereto. Port data can include, but is not limited to, a graphical representation of the port (e.g., real-time or near real-time 2D or 3D map) and/or guidance data (e.g., routes, markers, indicators overlaid on the map) that can be displayed on a web-browser or on a custom GUI application. A user of the user computing system 102 may use or interact with the port data to view data regarding the port and/or navigate a vessel throughout the port. In some cases, the user computing system 102 can communicate port information (e.g., depth, position, or) heading, such as when a Pilot Plug is attached.

Support Structure

The support structure can include various sensing devices for collecting port information. Port information can include information corresponding to one or more nautical features of the port. For example, the port information can include information corresponding to a shoreline, a nautical chart, a landmark, a shoal, a wreck, an obstruction, a boundary of a regulated area, a fixed aid for navigation, or a floating aid for navigation. As another example, the port information can include information corresponding to a weather formation, safety alert, safety bulletin, sea condition, wind speed, wind force, wind direction, sunlight, UV Index, rain accumulation, rain duration, rain intensity, or the like.

Port information can include information corresponding to one or more maritime vessels and non-water bodies in or around the port. For example, the port information can include one or more of a position, location, orientation, draft, velocity, height, depth, size, trajectory, etc. of a vessel. As another example, the port information can include an angle, range, or distance of a vessel relative to another vessel or a maritime object, along with vessel draft and the route's minimum water depth.

Port information can include information corresponding to one or more maritime objects in or around the port. For example, the port information can include one or more of a position, location, orientation, velocity, height, depth, draft, size, trajectory, etc. of a maritime object. As another example, the port information can include an angle, range, or distance of a maritime object relative to another maritime object or a vessel.

Port information can include guidance data. For example, port information can include instructions for the operation of a vessel. As another example, port information can include radar, compass heading, GNSS, other camera feeds, sonar, vessel specifications, safety alerts or bulletins, information from neighboring vessels, sea conditions (e.g., tide, swells, etc.), anemometer, SONAR, microphone, thermal camera, and/or weather reports (e.g., wind speed, weather bulletins or alerts, or long-term weather forecasts).

Figure 2:
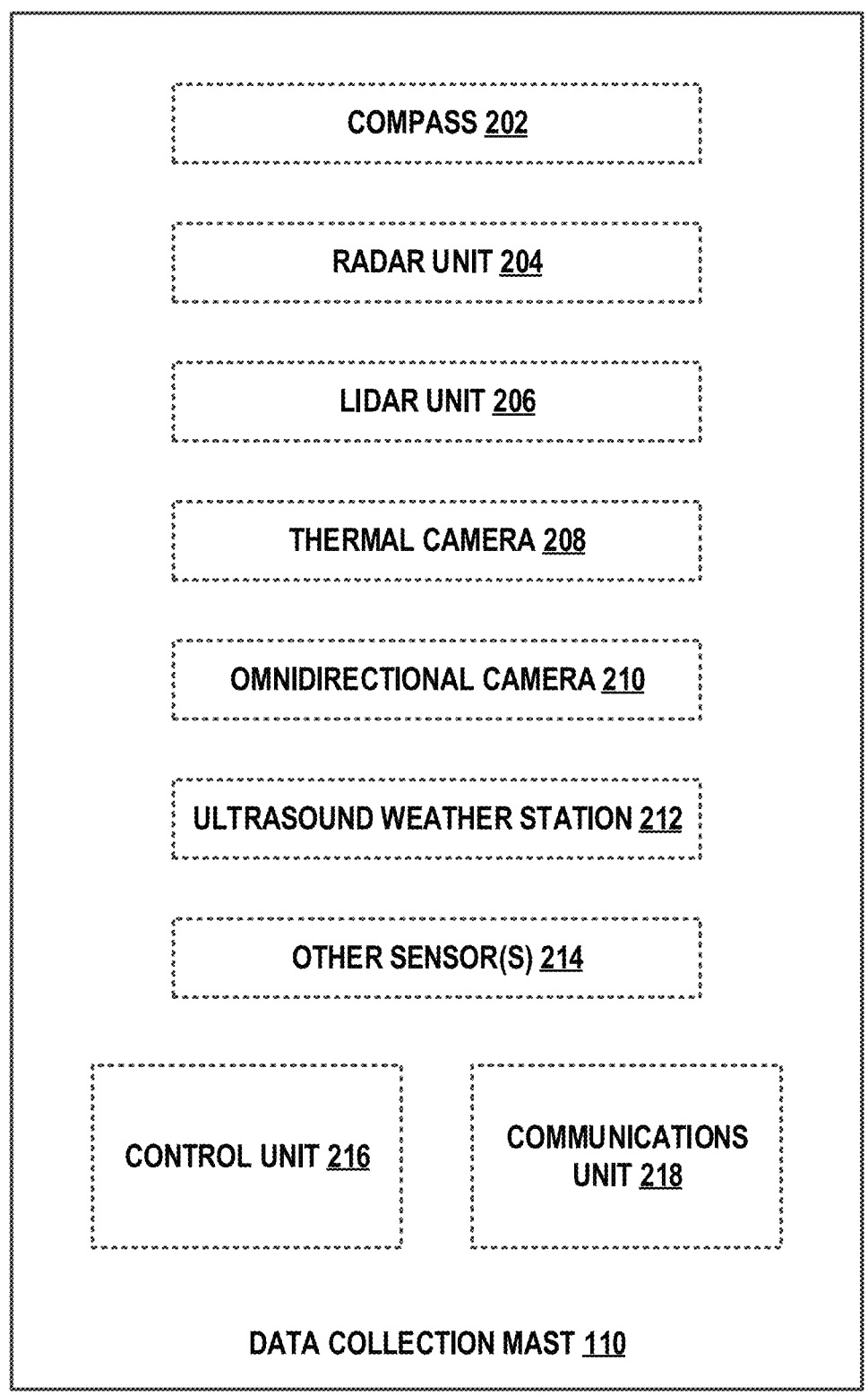
FIG. 2 illustrates a block diagram of an example support structure.
Figure 3A:
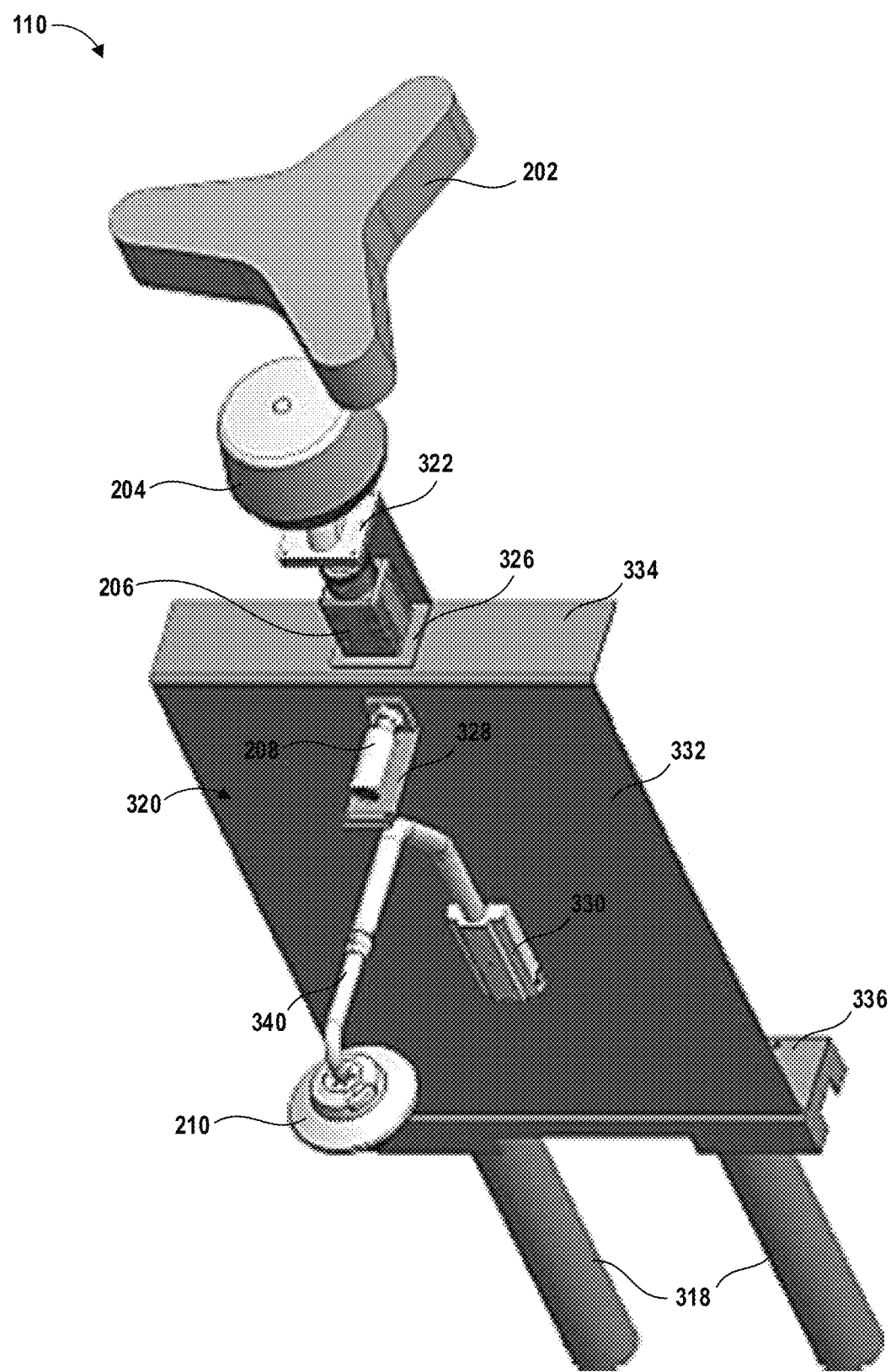
FIGS. 3A-3G illustrate perspective, first side, second side, front, back, top, and bottom views, respectively, of an example support structure.
Figure 3B:
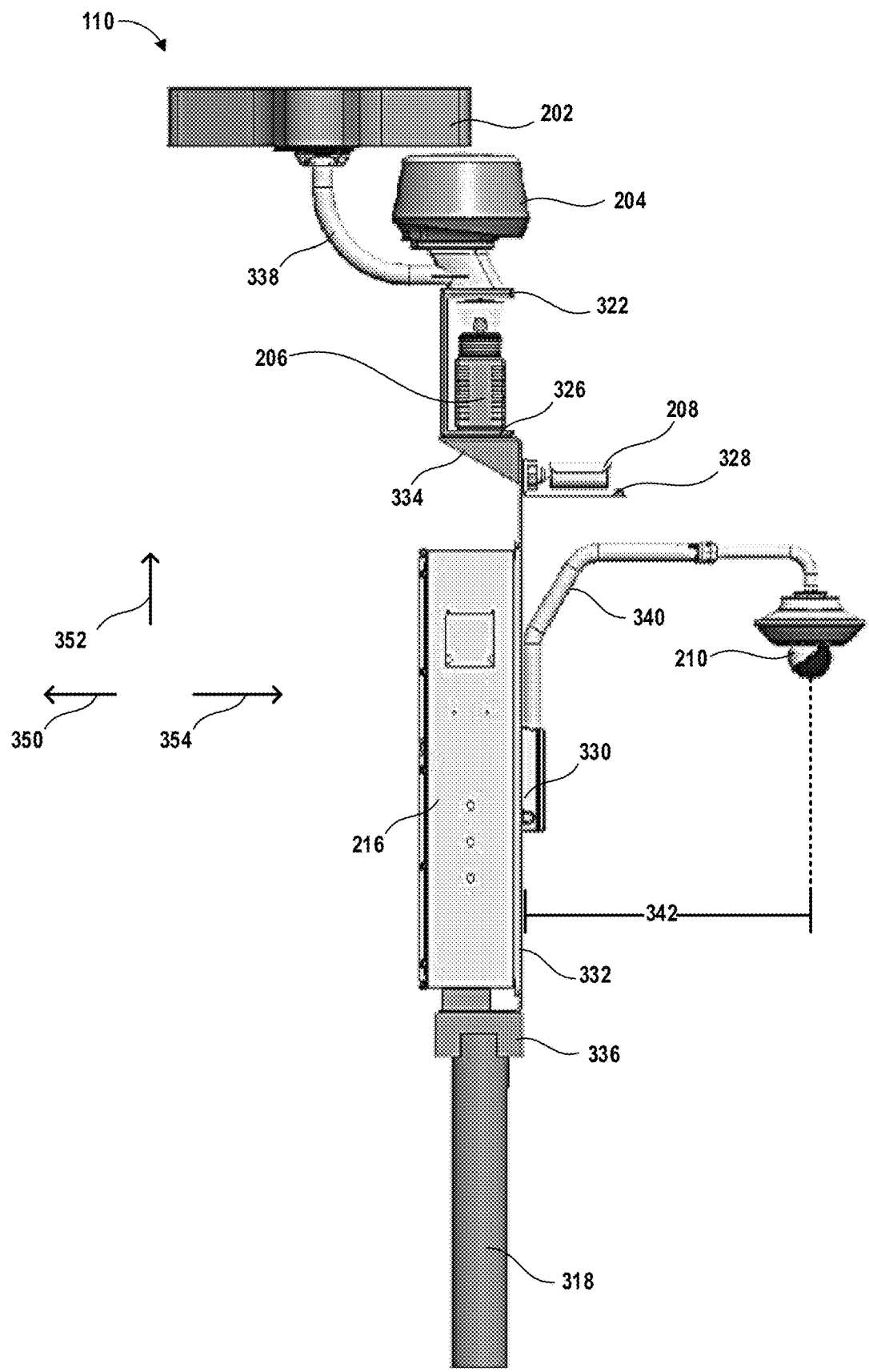
Figure 3C:
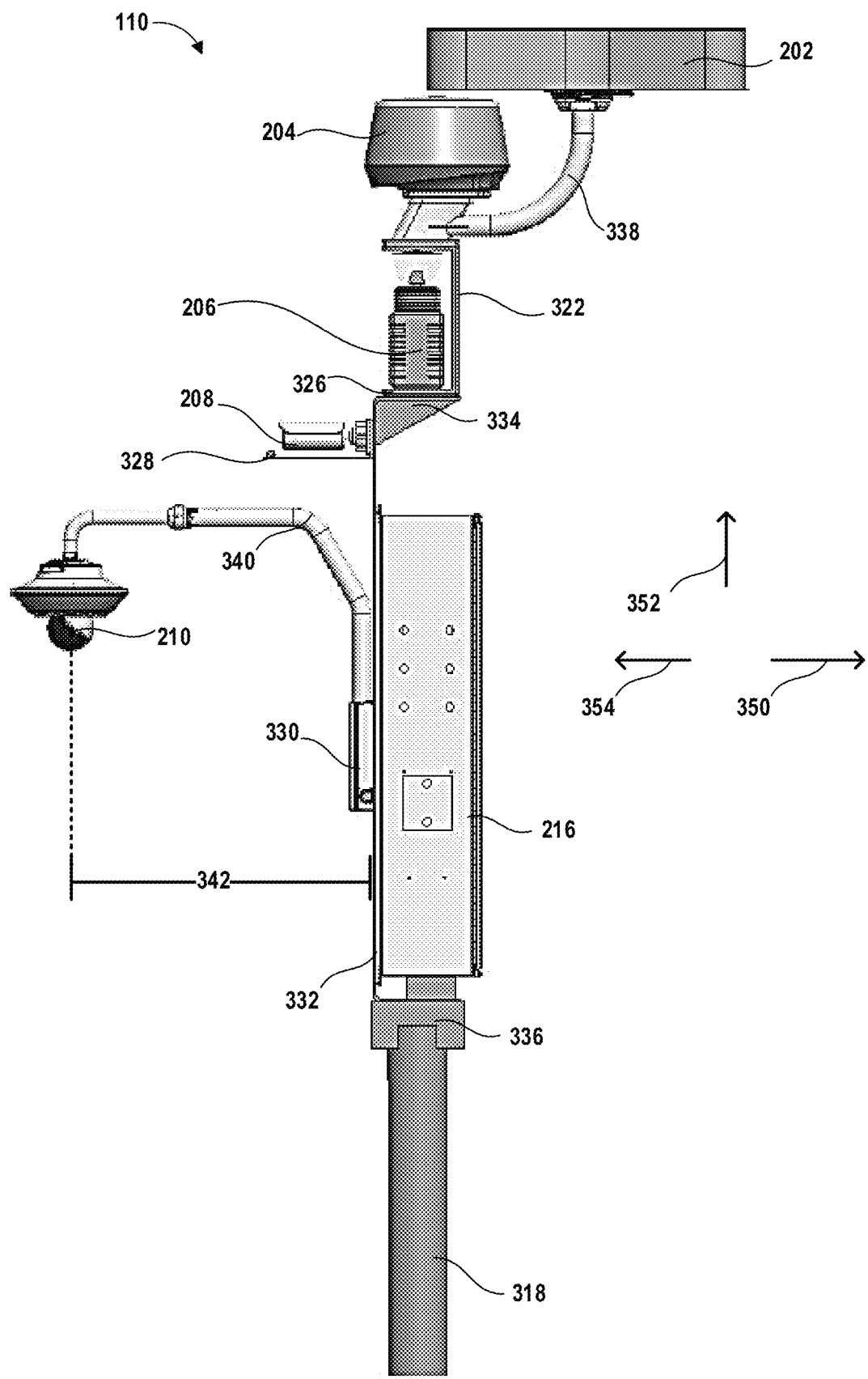
Figure 3D:
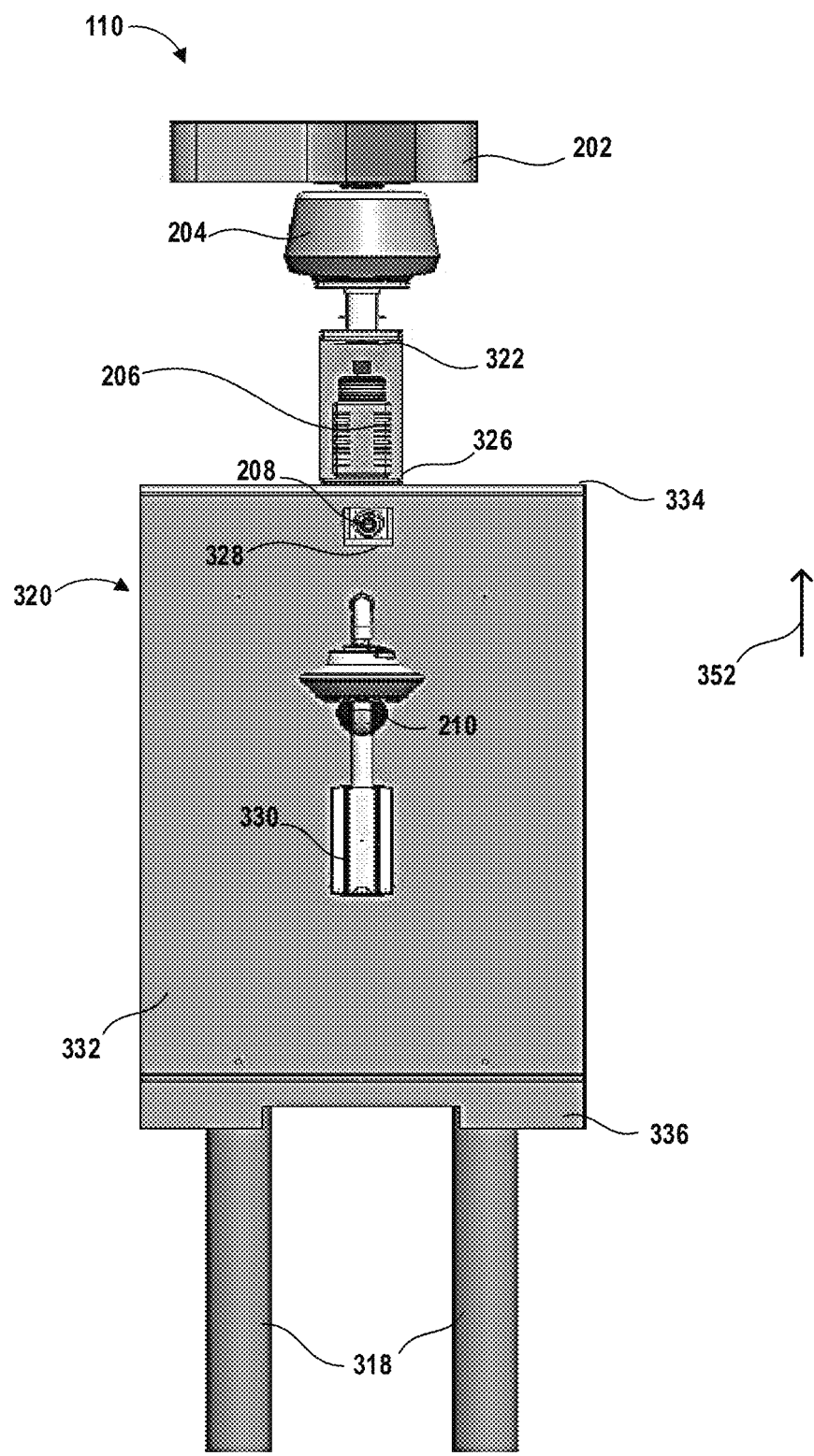
Figure 3E:
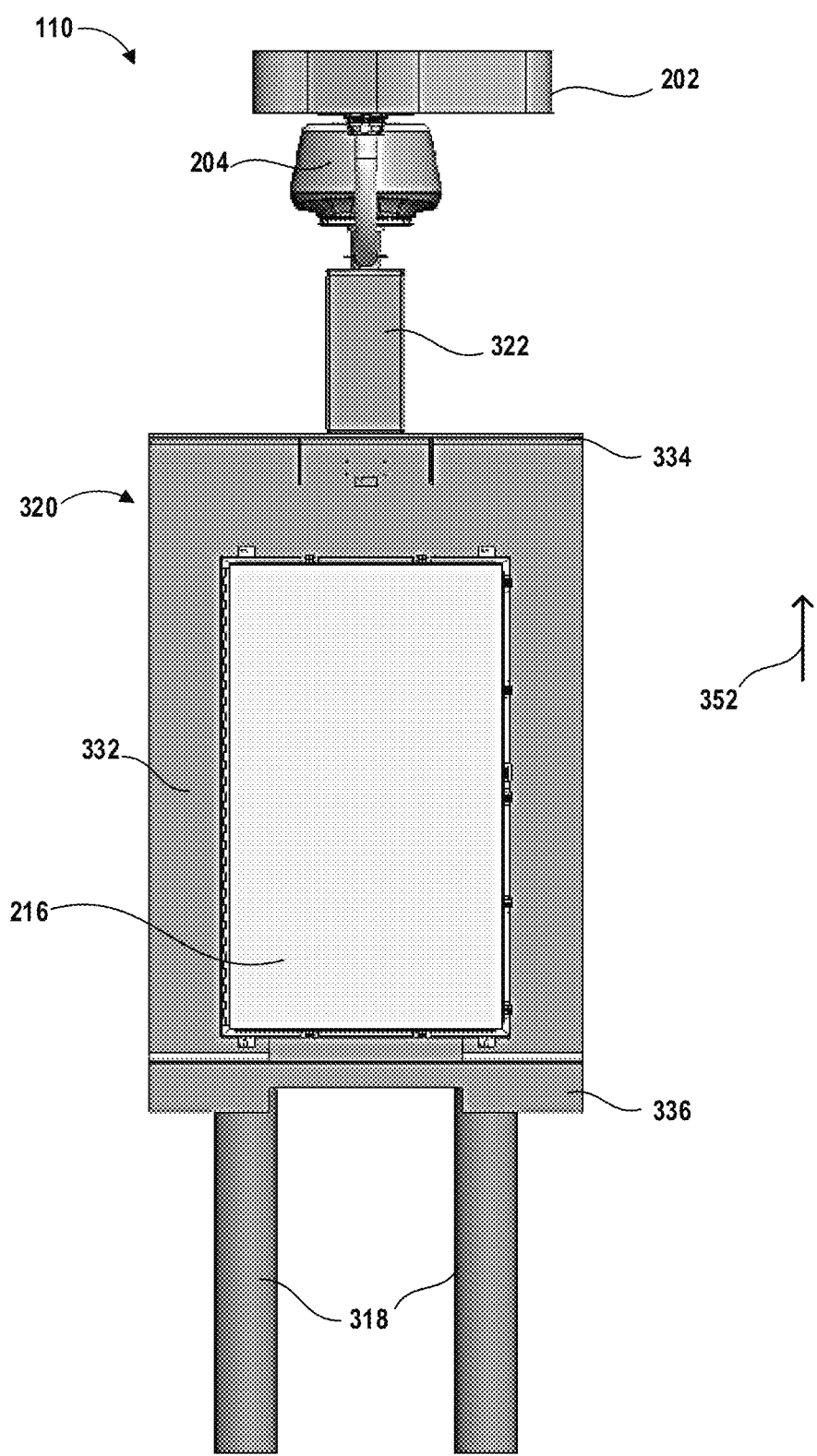
Figure 3F:
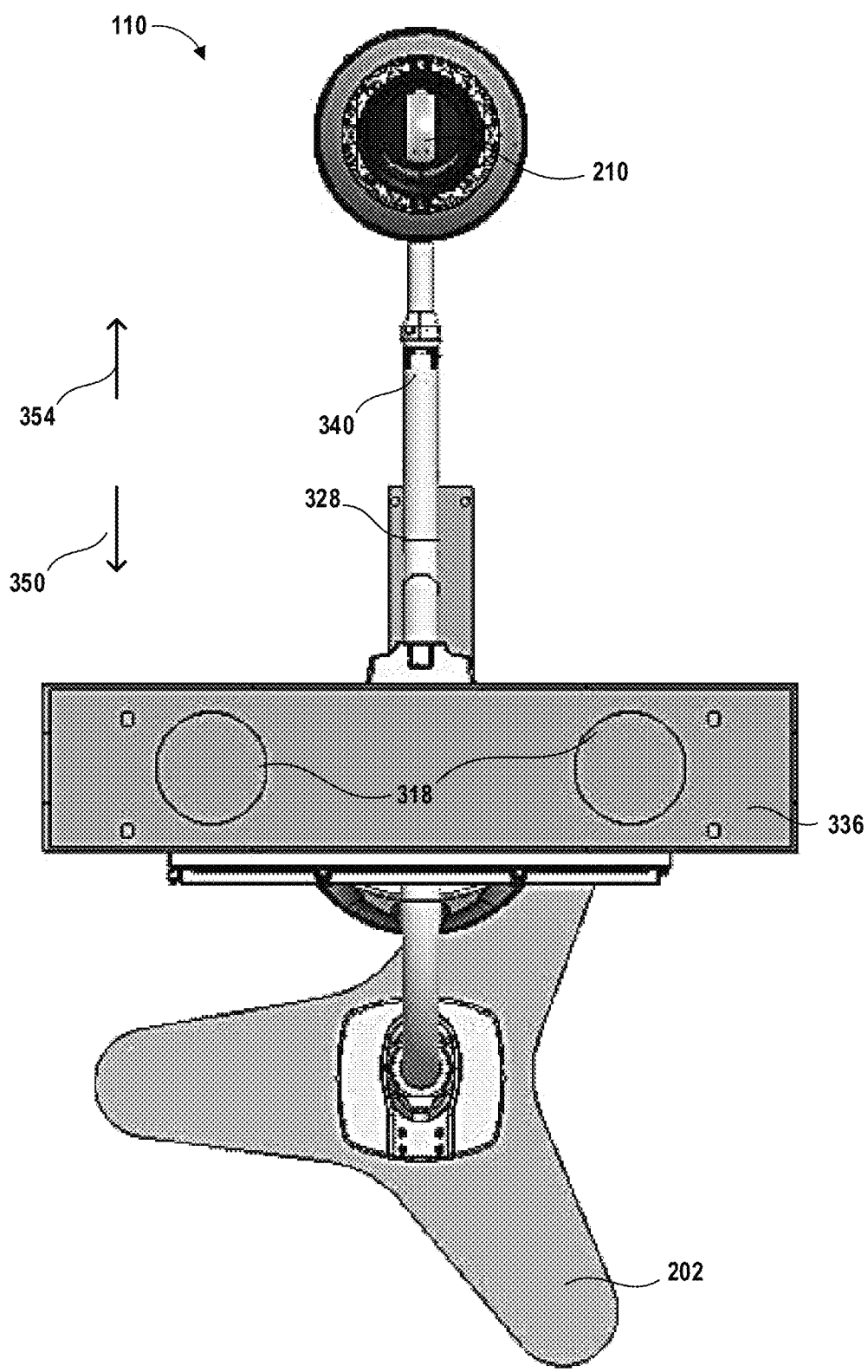
Figure 3G:
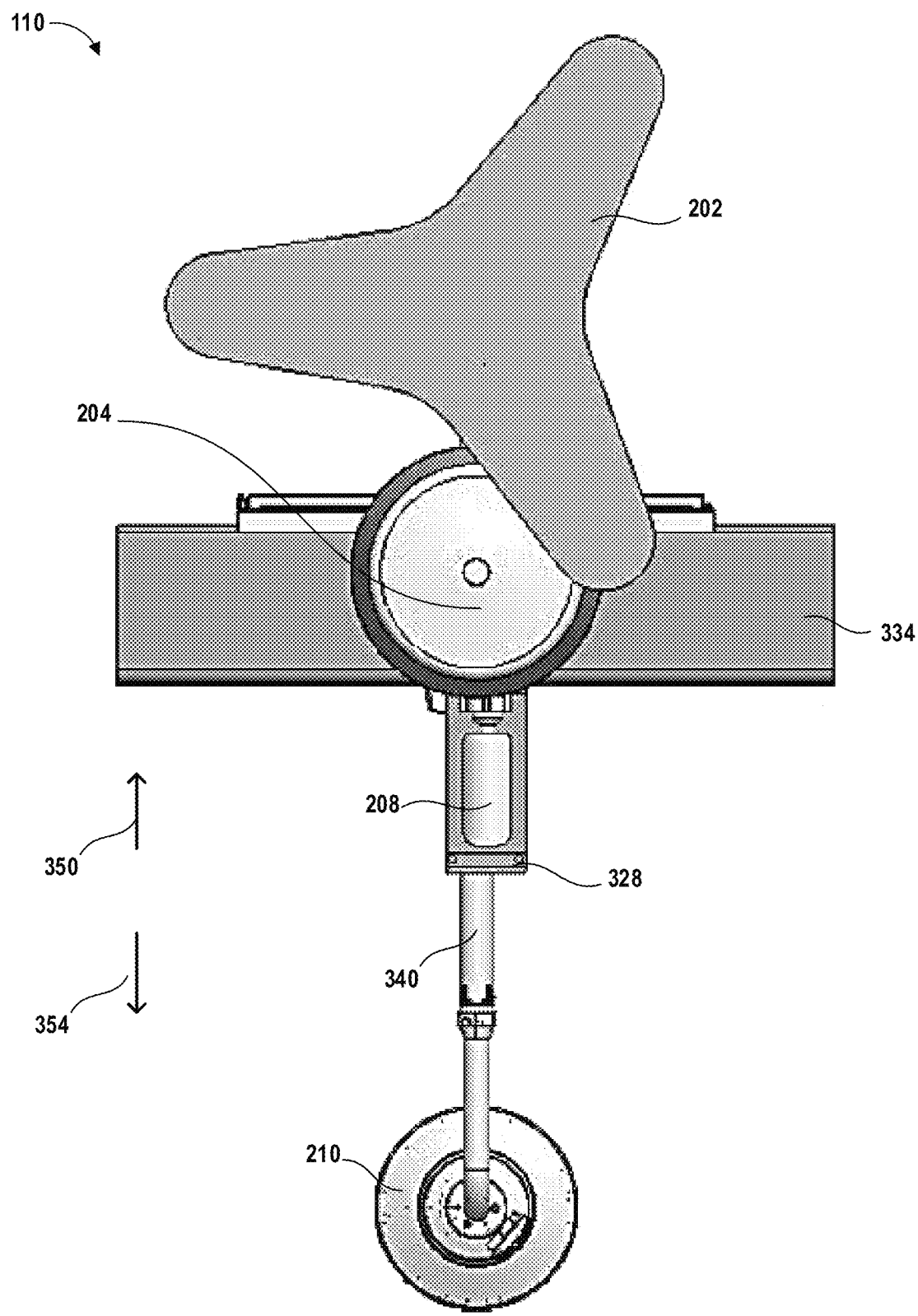

FIG. 2 illustrates a block diagram of an example support structure 110. As illustrated, the support structure 110 can include a control unit 216, a communications unit 218, and one or more sensing devices, which can include any combination of a compass 202, a radar unit 204, a panoramic LIDAR unit 206, a rotating LiDAR unit, a bolometer thermal camera 208, an omnidirectional camera 210, an infrared pan-tilt-zoom camera, a weather station 212, or one or more other sensors 214. It will be understood that port information can include any data obtained from the one or more sensors of the support structure 110. Furthermore, it will be understood that the support structure 110 can include fewer, more, or different components. For example, in some cases, the support structure 110 can include a backup power unit, a power management unit, data storage unit, a microphone, a speaker, a thermostat, a heater, a cooling apparatus, an insect repellent, an AIS receiver, etc.

The compass 202 can provide compass data, using satellites, gyroscopes, magnetic sensors, etc. For example, the compass 202 can show direction relative to the geographic cardinal directions. The compass 202 can be implemented as a satellite compass.

The radar unit 204 can use radio waves to determine a range, angle, velocity, or distance of vessels, vehicles, maritime objects, etc. In some cases, radar unit 204 can be utilized to detect vessels, vehicles, maritime objects, weather formations, or terrain. The radar unit 204 can include a transmitter producing electromagnetic waves in the radio or microwaves domain, a transmitting antenna, a receiving antenna, a receiver, and a processor. In some cases, the radar unit 204 is implemented as a solid-state radar lacking a magnetron. In some cases, the radar unit 204 is implemented as a frequency modulated continuous wave radar. In some cases, the radar unit 204 is implemented as a compressed pulse radar.

The LIDAR unit 206 can use lasers to determine a range, angle, velocity, or distance of vessels, vehicles, maritime objects, etc. For example, the LIDAR unit 206 can measure distances by illuminating a target with laser light and measuring the reflection with a sensor. For instance, differences in laser return times and wavelengths can then be used to make digital 3D representations of the target. In some cases, the LIDAR unit 206 can be utilized to detect vessels, vehicles, maritime objects, weather formations, or terrain. In some cases, the LIDAR unit 206 can be utilized to detect water level to determine tidal state. In some cases, the LIDAR unit 206 can be utilized to detect water level, along with hull height, to determine draft. The LIDAR unit 206 can include a laser source, a detector, a scanning mechanism, timing electronics, a location positioning system (e.g., GPS), and inertia measurement unit, a processor, or the like. The LIDAR unit 206 can be implemented as a scanning panoramic LIDAR. The LIDAR unit 206 can be implemented as a spherically scanning rotated LIDAR, which is rotated simultaneously along two-axis. In some instances, the LIDAR unit 206 can be a Neptec Opal scanning LiDAR.

The thermal camera 208 and/or the omnidirectional camera 210 can be used to capture one or more images. In some cases, the thermal camera 208 and/or the omnidirectional camera 210 can include multiple redundant cameras or a single camera with multiple lenses, which can allow for stereoscopy. The thermal camera 208 and/or the omnidirectional camera 210 can include any of pan, tilt, or zoom capabilities. Camera data from the thermal camera 208 and/or the omnidirectional camera 210 can be used to validate distance perception using angular positioning and/or multi-camera output disparity maps. For example, camera data can be used for depth estimation or distance estimation. In some cases, the omnidirectional camera can be referred to as a 360° camera. In some cases, the omnidirectional camera can be paired with an infrared emission device for night-time visibility.

The weather station 212 can receive, process, or communicate weather data. Weather data can include safety alerts or bulletins, sea conditions (e.g., tide, swells, etc.), weather reports (e.g., wind speed, weather bulletins or alerts, or long-term weather forecasts), wind speed, wind direction, sunlight, UV Index, or rain accumulation, duration, or intensity. The weather station 212 can include an anemometer, microphone, thermal camera, lighting sensor, a rain gauge, a UV/light gauge, a temperature sensor, a relative humidity sensor, a pressure sensor, or processor. In some cases, the weather station 212 is an ultrasound weather station.

Other suitable sensing devices 214 may be utilized to capture port information. For example, in some cases, the support structure 110 can include a sonar system that can use sound waves to navigate, communicate with or detect objects on or under the surface of the water, such as vessels or maritime objects. In some cases, the sonar system can be implemented as a forward looking sonar that is capable of generating a true, 3-dimensional image ahead of a vessel in real-time. For instance, the sonar system can be implemented as the FarSounder-1000, sold by FarSounder, Inc. In some cases, the sonar system can generate 2D or 3D images at navigationally significant ranges. Furthermore, in some cases, the other sensors 214 can include one or more of a low-light camera, a high-light camera, a video camera, a stereoscopic camera, a laser camera or the like. In some cases, a device can be included in the support structure for redundant external draft measurements.

The communications unit 218 can enable communications between the support structure 130 and one or more other support structures 130. In some cases, the communications unit 218 enables wireless line-of-sight communications between the support structures 130 of the system 100. For example, the communications unit 218 can be implemented as a Fluidmesh radio unit, which can be connected to an external camera. In some cases, the support structure 130 is not enabled for wireless non-line-of-sight communications with other support structures 130.

The control unit 216 can be in communication with the compass 202, a radar unit 204, a LIDAR unit 206, a thermal camera 208, an omnidirectional camera 210, a weather station 212, or one or more other sensors 214. Further, the control unit 216 can be in communications with the communications unit 218, for example to obtain port data from other support structures. The control unit 216 can, among other things, collect or process the port information, generate a graphical representation (e.g., a map) of a port based on the port information, communicate port data with or receive port data from other support structures 110 or a central computing system 104, update its graphical representation of the port based on received port data, generate guidance data for port navigation assistance, provide a user computing system 102 access to its graphical representation of the port and/or guidance data, etc. In some cases, the bandwidth utilized by the system 100 is reduce by performing processing at the control units 216 but transmitting low bandwidth data (e.g., maps with vessel and maritime objects representations) between control units 216 and user computing systems 102.

FIGS. 3A-3G illustrate perspective, first side, second side, front, back, top, and bottom views, respectively, of an example support structure 110. With reference to FIGS. 2A-2G, the support structure 110 can include a compass 202, a radar unit 204, a LIDAR unit 206, a thermal camera 208, an omnidirectional camera 210, and a control unit 216. Furthermore, the support structure 110 can include one or more mounting poles 318, a mounting frame 320, a compass and radar unit mount 322, a LIDAR unit mount 326, a thermal camera mount 328, and an omnidirectional camera mount 330.

The one or more mounting poles 318 can be utilized to secure the support structure 110 to ground or some structure. For example, one or more support structures 110 may be positioned onshore, such as such as on a high-elevation structure (e.g., a building, a pole, a steel tower, a hill, a mountain, etc.), a low-elevation structure (e.g., the ground), a vehicle (e.g., a crane, a car, a truck, a truck, a train, a forklift, etc.). In addition or alternatively, one or more support structures 110 may be positioned offshore, such as such as on a vessel, a floating platform, a fixed platform, a pylon, etc. In some cases, all support structures 110 are secured to a fixed location, such as in or around a port. In some cases, one or more support structures 110 are secured to a movable object, such as a vehicle, vessel, floating platform, etc.

The one or more mounting poles 318 can be utilized to facilitate the installation or attachment of the support structure 110 to the ground or some structure. The length, width, size, shape, or number of mounting poles 318 can vary across embodiments. Although illustrated as a cylindrical pole, it will be understood that other designs for the mounting pole 318 are contemplated. Furthermore, in some cases, a support structure 110 may not include a mounting pole 318. For example, the support structure 110 may be installed or attached to the ground or some structure by other means, such as screwing or otherwise attaching the mounting frame 320 to the ground or the structure.

The mounting frame 320 includes a vertical base 332, a first horizontal arm 334 projecting in a first direction 350 away from the vertical base 332, and a second horizontal arm 336 projecting in the first direction 350 away from the vertical base 332. The angle at which the first horizontal arm 334 and the second horizontal arm 336 extend away from the vertical base 332 is approximately 90°. The longitudinal axes of the first horizontal arm 334 and the second horizontal arm 336 are substantially parallel to each other and are substantially perpendicular to the longitudinal axis of the vertical base 332. The vertical base 332, the first horizontal arm, and/or the second horizontal arm can have a generally rectangular shape, and a surface of the vertical base 332, first horizontal arm, or second horizontal arm can be relatively flat. In some cases, the mounting frame 320 can have a general C-, U-, or L-shape.

The mounting frame 320 can be a base structure to which other components of the support structure 110 (e.g., the compass and radar unit mount 322, the LIDAR unit mount 326, the thermal camera mount 328, the omnidirectional camera mount 330, the control unit 216, the one or more mounting poles 318, etc.) are coupled. For example, as illustrated, the one or more mounting poles 318 can be coupled to the second horizontal arm 336 of the mounting frame 320, the compass and radar unit mount 322 and a LIDAR unit mount 326 can be coupled to the first horizontal arm 334 of the mounting frame 320, and the thermal camera mount 328 and the omnidirectional camera mount 330 can be coupled to the vertical base 332 of the mounting frame 320.

The compass and radar unit mount 322 is coupled to the first horizontal arm 334 of the mounting frame 320. The compass and radar unit mount 322 extends away from the first horizontal arm 334 in a second direction 352. The second direction 352 is parallel to the longitudinal axis of the vertical base 332, perpendicular to the first direction 350, and perpendicular to the longitudinal axis of the first horizontal arm 334.

The radar unit 204 and the compass 202 are coupled to the compass and radar unit mount 322. The compass 202 is positioned above (or further in the second direction 352 than) the radar unit 204. The compass 202 includes a curved portion 338 than extends out from a base of the radar unit 204 (e.g., in the first direction 350) and curves upward (e.g., in the second direction 352) such that the compass 202 is positioned higher than and at least partially over the radar unit 204. In some cases, the curved portion 338 is referred to as a compass mount.

The LIDAR unit mount 326 is coupled to the first horizontal arm 334 of the mounting frame 320. The LIDAR unit 206 is coupled to the LIDAR unit mount 326 such that it is lower than the radar unit 204 and the compass 202. In other words, the radar unit 204 and the compass 202 are further in the second direction 352 than the LIDAR unit 206. In some cases, the LIDAR unit mount 326 is the same as, or part of, the compass and radar unit mount 322. In some cases, the LIDAR unit 206 is positioned above the camera 210 and/or angled such that a scanned area of the LIDAR unit 206 is not obstructed by the camera 210.

The thermal camera mount 328 is coupled to the vertical base 332 of the mounting frame 320. The thermal camera mount 328 extends away from the vertical base 332 in a third direction 354. The third direction 354 is opposite the first direction 350. The longitudinal axis of the thermal camera mount 328 is perpendicular to the longitudinal axis of the vertical base 332 or perpendicular to the longitudinal axis of the first horizontal arm 334.

The thermal camera 208 is coupled to the thermal camera mount 328. The thermal camera 208 is lower than the LIDAR unit 206, the radar unit 204, or the compass 202. In other words, the LIDAR unit 206, the radar unit 204, and the compass 202 are further in the second direction 352 than the thermal camera 208.

The omnidirectional camera mount 330 is coupled to the vertical base 332 of the mounting frame 320. The omnidirectional camera 210 is coupled to the omnidirectional camera mount 330. In some cases, the omnidirectional camera 210 is coupled to the omnidirectional camera mount 330 via a connector arm 340. As shown, the connector arm 340 can include a curved/bent portion that extends out from the omnidirectional camera mount 330 (e.g., in the second direction 352) and curves forward (e.g., in the third direction 354) such that the omnidirectional camera 210 extends a first distance 342 away from vertical base 332 of the mounting frame 320 in the third direction 354.

In some cases, one or more of the mounting poles 318, the mounting frame 320, the compass and radar unit mount 322, the LIDAR unit mount 326, the thermal camera mount 328, the omnidirectional camera mount 330, the connector arm 340, the omnidirectional camera mount 330, the first horizontal arm 334 or the second horizontal arm 336 are adjustable. For example, any of the foregoing may be extendable, shiftable, or rotatable. In this way, the position or orientation of the sensors can be adjusted as desired, for example to move a scanning area of the sensor so that it is not obstructed by an object, vegetation, another senor, etc.

The control unit 216 can be a control box that is coupled to the vertical base 332 of the mounting frame 320. As shown, the control unit 216 can be coupled to an opposite side of the vertical base 332 than the side to which the thermal camera mount 328 or the omnidirectional camera mount 330 is coupled. Locating the control unit 216 in a control box coupled to the mounting frame 320 can advantageously reduce wires and other connections from the sensors to the control unit 216.

Figure 4A:
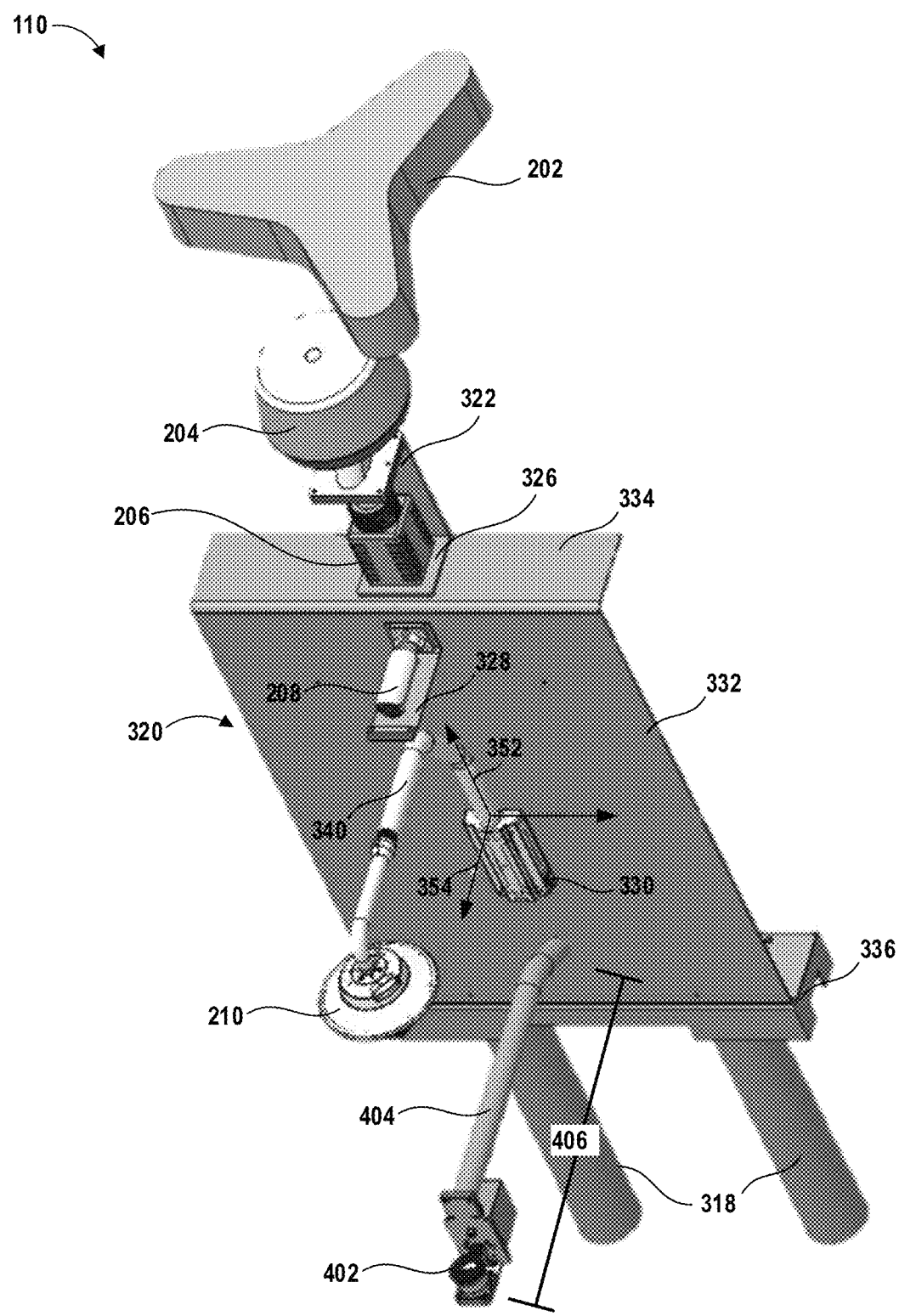
FIG. 4A illustrates perspective view of an example support structure.

FIG. 4A illustrates perspective view of an example support structure 110. As illustrated, FIG. 4A can include any one or more of the features of the support structure 110 of FIGS. 3A-3G. In addition, in this example, the support structure 110 includes a connector arm 404 (sometimes referred to as a LIDAR mount 404) coupled to the vertical base 332 of the mounting frame 320 and a LIDAR unit 402 coupled to the connector arm 404. As shown, the connector arm 404 can extend out from the vertical base 332 such that the LIDAR unit 402 extends a second distance 406 away from vertical base 332 of the mounting frame 320 in the third direction 354. The second distance 406 can be approximately equal to the first distance 342 such that LIDAR unit 402 is generally below the camera 210. In some cases, the LIDAR unit 402 is an embodiment of the LIDAR unit 208.

In some cases, the LIDAR unit 206 and the LIDAR unit 402 can have different capabilities or costs. For example, the LIDAR unit 206 can be relatively expensive as compared to the LIDAR unit 402. Further, the LIDAR unit 402 can have a range (e.g., 120 meters) that is substantially less than the range of the LIDAR unit 206 (e.g., 1000 meters). However, in some instances, the LIDAR unit 402 may perform much better at shorter ranges and may be better suited to detect objects that are in close proximity as opposed to the LIDAR unit 206 that may be better suited for detecting objects that are further away. Accordingly, the LIDAR units 206 and 402 are arranged in a specific locations with respect to the support structure 110 to maximize the field of view. For example, the range of the LIDAR unit 206 can be about 2, 3, 4, 5, or 10 times larger than the range of the LIDAR unit 402. In some instances, the range of LIDAR unit 206 is at least two times more than the range of the LIDAR unit 402.

Figure 4B:
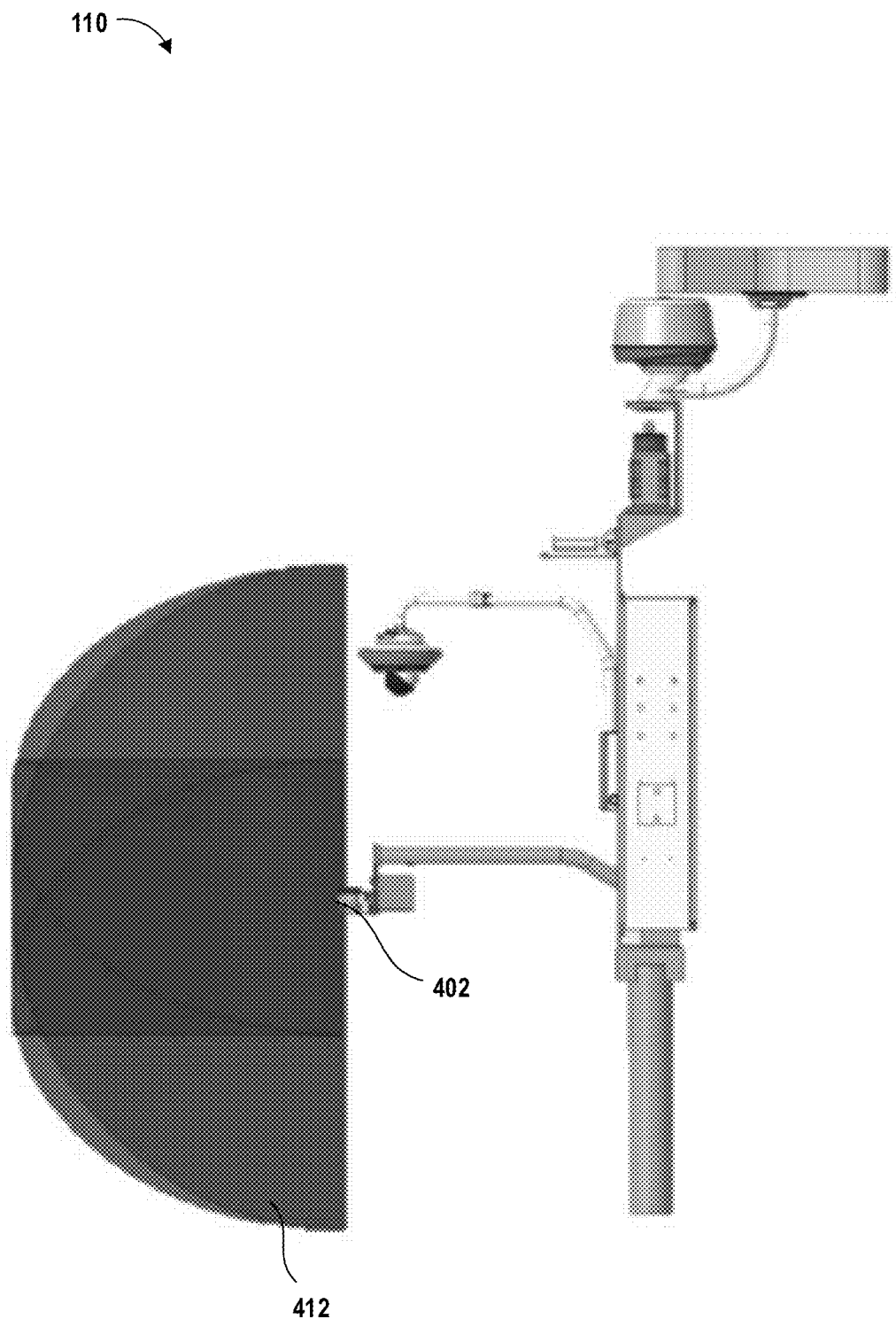
FIGS. 4B and 4C illustrate an example scanning area of a LIDAR unit of FIG. 4A.
Figure 4C:
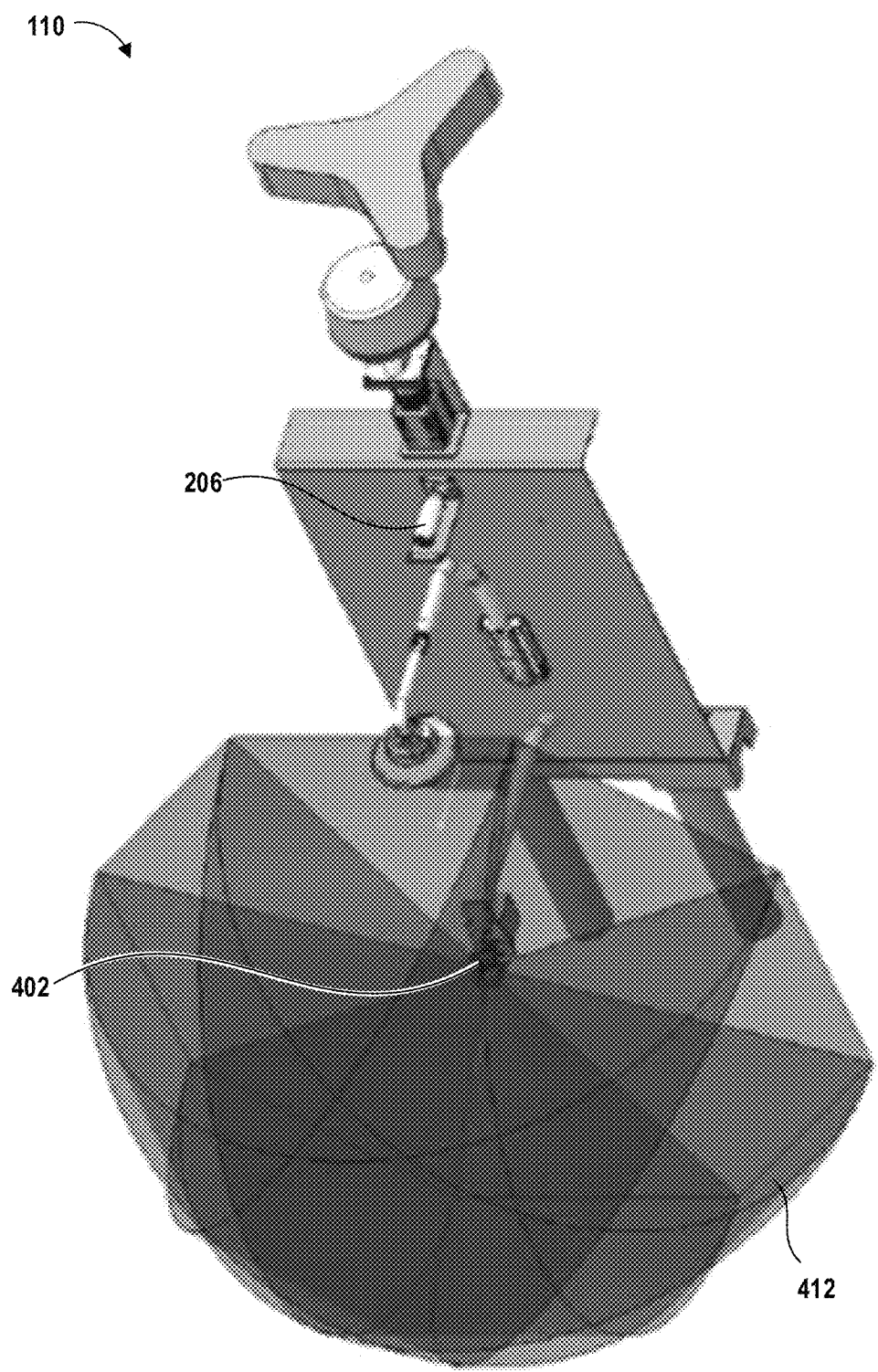

The LIDAR unit 402 can be configured to rotate in relation to the connector arm 404 around a first axis that is parallel to the connector arm 404. The LIDAR unit 402 may also have an inherent functionality to rotate about a second axis that is perpendicular/orthogonal to the first axis. In this way, by introducing the rotation with respect to the connector arm 404, the field of view of LIDAR unit 402 can be expanded to a sphere as shown in FIGS. 4B and 4C. In some examples, the LIDAR unit 402 can be implemented as the MID-RANGE LIDAR SENSOR sold by OUSTER and the LIDAR unit 206 can be the OPAL PERFORMANCE SERIES PANORAMIC 3D LiDAR sold by Netpec, etc.

Figure 4D:
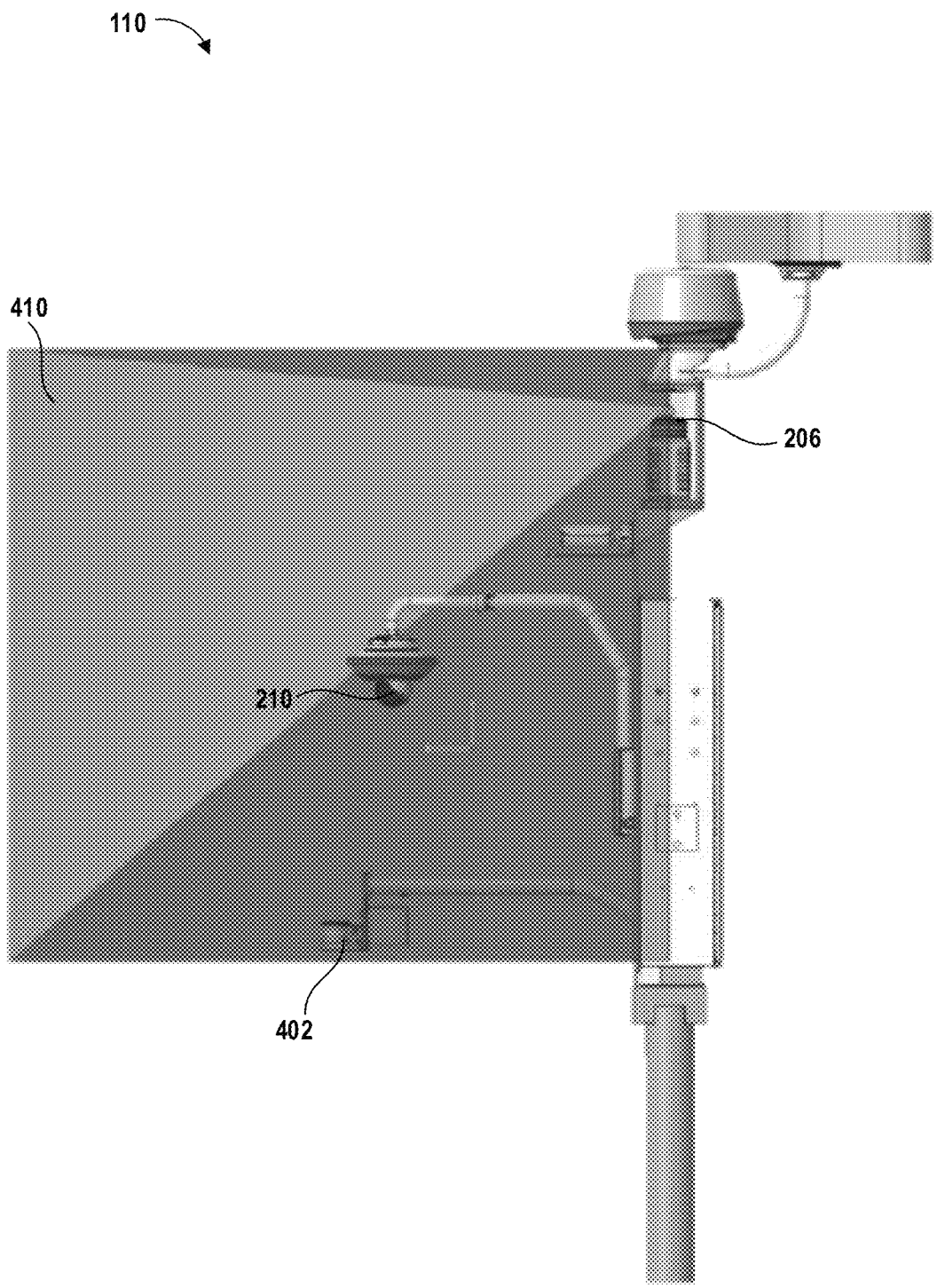
FIG. 4D illustrates an example scanning area of a LIDAR unit of FIG. 4A.
Figure 4E:
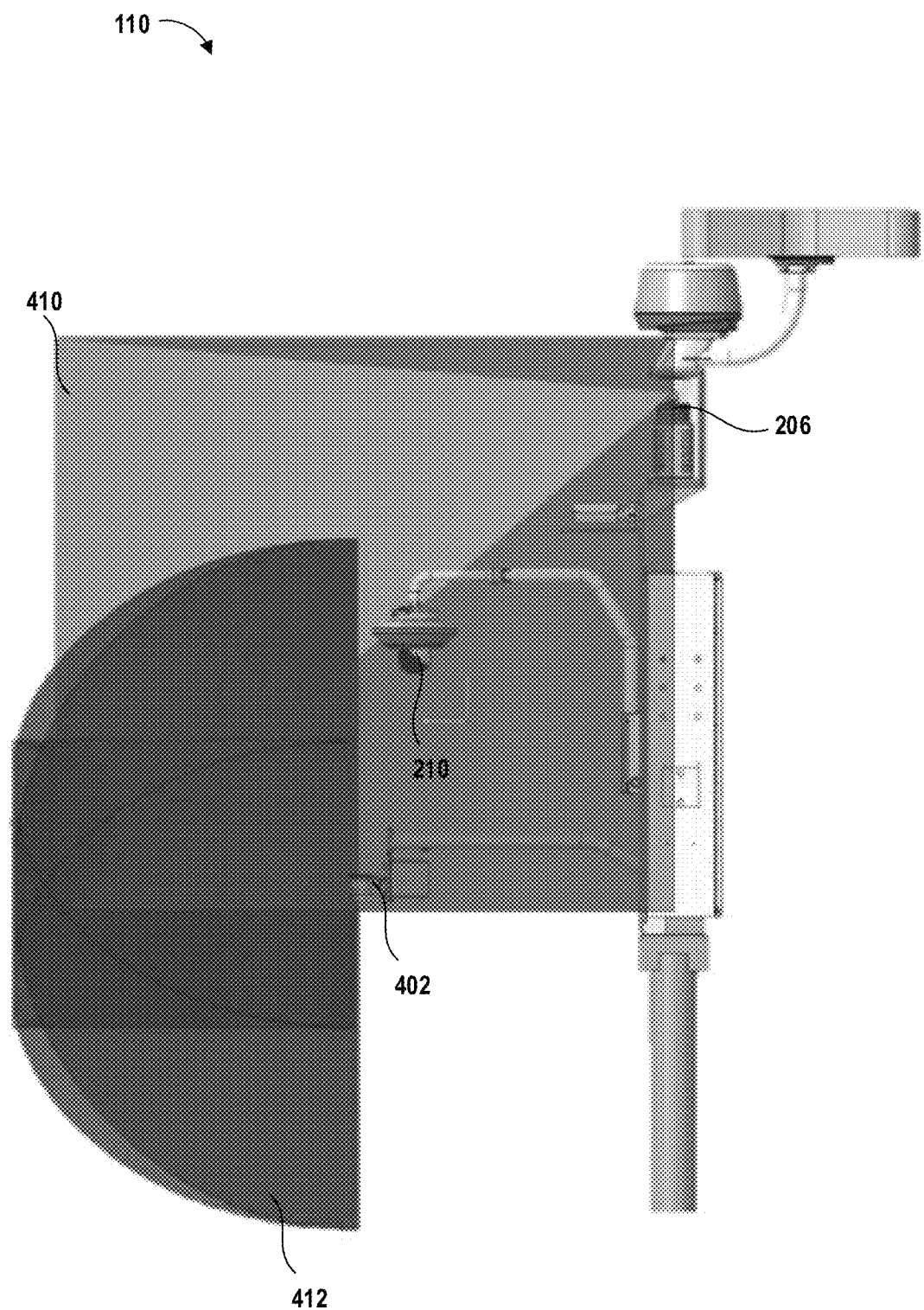
FIG. 4E illustrates example scanning areas of the LIDAR units of FIG. 4A.

FIGS. 4B and 4C illustrate an example scanning area 410 of the LIDAR unit 206. FIG. 4D illustrates an example scanning area 412 of the LIDAR unit 402. FIG. 4E illustrates example scanning areas of the LIDAR unit 206 and the LIDAR unit 402. It will be understood that the scanning areas 410, 412 are drawn for illustrative purposely only and should not be construed as limiting. For example, the scanning areas 410, 412 can be larger, smaller, or oriented at one or more different angles than illustrated. Furthermore, the scanning areas 410, 412 may overlap more or less, as desired.

In some cases, the LIDAR unit 206 and LIDAR unit 402 work together to provide a desired coverage or field of view. That is the LIDAR units can be arranged specifically to utilize their respective specific strengths and overcome their respective weaknesses to improve the coverage. In some examples, the overlap between the field of views of the respective LIDAR units is minimized. As illustrated in FIG. 4E, the scanning area 410 provided by the LIDAR unit 206 partially overlaps with the scanning area 412 provided by the LIDAR unit 402. This can ensure there are no gaps in coverage. As discussed above, the LIDAR unit 206 may perform better at a long range while the LIDAR unit 402 may perform better at a short range. Accordingly, the LIDAR unit 206 may be placed at a higher position on the support structure 110 compared to the LIDAR unit 402 such that the field of view 410 can cover objects like ships that are further out in the water. Furthermore, in the illustrated embodiment of FIG. 4B, the omnidirectional camera 210 protrudes out from the mounting frame 320. To provide a desired LIDAR coverage, the LIDAR unit 206 can be positioned or oriented such that the omnidirectional camera 210 is not an obstructing object in the scanning area 410 of the LIDAR unit 206. As discussed above, the LIDAR unit 206 can also be placed in relation to the omnidirectional camera 210. For example, the LIDAR unit 206 may be placed at least as far out as distance 342. The distances 342 and 406 may be approximately similar. In some instances, the distance 406 is greater than distance 342. Therefore, as illustrated, the LIDAR unit 206 is placed at a higher position than the camera 210, which is in turn higher than the LIDAR unit 402 to improve overall field of view.

Figure 5:
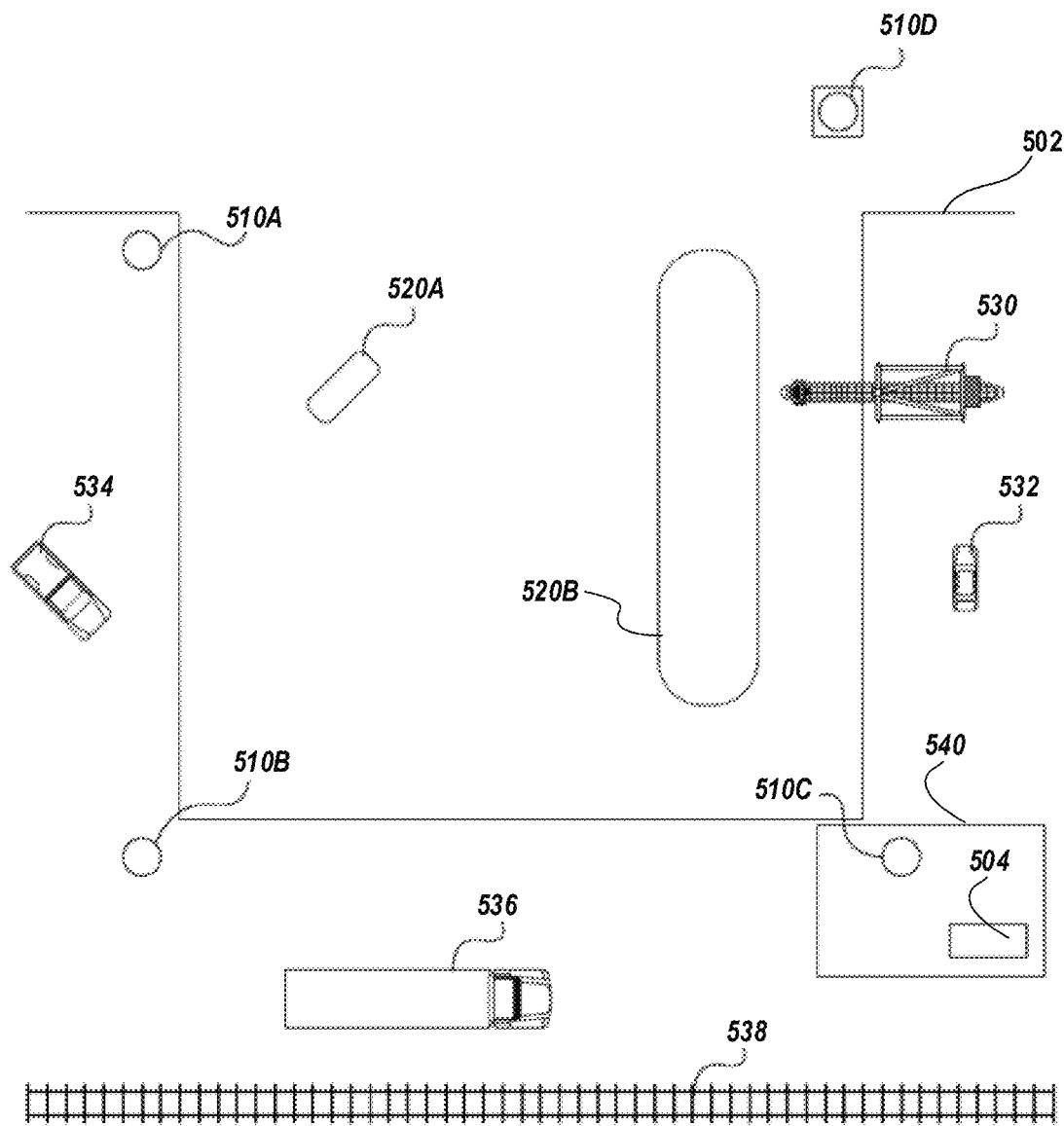
FIG. 5 illustrates a pictorial aerial view of an environment implementing the system of FIG. 1.

FIG. 5 illustrates a pictorial aerial view of an environment 500 implementing the system 100 of FIG. 1. As shown, the environment 500 corresponds to a maritime port that includes various shore boundaries 502 indicating a separation between land and sea. Furthermore, the environment 500 includes four support structures 510A, 510B, 510C, and 510D, a central computing system 504, two vessels 520A, 520B located on the water, and six other maritime objects, namely a crane 530, a car 532, a truck 534, a truck 536, railroad tracks 538, and a building 540.

The support structures 510A, 510B, 510C, and 510D are located in or around the port. For example, the support structures 510A and 510B are located onshore, such as on steel towers, the support structure 510C is located onshore and attached to the building 540, and the support structure 110D is located offshore, such as on a floating platform or pylon. In some cases, the environment 500 can include additional or fewer support structures, which can be located at various locations in the environment 500. For example, one or more support structures may be located on a vessel, a building, a pole, a steel tower, a vehicle, etc. Each of the support structures 510A-510D can be an embodiment of the support structure 110 of FIG. 1.

The support structures 510A-510D can be placed or located in or around the port according to mast distribution policy. Advantageously, the mast distribution policy can provide instruction or guidance regarding how many support structures to use in a particular area, where to locate a support structure (for example, relative to land marks, high-elevation structure, other support structure, shoreline, etc.), how to orient a support structure, which sensors to include in a particular support structure, at what height to secure a support structure, or the like.

In some cases, a mast distribution policy can be based on the particular port or area at which a support structure is to be located. For example, a vessel is generally subject to the orders of a port authority in respect to its entry, departure, draught, berth, anchorage, location, speed, direction and means and method of movement, etc. As such, placement of one or more support structures may vary to accommodate request, rules, geography, traffic, etc. of a particular port.

The mast distribution policy can indicate that support structures are to be positioned such that a particular support structure is within a particular range (e.g., 1 km) or within a line-of-sight of a threshold number (e.g., one, two, three, four, five or more) of other support structures. For example, the mast distribution policy can indicate that a first support structure is to be in a line-of-sight of at least two other support structures. In some cases, installing support structures such that each support structure is within a line-of-sight of at least two other support structures can add redundancy to ensure that some, most, or all areas of the port are being monitored, or are being monitored from multiple angles.

In certain embodiments, a mast distribution policy can indicate that a particular location, or any location in a particular area (e.g., the port area) is monitored by, or within the line-of-sight of, at least a threshold number (e.g., one, two, three, four, five or more) of support structures. For example, the mast distribution policy can indicate that a first location at a port is to be in a line-of-sight of a threshold number (e.g., 2, 3, 4, or more) support structures. As another example, the mast distribution policy can indicate that all locations in a particular area are to be in a line-of-sight of a threshold number (e.g., 2, 3, 4, or more) of support structures. In this way, the spatial configuration of the support structures can be port specific.

In certain embodiments, a mast distribution policy can indicate that support structures are to be located in discreet areas, or that support structures are to be located or positioned at a threshold height. For example, the mast distribution policy can indicate that support structures are to be located at least at a threshold height (e.g., 10 ft, 40 ft, 30 feet, etc.) above ground or sea level. As another example, the mast distribution policy can indicate that support structures are to be located at least a threshold height (e.g., 1 ft, 5 ft, 10 feet, etc.) above surrounding structures, vegetation, etc.

Any one or any combination of the aforementioned sensor-placement policies can be used for different support structures. For example, the support structures at the ends of a port can be placed using different mast distribution policy than support structures in the middle of the port. Accordingly, it will be understood that different sensor-placement policies can apply to different support structures.

Placing the support structures according to a mast distribution policy can provide a number of advantages. For example, there may be overlap between the monitored areas of the support structures to provide redundancy. As another example, multiple or all angles of any or a particular vessel, maritime object, etc. may be monitored.

In some cases, the location of a support structure can be dynamic. For example, a support structure can be located in or on a vessel, such as one of vessels 520A or 520B, in or on a moving maritime object, such as the crane 530, the car 532, or the trucks 534 or 536.

The support structures 510A-510B can communicate with each other wirelessly, for example, using Bluetooth, infrared, Wi-Fi, cellular, radio frequency (RF), or other wireless technology. In addition or alternatively, wired technologies may be used for communications.

One or more of the vessels 520A, 520B or the crane 530, car 532, truck 534, or truck 536 can provide additional sensor readings to the one of the support structures 510A, 510B, 510C, or 510D, or the central processing system 504. For example, vessels 520A or 520B can return data about one or more of its identification, draft, depth, wind, speed (e.g., engine settings and/or actual movement), or course heading (e.g., rudder position). This can be used to predict or determine a path for the vessel 520A or 520B. Each of the vessels 520A or 520B, or crane 530, car 532, truck 534, or truck 536 can have a display. These displays can be linked to a support structure 510A, 510B, 510C, or 510D, or the central processing system 504, for example by Wi-Fi or other wireless communication methods. In some cases, the support structure 510A, 510B, 510C, or 510D, or the central processing system 504 can control the maritime vessels 520A, 520B or the crane 530, car 532, truck 534, or truck 536 directly or can provide instructions to the operator using the screen.

The support structure 510A, 510B, 510C, or 510D, or the central processing system 504 can determine or predict dangers. Further, the support structure 510A, 510B, 510C, or 510D, or the central processing system 504 can create map (e.g., 2D, 3D) of the port or portions thereof. Movement of the objects can be predicted. Collisions or inefficiencies can be identified and/or remedied. Certain objects, like maritime vessels or vehicles, can confirm its identification to determine properties for its movement. The support structure 510A, 510B, 510C, or 510D, or the central processing system 504 can operate with low visibility or in bad weather. This can allow more operations in foggy or rainy conditions.

Sensors are installed in masts and other high-elevation structures in and around ports and inland waterways to render a real-time 3D map of the surroundings with a high level of precision. This map is then made available to the harbor master's team, pilots, terminal operators, and navigating vessels to remove line-of-sight restrictions and provide comprehensive real-time situational awareness. Ships, barges, tugs, workboats, and other maritime vessels can access this map wirelessly using any device that supports a web browser.

After sufficient Machine Learning (ML) is completed based on the data collected from these sensors, using deep-learning and other advanced ML techniques, the system can provide suggestions for optimal course and speed to vessels operating in the vicinity of the port to increase navigation safety and traffic scheduling efficiency. The sensor data also can be made available to entities interested in projects that improve other aspects of terminal operations, such as remote crane handling, automated mooring, and/or AI-based security monitoring, via an Application Programming Interface (API).

Costs of autonomous operations can be reduced because vessels may not need expensive sensing equipment onboard to assist with close-quarter navigation that requires high-precision distance sensing. Instead, vessels can leverage the commonly shared smart infrastructure provided by the disclosed system. Other benefits include real-time asset health tracking for timely maintenance, real-time draft tracking for better traffic scheduling, situational awareness for remote operation of cargo handling equipment, and automated surveying for dredging.

Situational awareness can be improved, which is specifically useful during vessel docking and coordinated workboat operations. LIDAR sensor fusion uses Simultaneous Localization and Mapping (SLAM) to map the surroundings with centimeter-level precision in real-time. Utilizing the system's LIDAR during docking can reduce the opportunity for collisions, as well as improve traffic scheduling.

Figure 6:
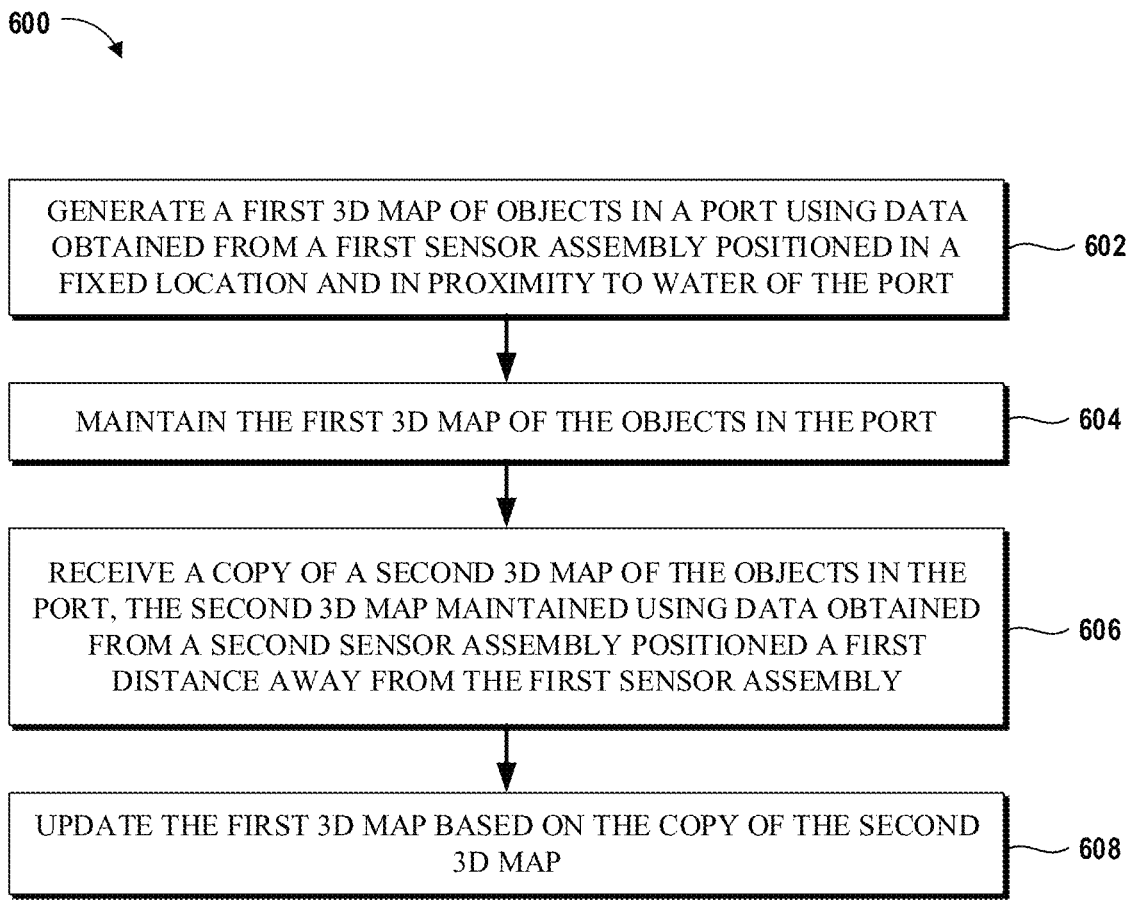
FIG. 6 is illustrates an example a flow diagram for generating a three dimensional map of objects in a port.

FIG. 6 is a flow diagram illustrative of an example of a routine 600 implemented by a support structure 110 to generate and maintain a three dimensional map of objects in a port. One skilled in the relevant art will appreciate that the elements outlined for routine 600 can be implemented by one or more computing devices associated with the support structure 110, such as a hardware processor of the control unit 216. For ease of reference, the routine 600 has been logically associated as being generally performed by a processor. However, the following illustrative embodiment should not be construed as limiting. Furthermore, it will be understood that the various blocks described herein with reference to FIG. 6 can be implemented in a variety of orders. For example, the processor can implement some blocks concurrently or change the order as desired. Furthermore, it will be understood that fewer, more, or different blocks can be used as part of the routine 600.

At block 602, the processor generates a first 3D map of objects in a port using data obtained from a first sensor assembly positioned in a fixed location and in proximity (e.g., within 10 m, 5 m, 1 m, etc.) to water of the port. For example, the processor can be in electronic communications with the first sensor assembly. The first sensor assembly can correspond to one or more sensors of the support structure 110, such as any combination of the compass 202, radar unit 204, LIDAR unit 206, thermal camera 208, omnidirectional camera 210, weather station 212, or other sensors 214. The data obtained from the first sensor assembly can correspond to port data, as described herein.

A support structure, and thus the first sensor assembly, may be located in a fixed onshore or offshore location. In some cases, fixing the location of the support structure can advantageously provide a reliable stream of port information over time. In contrast, installing the support structure on a moving object (e.g., a vessel) may not provide reliable streams of port information over time, for example if the vessel moves outside of the port.

As non-limiting example, the first sensor assembly can be located on a fixed high-elevation structure (e.g., a building, a pole, a steel tower, a hill, a mountain, etc.) or a fixed low-elevation structure (e.g., the ground). In addition or alternatively, the first sensor assembly can be located on a floating platform, a fixed platform, a pylon, etc. In some cases, the support structures and sensor assemblies are preferably placed as close to the water of the port as practical. Further, the support structures can be preferably positioned such that the plane of the vertical base 332 of the mounting frame 320 is substantially parallel to the shoreline.

At block 604, the processor maintains the first 3D map. For example, the processor can continuously or periodically receive data from the first sensor assembly and can update the first 3D map based on the data received form the first sensor assembly. In some cases, fixing the location of the support structure relative to the shore can reduce processing requirements to maintain the map. For example, since other non-moving boundaries, shorelines, objects, can be fixed relative to the first sensor assembly, data regarding those maritime objects can be updated less frequently than other aspects of the 3D map. In some cases, maintaining the first 3D map includes retaining the 3D map, or a copy thereof, locally at the support structure.

At block 606, the processor receives at least one of a copy of a second 3D map of the objects in the port or data corresponding to the second 3D map. Similar to as described with respect to blocks 602 and 604, a second support structure can include a second sensor assembly and can use data from the second sensor assembly to generate and maintain the second 3D map of the objects in the port.

In addition, the second support structure can communicate a copy of its second 3D map of the objects in the port to the first support structure. In addition or alternatively, the second support structure can communicate data corresponding to its second 3D map. The communication can occur wirelessly or through a wired connection. For example, in some cases, each of the first support structure and second support structure include a radio configured to radio communications. In some cases, the radios are configured for line-of-sight communications and may be not enabled for non-line of sight communications. To that end, the radios can have a limited communications range. The location of the second support structure relative to the first support structure can be based at least in part on the communications range of their respective radios. For example, to ensure reliable communications, the distance between the first support structure and the second support structure can be less than a smaller of the ranges of the radios. In some cases, the distance between the first support structure and the second support structure can be about 5%, 10%, 15%, 20%, 25%, 30%, 35%, 40%, 45%, 50%, 55%, 60%, 65%, 70%, 75%, 80%, 85%, 90%, 95%, or 100% of at least one of the radio's ranges. In some cases, the distance is maximized with an offset to obtain more area coverage and possible reduce the number of support structures required on the port. For example, the distance can correspond to 100% of the range, minus a buffer (e.g., 5% or 10% of the expected range). In some cases, similar or the same data is communicated concurrently from the radios can over a wired communication. In some cases, the radios can act a backup communication to wired communications. For example, if wired communications fail or are unreliable, the radios can be used to communicate data.

At block 608, the processor updates the first 3D map based on the second 3D map. For example, the processor can continuously or periodically receive data relating to the second 3D map and can update the first 3D map based on the second 3D map. In addition or alternatively, the processor can continuously or periodically update the first 3D map based on data received form the first sensor assembly.

It will be understood that fewer, more, or different blocks can be used as part of the routine 600. For example, the routine can include the first support structure communicating a copy of the first 3D map to the second support structure, for example via a first radio associated with the first sensor assembly. The copy of the first 3D map can be received by a second radio associated with the second sensor assembly, the second radio having a second range.

A LIDAR sensor stream can be used for real-time monitoring of infrastructure health. Any wear and tear can be detected by neural networks to help the asset management team execute a timely response. For example, see the LIDAR image in FIG. 14.

The system can accurately calculate the draft of nearby vessels in real-time, eliminating room for human error and improving the accuracy of squat and under-keel clearance models, while enabling accurate monitoring of cargo discharge rates by weight.

Port operators, typically responsible for navigation safety and port security, are now able to remotely monitor the port through a Graphical User Interface (GUI), along with access to multiple low-light and thermal cameras. Dynamic objects are automatically identified and tracked to ensure the safety of all parties utilizing the port. Vessels also can be operated, such as using the GUI of FIG. 13.

Leveraging object detection neural networks, embodiments of the system can, for instance, track containers in the port, using laser and vision sensors. The sensor system can find discrete marks on the container, such as a logo or identification number. A port operator can manage the movement of cargo efficiently and remotely between cargo ships, trucks, and freight trains. Based on this information, the port can also optimize the schedule of maritime vessels entering the port. This saves fuel, increases delivery speed, reduces worker overtime, and improves crew scheduling. Trucks will also now be able to arrive promptly when vessels are ready to unload.

The GUI can be a web application designed to easily relay and fuse information from sensors to vessels and shore-based teams, accessed wirelessly or via Ethernet respectively. This can be done via desktops, laptops, smart phones, tablets, and any other devices that support a web-browser as well as through the marine-grade display units on a vessel, in a vehicle, or in a control center.

To identify vessels and objects that are not transmitting AIS data, the system can use deep-learning neural networks to interpret camera data. Two neural networks may be used. One neural network identifies objects in images and another neural network classifies objects identified by the first neural network. An object detection network, which can include a Convolutional Neural Network (CNN), is trained to identify objects in a real-time offline environment. This neural network detects boats, ships, cargo containers, people, ice and other maritime objects or port features in real-time from the image feed received from cameras, and extracts them to be provided as input to the second network. The second neural network, which is an offline object classification network identifies the type of object detected to infer their COLREG significance during navigation decision making. These two neural networks can also classify the whole scene in the image, including time of the day (e.g., dawn, dusk, night), if vessels or vehicles in front are moving or static, etc.

Figure 15:
FIG. 15 is an example of image segmentation.
Figure 15:
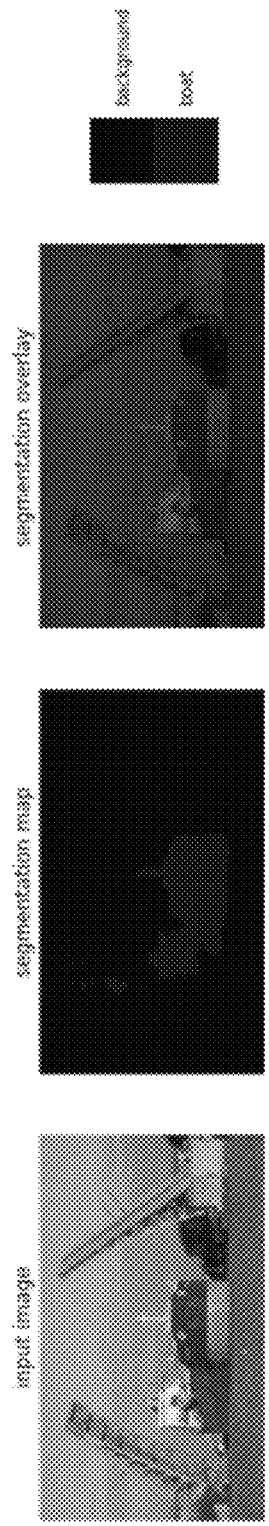
Figure 16:
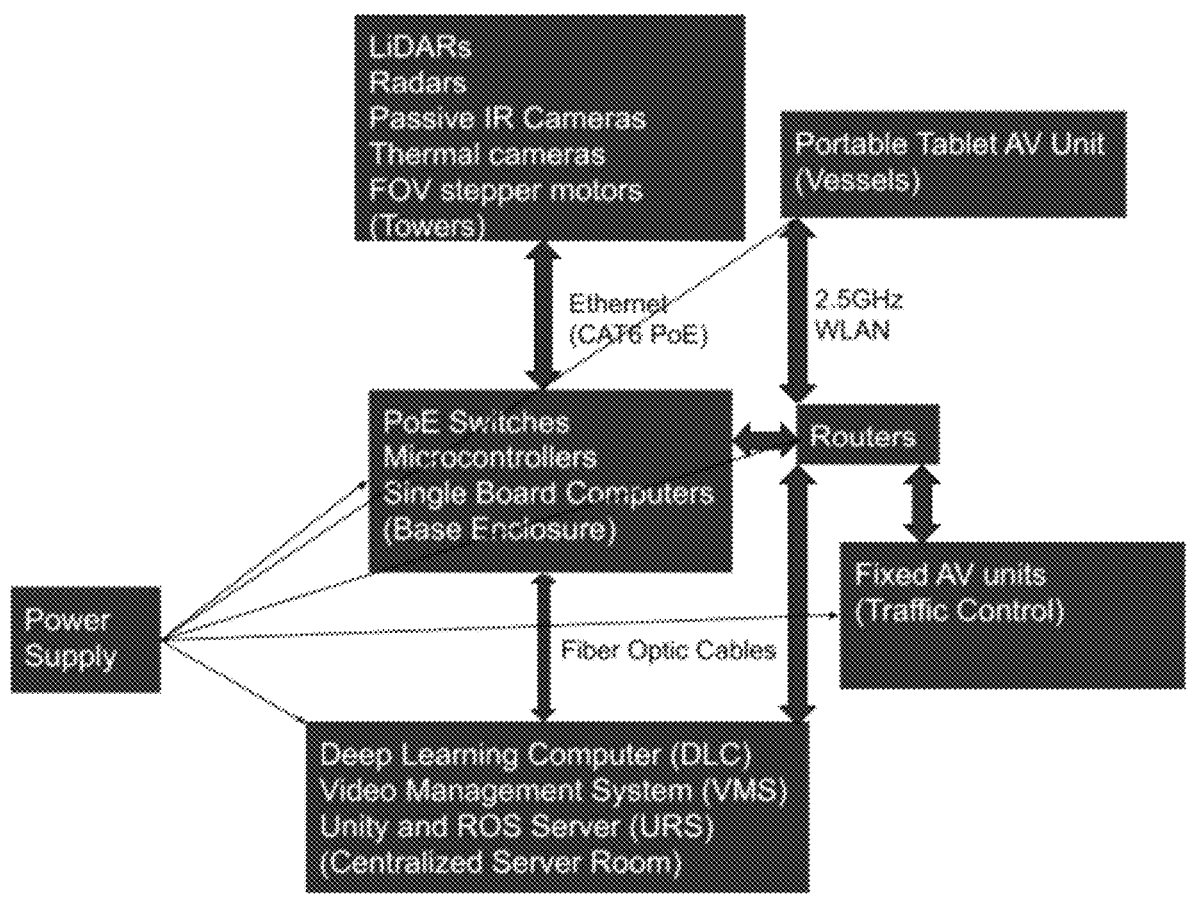
FIG. 16 is an exemplary hardware architecture in accordance with the present disclosure.
Figure 17:
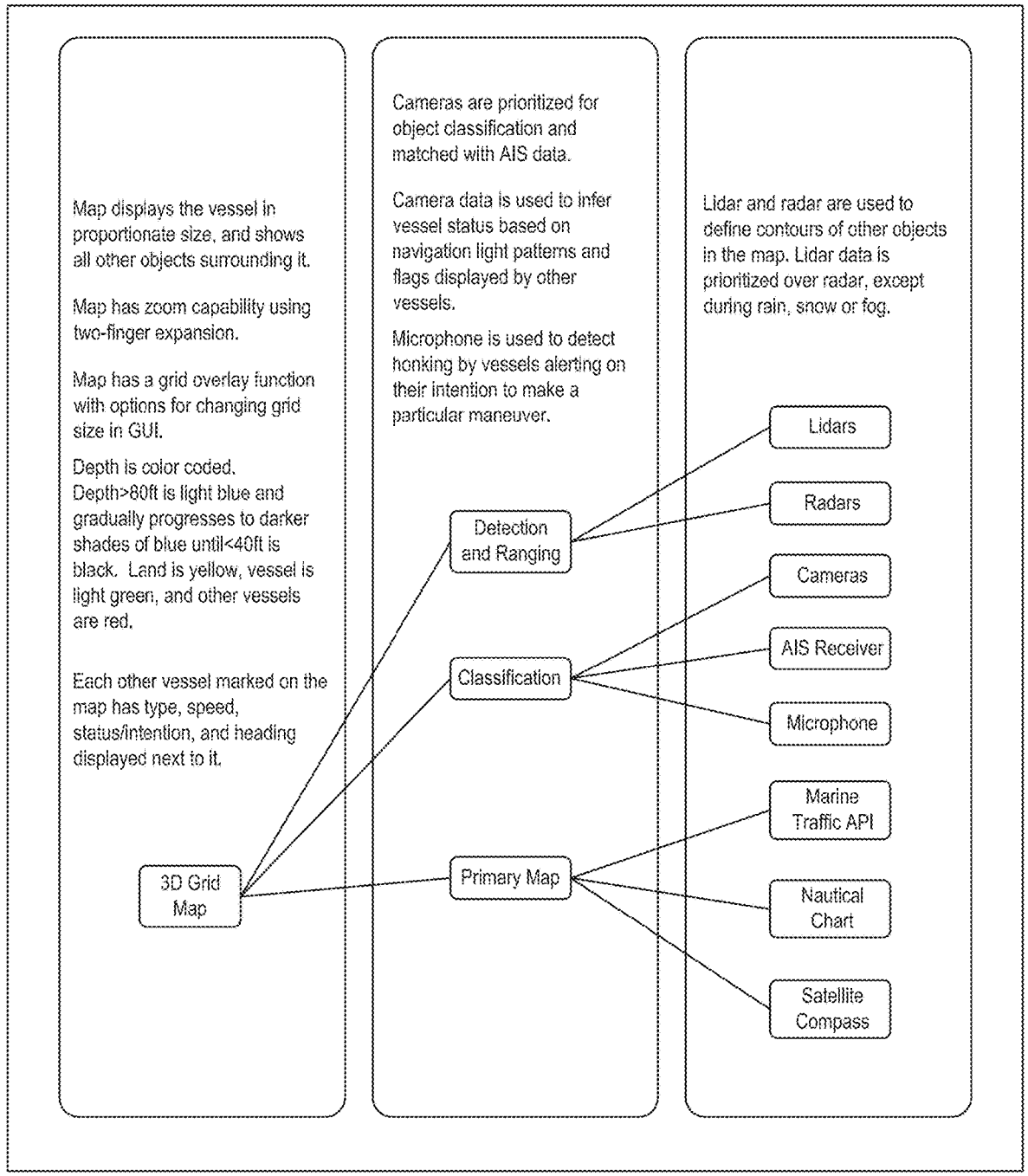
FIG. 17 is an exemplary data flow architecture in accordance with the present disclosure.
Figure 18:
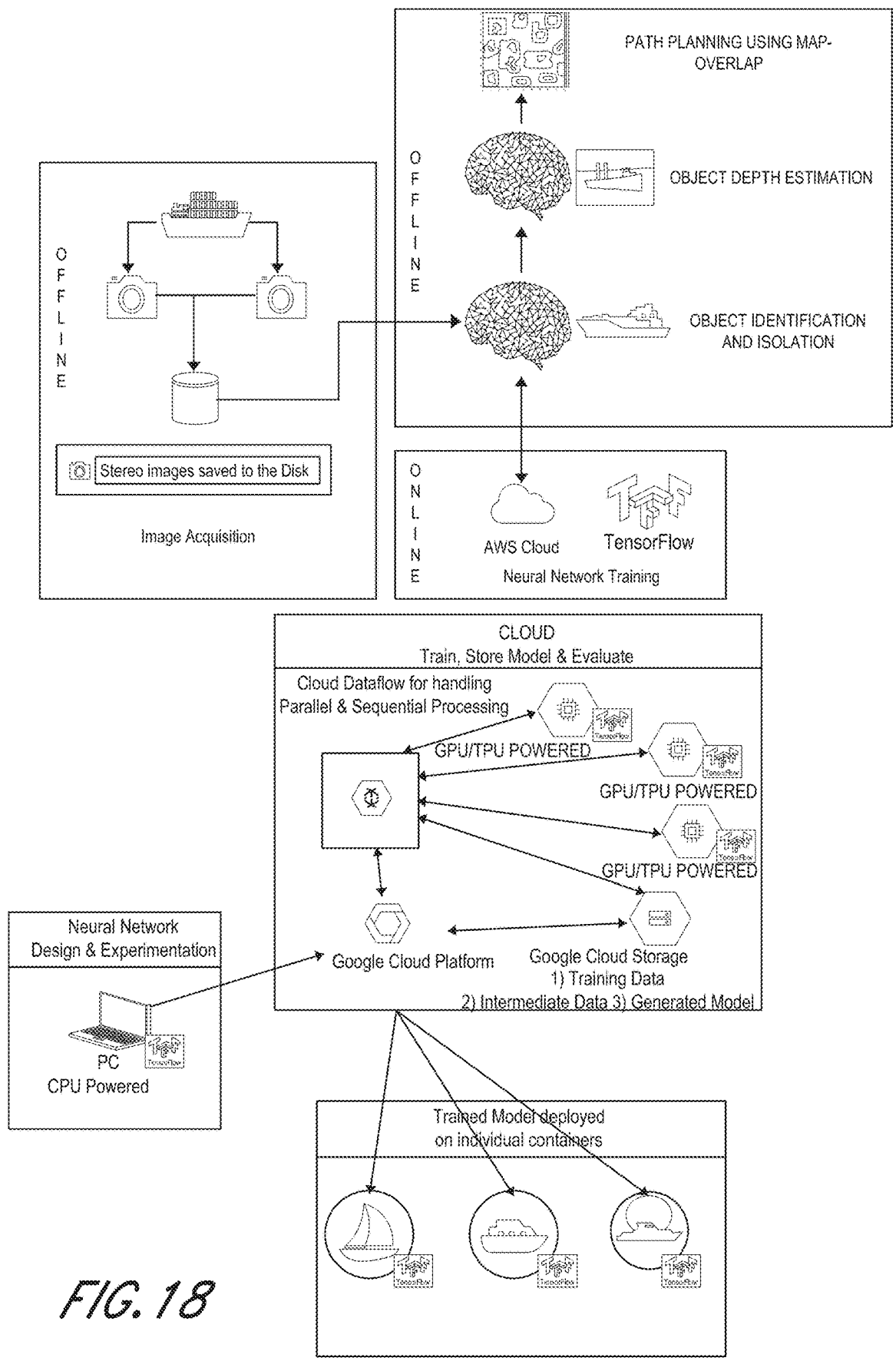
FIG. 18 is a flowchart of an embodiment in accordance with the present disclosure.

LIDAR and radar data are fused for distance perception, and one can be prioritized over the other depending on the prevailing weather conditions. Camera data also can be used to validate distance perception using both angular positioning and multi-camera output disparity maps. Stereoscopy is possible with the placement of redundant cameras within the structures, or a single camera with multiple lenses. Using the same principles as human eyes, the cameras take a picture of the same object at slightly different angles. This gives the image more depth and solidity, which improves depth or distance estimation. Images also can be segmented, as seen in FIG. 15.

Figure 19:
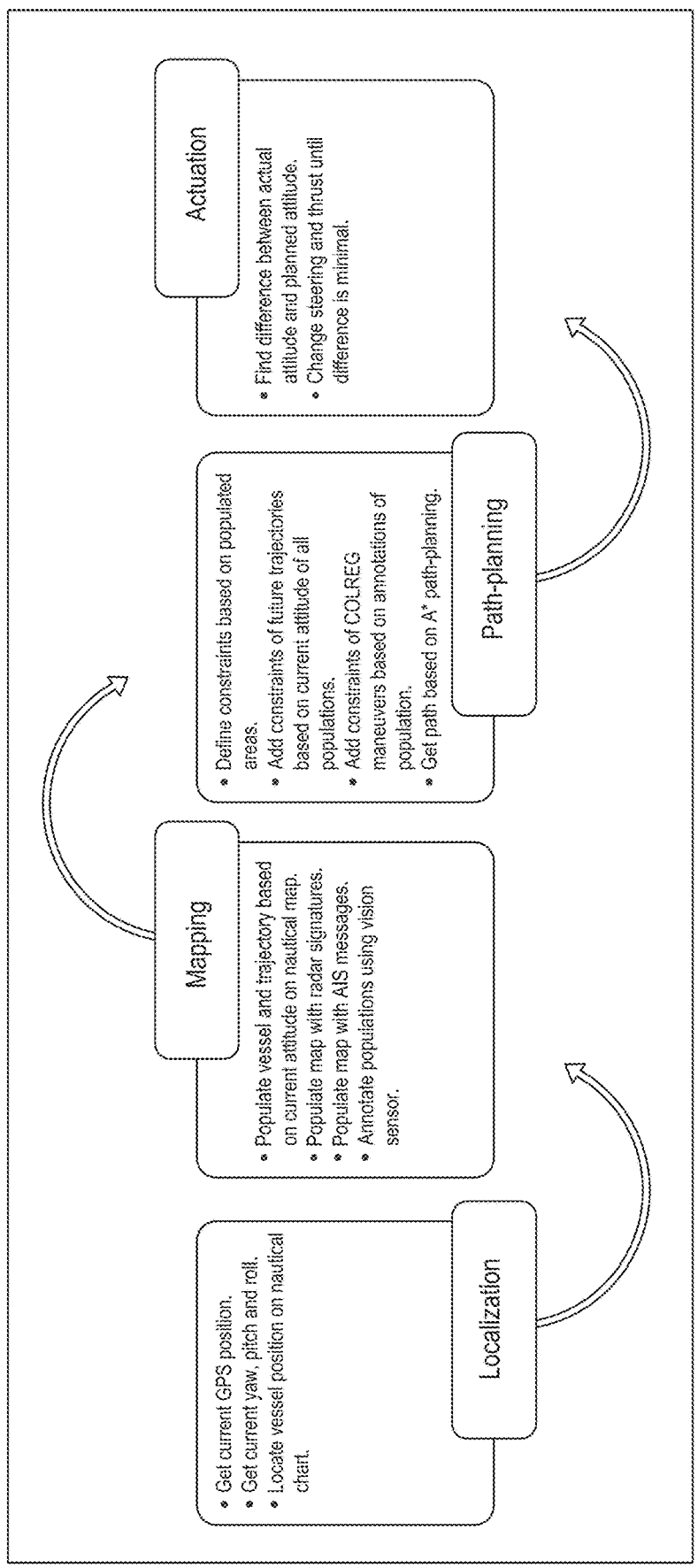
FIG. 19 is a flowchart of the software processes in accordance with the present disclosure.

Decision support can be provided using a combination of both traditional path-planning algorithms and machine learning techniques for navigation. FIG. 19 is a high-level flow-chart of the software processes.

Figure 13:
FIG. 13 is an example of Graphical User Interface (GUI) of vessel operation based on measurements from the system.
Figure 14:
FIG. 14 is an example of LIDAR sensor data stream at a lock.

An object detection network, which can include a CNN, can be trained to identify and classify objects in a real-time offline environment. The object detection network can be trained to perform operations in a port. Maritime objects or port objects can be identified and classified using the object detection network. The system can identify objects such as boats, ships, cargo containers, people, navigation safety hazards, and other maritime objects or port features in real-time from the image feed received from cameras and the output from LIDARs. FIGS. 13-15 show exemplary architectures and operational details.

The system's port navigation map can be aided using an object detection network. The object detection network can be used to recognize various types of vessels and objects around the port, and can enable maritime vessel navigation in accordance with COLREGS. Object depth estimation using deep learning on stereoscopic images can predict the context of the stereoscopic output disparity map and improve distance perception of various objects in the environment.

Figure 7A:
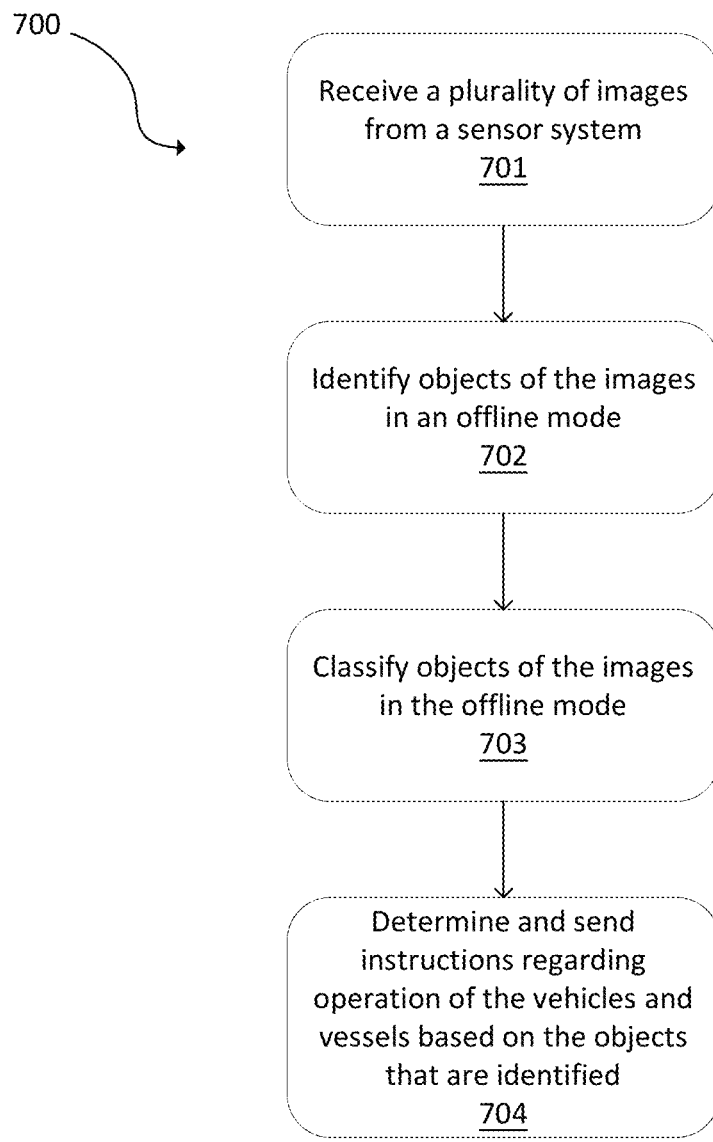
FIG. 7A is a flowchart of an embodiment of a method in accordance with the present disclosure.

FIG. 7A illustrates the method 700. At 501, a plurality of images from a sensor system is received at a processor. The images are from in or around a port. The processor can receive stereo feeds (e.g., a video from two modal cameras) and turn frames or parts of the stereo feed into images. Images also can be produced from other devices, such as other cameras or thermal cameras, and fused into a single or multiple output disparity maps. Objects in the images can be identified using the processor in an offline mode at 702.

Figure 11:
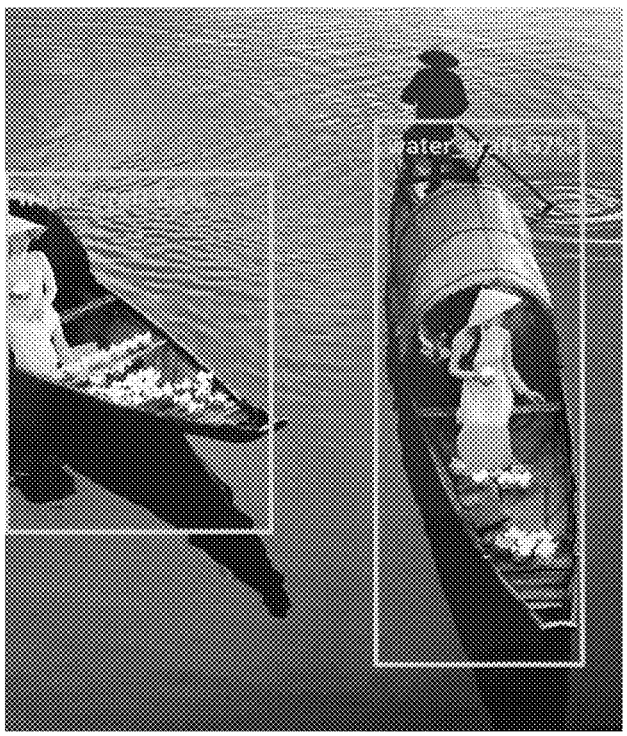
FIG. 11 illustrates exemplary image recognition in accordance with the present disclosure.
Figure 11:
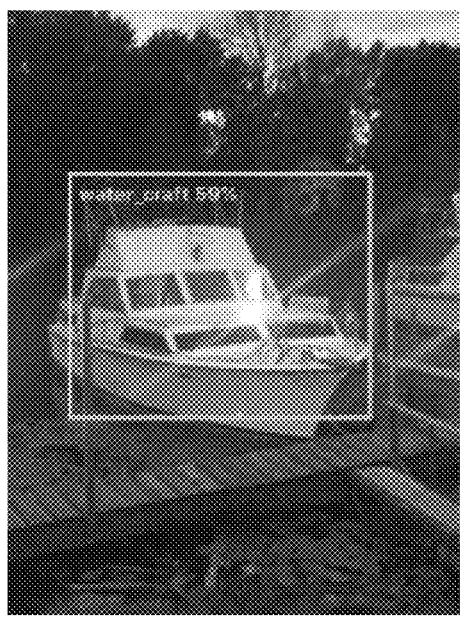
Figure 11:
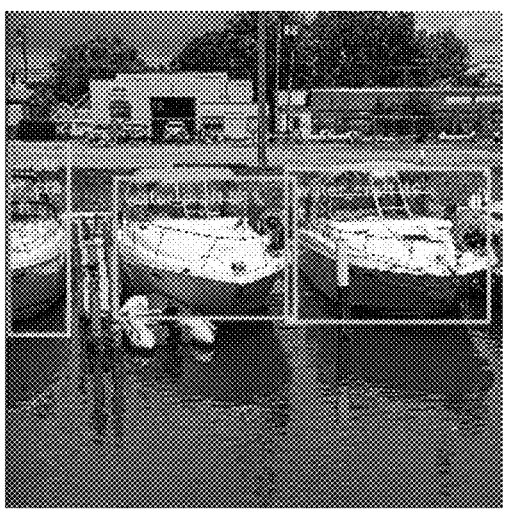
Figure 11:
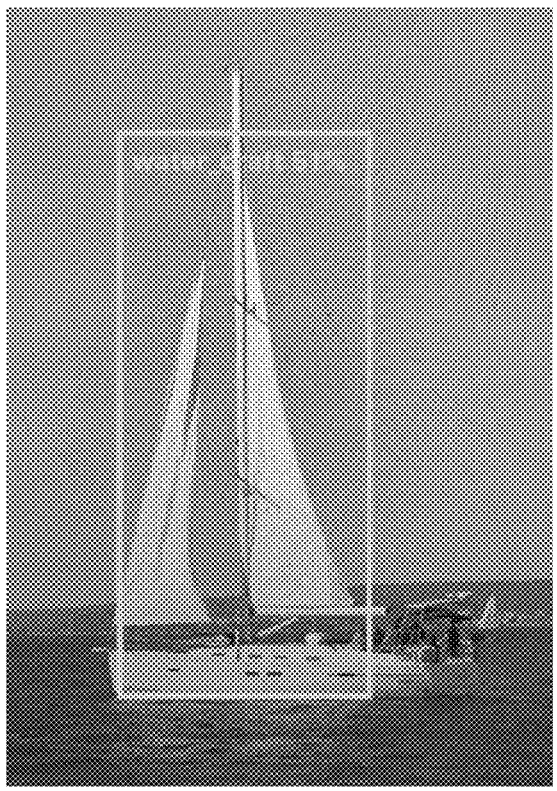

The objects in the images can be classified using the processor in the offline mode at 703. The objects can include, for example, a seashore, a watercraft, a vehicle, an iceberg, a canal entrance, a lock gate, a bridge, a static far object, a moving far object, plain sea, or other objects. The watercraft can include a personal non-powered vessel, recreational powered vessel, sailing yacht, cargo ship, cruise ship, coast guard boat, naval vessel, barge, tugboat, fishing vessel, workboat, under-powered vessel, anchored vessel, or other vessels. The vehicles can include cars, trucks, trains, forklifts, cranes, or other vehicles. The objects also can include people. The objects also can include navigation safety hazards. FIG. 7C is a chart showing exemplary object classification. FIG. 11 illustrates exemplary image recognition.

In an instance, images can be received by a trained neural network, such as an object detection network and object identification network. The neural network can be trained online on the cloud. However, once trained, the neural network binary can be deployed to an offline system to identify objects across particular categories or classify the entire image. The neural network can provide a bounding box (e.g., x cross y) or other graphical shape around an object in an image, which can size the object in the image using various methods, including using the diagonal length of the shape to infer size. The neural network also can provide a classification of the object in the bounding box with a confidence score. The identification and the classification can include using a CNN in the form of an object detection network or an object identification network.

The object classification network can perform operations like a scene classifier. Thus, the object classification network can take in an image frame and classify it into only one of the categories. An example of this includes receiving an input from the cameras and classifying the inputs as that of night-time images.

In one embodiment, three neural networks may be used. One neural network identifies objects in images, one neural network segments the image into regions that need to be classified, and another neural network classifies objects identified by the first neural network. Three neural networks may provide improved object detection speed. Three neural networks also can classify the whole scene in the image, including time of the day (e.g., dawn, dusk, night), the state of the vessels, if vessels in front are moving or static, and/or classify the watercraft or other objects identified by the object detection network.

In another embodiment, two neural networks are used. One neural network identifies objects in images and another neural network classifies objects identified by the first neural network. Two neural networks may provide improved object detection speed. Two neural networks also can classify the whole scene in the image, including time of the day (e.g., dawn, dusk, night), if vessels or vehicles in front are moving or static, and/or classify the boat or other vehicle identified by the object detection network.

In another embodiment, a single neural network identifies objects in an image and classifies these objects. In the embodiment with a single neural network, a second neural network can optionally be used for verification of the identification and classification steps. Use of a single neural network can provide sufficient results for port operations in the form of an end-to-end network.

Instructions regarding operation of the maritime vessel or vehicles in or around the port based on the objects that are identified are determined by and/or sent using the processor at 1204. The instructions can enable navigation of the maritime vessel in accordance with COLREGS and any other navigation safety procedures imposed locally by an inland navigation authority, such as a port authority.

The instructions to operate the vessel may not be provided by the object detection network. Rather, a separate algorithm may be used to send the instructions. The object detection network may provide weights to a grid over the map, including a 3D map constructed with LIDAR, radar, AID, and/or camera inputs via sensor fusion, which can then be used to suggest path or route changes.

In an instance, a speed or a heading of the maritime vessel or vehicle can be adjusted based on the instructions. The processor may send instructions to adjust propeller pitch, a bow thruster, a stern thruster, an azimuth thruster, the state of anchoring, the state of mooring, or the position of a rudder of a larger maritime vessel. The processor may send instructions to adjust a main thruster, an azimuth thruster, the pitch of a motor, or a rudder for a smaller maritime vessel, such as a speedboat.

Other inputs to the processor can be used to provide and/or send instructions for operation of the maritime vessel or vehicle. For example, radar, compass heading, GPS, other camera feeds, sonar, vessel specifications, safety alerts or bulletins, information from neighboring vessels, sea conditions (e.g., tide, swells, etc.), anemometer, microphone, thermal camera, and/or weather reports (e.g., wind speed, weather bulletins or alerts, or long-term weather forecasts) also can be used by the processor. The object detection network can use these inputs to determine instructions.

Stereoscopy, which can include the process of creating an input disparity map can be performed using the processor, which can use a CNN. The stereoscopy can be used for depth estimation or distance estimation. Multiple cameras can be used to perform stereoscopy. A single camera with multiple lenses also can be used to perform stereoscopy.

Heat maps or input disparity maps can be generated using the processor. The heat maps can be generated in an offline mode. Overlapping heat zones created by the 3D image on the navigation map can be used to determine route feasibility. The heat map generation can be optimized to run with GPUs. A neural network that generates heat maps can be trained with marine application datasets. Cameras can provide image data for the heat maps, and may provide images of objects either less than one mile in distance from the vessel or greater than or equal to one mile in distance from the vessel.

In an instance, a 2D grid map can contain navigation information. Each square in the grid has a weight. A higher weight may mean the vessel or vehicle should try to avoid the square. The path of the vessel or vehicle can be modified depending on these weights. The weights can change dynamically based on objects that are identified and/or classified. An algorithm can find the most feasible path based on the weights.

An estimate of object depth can be determined using the processor. An object depth estimate can be performed in an offline mode. For example, the object depth can be determined by predicting a disparity map and obtaining the object depth. This can be performed using techniques such as those disclosed in "Stereo Matching by Training a Convolutional Neural Network to Compare Image Patches" by Zbontar and LeCun (submitted 2015), the disclosure of which is incorporated by reference in its entirety.

Using deep learning (e.g., the CNN in the object detection network), object depth estimation can be performed using stereoscopic images to predict the disparity map and obtain the depth.

A distance of multiple objects in an environment can be inferred using the processor.

Route feasibility can be determined using the processor. Route feasibility can be generated in offline mode. Route feasibility can determine whether a path to a destination is feasible. This may be based on a heat map.

Navigation policy can be determined using the processor. Navigation policy can be generated in offline mode. In an instance, navigation policy makes a map appear infeasible if navigation is not possible. Navigation policy may be part of route feasibility. Navigation policy can keep a maritime vessel compliant with COLREGS or a vehicle compliant with driving regulations.

In an embodiment, route feasibility and navigation policy are used for complex routes. A mapping function or other details can be avoided in simpler situations, such as going between two points in a region that lacks obstructions or objects (e.g., open sea or an empty parking lot).

The processor can control maritime vessels and other vehicles at a port. This includes cargo ships, tugboats, fishing boats, and other maritime vessels. This also includes trucks, forklifts, cars, trains, cranes, and other vehicles. Many cranes are manually controlled by an operator, but a 3D map of the port or other area can enable remote operation and even fully-automated operation.

The processor can identify vessels or vehicles as objects and can be trained to know how each kind of vessel or vehicle can move. For example, the processor can be trained to know how much space a maritime vessel needs to turn.

The processor can identify damage to a structure in the port. The structure may be a dock, a buoy, or a ladder. Damage can be identified by comparing images against reference images. An alert or notification can be sent to the port operator about the damage. Damage can be identified by using the delta of the LIDAR point cloud. When there is damage, the static areas of the 3D map (constant for many days) will show a deviation from the norm. This can be used to infer damage.

The processor can identify areas of the port to dredge. Maritime vessel data, such as readings from a depth sensor can be sent to the processor. The processor can integrate these depth readings with a map of the port. In an instance, the GUI is a two-way communication program.

While providing vessels with situational awareness using port-based sensors, it also provides depth-sounder data from the vessel to the port. This data can be used to identify which areas of the port need to be dredged.

The instructions from the processor are determined to reduce fuel consumption, reduce time delays, or increase speed of unloading or loading. For example, the processor can schedule or route maritime vessels or vehicles to avoid wasting fuel. By knowing the discharge rate, the processor can predict when berths will become available for other vessels that are waiting. This can enable vessels in the waitlist to slow-steam and save fuel when berths are not going to be available soon. Currently, no one knows exactly when berths will become available due to inefficiencies in using draft marks, lack of automatic container tracking, and limited information that can shared using walkie-talkie communication. The processor also can optimize navigation once the vessels are inside the port by enabling better coordination between tugboats and vessels or otherwise optimizing movement of vessels and other vehicles.

In another example, the processor can count or containers or a volume of goods or otherwise analyze the location or goods. Volume of dry-bulk discharging can be calculated with draft. Container cargo can be tracked using cameras and LIDARs with CNNs, similar to how vessels are tracked. The processor can calculate when loading or unloading will be complete, so the processor can determine when the maritime vessel may leave. Based on this information, the port (using the processor) can optimize the schedule of maritime vessels entering the port. This saves fuel, can increase delivery speed, can keep goods fresher, can reduce worker overtime, and can improve crew scheduling. For example, trucks can be scheduled to arrive when the maritime vessel is ready to unload. Port capacity can be increased when efficiency is increased, which means that larger ports may not be required.

The processor also can direct maritime vessels to move more efficiently or safely. Optimal approaches to the port can be used, which limits the need for pilots.

As a benefit, control of the maritime vessels and vehicles can reduce the number of vehicles or workers on roadways or driving areas of a port. More workers can be moved to an operations center away from the vehicles. This increases worker safety.

The processor can track containers in the port. LIDAR and/or video can be used to track container in the port. The container can be identified by the sensor system by its logo in an image, identification data, RFID, GPS, or other data. For example, the sensor system can find discrete marks on the container, such as a logo or identification number. Tracking containers can be helpful to the port, owner of the goods, insurance companies, shipping companies, customs authorities, and security personnel.

The processor also can pinpoint containers that are available to customs for inspection. For example, the processor can identify container tampering in images.

The processor can identify violations of safety rules. The safety rules can include rules related to parking, driving, walking, or use of safety equipment. For example, the processor can identify workers not wearing a hard hat or safety vest.

The processor can identify discharge of ballast water. The draft of the vessel can be compared against an expected draft. Cargo discrepancies can be accounted for in this calculation. Ballast records can be audited when the processor notes that the vessel draft does not match expectations. This can be used for environmental compliance.

The processor can identify emergency situations, such as fires or chemical spills. The processor can coordinate emergency vehicle operations in an emergency.

Tugboats can coordinate through assistance of the processor. When multiple tugboats are directing a larger maritime vessel, tugboat thrust and heading can be controlled even when the tugboats are outside each other's line-of-sight.

In another instance, the processor can identify whales, dolphins, manatees, or other species. The processor can instruct maritime vessels to adjust speed or course. Data can be sent to environmental agencies or NGOs.

In another instance, the processor can assist with fishing operations. Harvesting near shore can be directed by the processor or smaller vessels can be directed to assist with a larger net. Navy minesweeping or the harbor patrol also can be directed using the processor.

The processor can enforce or note infractions of speed regulations or other regulations around the port.

A non-transitory computer readable medium can store a program configured to instruct a processor to execute an embodiment of the method 700.

A CNN or other deep learning module in the object determination network can be trained using the processor with at least one set of images. As disclosed herein, a CNN is a type of feed-forward artificial neural network in which the connectivity pattern between its neurons (i.e., pixel clusters) is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation.

CNNs may comprise of multiple layers of receptive fields. These are small neuron collections which process portions of the input image or images. The outputs of these collections are then tiled so that their input regions overlap, to obtain a better representation of the original image. This may be repeated for every such layer. Tiling allows CNNs to tolerate translation of the input image. CNN may have a 3D volumes of neurons. The layers of a CNN may have neurons arranged in three dimensions: width, height and depth. The neurons inside a layer are only connected to a small region of the layer before it, called a receptive field. Distinct types of layers, both locally and completely connected, are stacked to form a CNN architecture. CNNs exploit spatially local correlation by enforcing a local connectivity pattern between neurons of adjacent layers. The architecture thus ensures that the learnt filters produce the strongest response to a spatially local input pattern. Stacking many such layers leads to non-linear filters that become increasingly global (i.e., responsive to a larger region of pixel space). This allows the network to first create good representations of small parts of the input, then assemble representations of larger areas from them. In CNNs, each filter is replicated across the entire visual field. These replicated units share the same parameterization (weight vector and bias) and form a feature map. This means that all the neurons in a given convolutional layer detect exactly the same feature. Replicating units in this way allows for features to be detected regardless of their position in the visual field, thus constituting the property of translation invariance.

Together, these properties allow CNNs achieve better generalization on vision problems. Weight sharing also helps by dramatically reducing the number of free parameters being learnt, thus lowering the memory requirements for running the network. Decreasing the memory footprint allows the training of larger, more powerful networks. CNNs may include local or global pooling layers, which combine the outputs of neuron clusters. Pooling layers may also consist of various combinations of convolutional and fully connected layers, with pointwise nonlinearity applied at the end of or after each layer. A convolution operation on small regions of input is introduced to reduce the number of free parameters and improve generalization. One advantage of CNNs is the use of shared weight in convolutional layers, which means that the same filter (weights bank) is used for each pixel in the layer. This also reduces memory footprint and improves performance.

A CNN architecture may be formed by a stack of distinct layers that transform the input volume into an output volume (e.g., holding class scores) through a differentiable function. A few distinct types of layers may be used. The convolutional layer has a variety of parameters that consist of a set of learnable filters (or kernels), which have a small receptive field, but extend through the full depth of the input volume. During the forward pass, each filter may be convolved across the width and height of the input volume, computing the dot product between the entries of the filter and the input and producing a two-dimensional activation map of that filter. As a result, the network learns filters that activate when they see some specific type of feature at some spatial position in the input. By stacking the activation maps for all filters along the depth dimension, a full output volume of the convolution layer is formed. Every entry in the output volume can thus also be interpreted as an output of a neuron that looks at a small region in the input and shares parameters with neurons in the same activation map.

When dealing with high-dimensional inputs such as images, it may be impractical to connect neurons to all neurons in the previous volume because such a network architecture does not take the spatial structure of the data into account. CNNs may exploit spatially local correlation by enforcing a local connectivity pattern between neurons of adjacent layers. For example, each neuron is connected to only a small region of the input volume. The extent of this connectivity is a hyperparameter called the receptive field of the neuron. The connections may be local in space (along width and height), but always extend along the entire depth of the input volume. Such an architecture ensures that the learnt filters produce the strongest response to a spatially local input pattern. In one embodiment, training the CNN includes using transfer learning to create hyperparameters for each CNN. Transfer learning may include training a CNN on a very large dataset and then use the trained CNN weights either as an initialization or a fixed feature extractor for the task of interest.

Three hyperparameters can control the size of the output volume of the convolutional layer: the depth, stride and zero-padding. Depth of the output volume controls the number of neurons in the layer that connect to the same region of the input volume. All of these neurons will learn to activate for different features in the input. For example, if the first CNN layer takes the raw image as input, then different neurons along the depth dimension may activate in the presence of various oriented edges, or blobs of color. Stride controls how depth columns around the spatial dimensions (width and height) are allocated. When the stride is 1, a new depth column of neurons is allocated to spatial positions only 1 spatial unit apart. This leads to heavily overlapping receptive fields between the columns, and also to large output volumes. Conversely, if higher strides are used then the receptive fields will overlap less and the resulting output volume will have smaller dimensions spatially. Sometimes it is convenient to pad the input with zeros on the border of the input volume. The size of this zero-padding is a third hyperparameter. Zero padding provides control of the output volume spatial size. In particular, sometimes it is desirable to exactly preserve the spatial size of the input volume.

In some embodiments, a parameter sharing scheme may be used in layers to control the number of free parameters. If one patch feature is useful to compute at some spatial position, then it may also be useful to compute at a different position. In other words, denoting a single 2-dimensional slice of depth as a depth slice, neurons in each depth slice may be constrained to use the same weights and bias.

Since all neurons in a single depth slice may share the same parametrization, then the forward pass in each depth slice of the layer can be computed as a convolution of the neuron's weights with the input volume. Therefore, it is common to refer to the sets of weights as a filter (or a kernel), which is convolved with the input. The result of this convolution is an activation map, and the set of activation maps for each different filter are stacked together along the depth dimension to produce the output volume.

Sometimes, parameter sharing may not be effective, for example, when the input images to a CNN have some specific centered structure, in which completely different features are expected to be learned on different spatial locations.

Another important concept of CNNs is pooling, which is a form of non-linear down-sampling. There are several non-linear functions to implement pooling among which max pooling is one. Max pooling partitions the input image into a set of non-overlapping rectangles and, for each such sub-region, outputs the maximum. Once a feature has been found, its exact location may not be as important as its rough location relative to other features. The function of the pooling layer may be to progressively reduce the spatial size of the representation to reduce the amount of parameters and computation in the network, and hence to also control overfitting. A pooling layer may be positioned in-between successive conv layers in a CNN architecture.

Another layer in a CNN may be a ReLU (Rectified Linear Units) layer. This is a layer of neurons that applies a non-saturating activation function. A ReLU layer may increase the nonlinear properties of the decision function and of the overall network without affecting the receptive fields of the convolution layer.

Finally, after several convolutional and/or max pooling layers, the high-level reasoning in the neural network is completed via fully connected layers. Neurons in a fully connected layer have full connections to all activations in the previous layer. Their activations can hence be computed with a matrix multiplication followed by a bias offset.

In some embodiments, dropout techniques may be utilized to prevent overfitting. As referred to herein, dropout techniques are a regularization technique for reducing overfitting in neural networks by preventing complex co-adaptations on training data. The term "dropout" refers to dropping out units (both hidden and visible) in a neural network. For example, at each training stage, individual nodes may be either "dropped out" of the CNN with probability 1-p or kept with probability p, so that a reduced CNN remains. In some embodiments, incoming and outgoing edges to a dropped-out node may also be removed. Only the reduced CNN is trained. Removed nodes may then be reinserted into the network with their original weights.

In training stages, the probability a hidden node will be retained (i.e., not dropped) may be approximately 0.5. For input nodes, the retention probability may be higher. By avoiding training all nodes on all training data, dropout decreases overfitting in CNNs and significantly improves the speed of training.

Many different types of CNNs may be used in embodiments of the present disclosure. Different CNNs may be used based on certain information inputs, applications, or other circumstances. The configuration of a CNN may change based on the sensor information that is provided or the type of maritime vessel.

In an example, the penultimate layer of TensorFlow's Inception (neural-network) is retrained with images of plain sea, boat, ships, icebergs, or other vehicles/objects. Image recognition is performed on the new network in an offline environment and to validate the accuracy using testing images.

In an example, three training datasets are used. First, a temporary dataset (TDS) that includes images collected by crawling the web. Second, the KITTI 2012, KITTI 2015, and Middlebury stereo datasets for training and evaluation of the CNN for distance estimation from stereoscopic images task.

The KITTI stereo data set is a collection of rectified image pairs taken from two video cameras mounted on the roof of a car, roughly 54 centimeters apart. The images were recorded while driving in and around the city of Karlsruhe, in sunny and cloudy weather, at daytime. The images were taken at a resolution of 1240×376. A rotating laser scanner mounted behind the left camera recorded ground truth depth, labeling around 30% of the image pixels. Two KITTI stereo data sets exist: KITTI 2012 and, the newer, KITTI 2015. For the task of computing stereo they are nearly identical, with the newer data set improving some aspects of the optical flow task. The 2012 data set contains 194 training and 195 testing images, while the 2015 data set contains 200 training and 200 testing images. There is a subtle but important difference introduced in the newer data set: vehicles in motion are densely labeled and car glass is included in the evaluation. This emphasizes the method's performance on reflective surfaces.

The image pairs of the Middlebury stereo data set are indoor scenes taken under controlled lighting conditions. Structured light was used to measure the true disparities with higher density and precision than in the KITTI dataset. The data sets were published in five separate works in the years 2001, 2003, 2005, 2006, and 2014.

A dataset (ADS) can be collected by capturing images using multiple cameras. In this example, the images can be classified using the following labels: powered boat, sailing yacht, cargo ship, cruise ship, coast guard boat, naval vessel, lock bridge, normal bridge, static far object, moving far object, icebergs, shore, and other labels. The different categories into which the dataset is to be labelled are described above, but other labels are possible. Given any image, the neural net classifies the image into one of the above categories. Also, if there is an overlap between categories, classifying an image into one of the two categories is sufficient.

Figure 12:
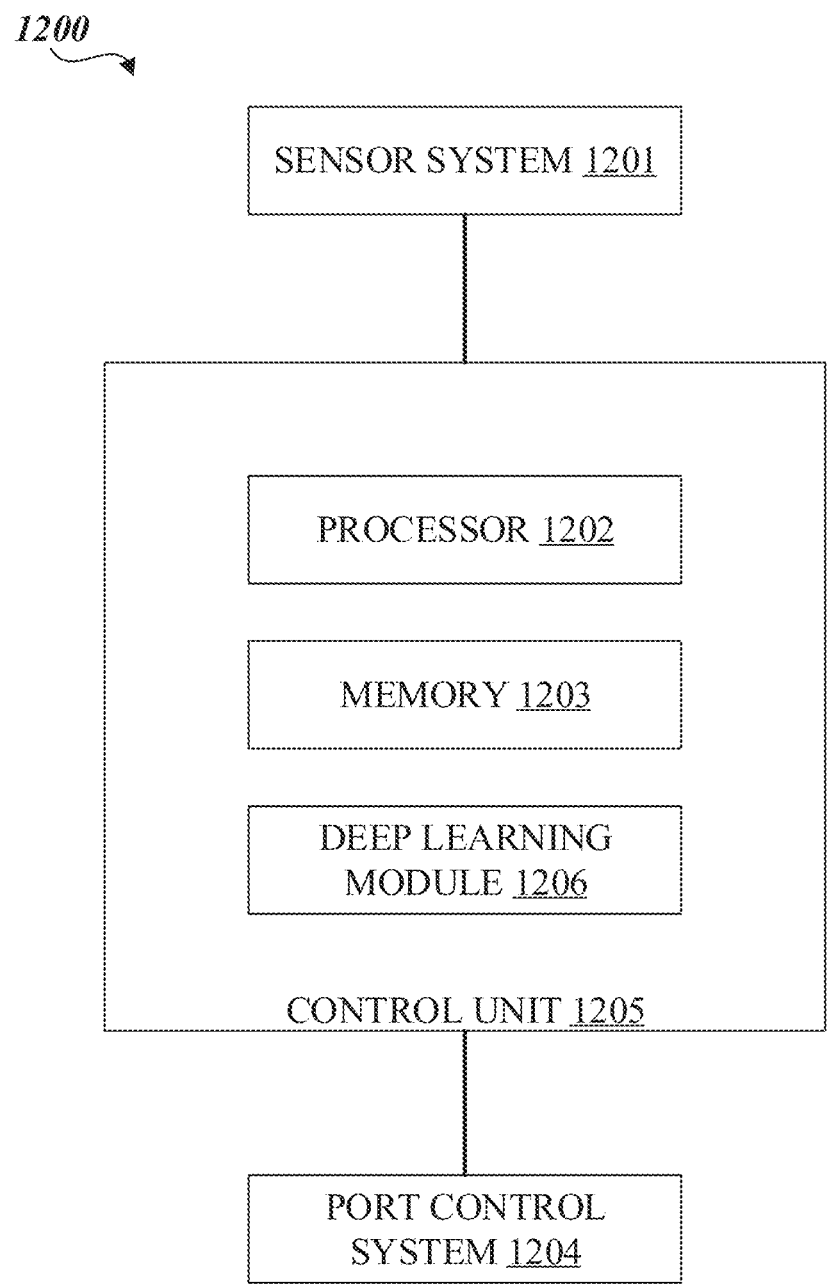
FIG. 12 is a block diagram of a system in accordance with the present disclosure.

FIG. 12 is a block diagram of a system 200. The CNN can be created and trained to identify and classify objects in a real time offline environment. In simple terms, the system can identify seashore, boats, ships, icebergs, plain sea, vehicles, people, hazards and other possible objects in or around a port in real time based on an image feed from the cameras.

In an instance, the ship classifier uses Inception-v3 (open source) and trains the penultimate layer. Inception-v3 is a pre-trained deep learning model. It was developed by Google and has been trained for the ImageNet Competition using the data from 2012. This model has high classification performance and is available in TensorFlow.

The penultimate layer of the Inception-v3 is retrieved as a feature vector for each image. The last layer of the convolutional neural network corresponds to the classification step. As it has been trained for the ImageNet dataset, the categories that it will be outputted may not correspond to the categories in the Product Image Classification dataset for maritime applications.

The output of the next-to-last layer, however, corresponds to features that are used for the classification in Inception-v3. These features can be useful for training another classification model, so the output of this layer is extracted.

This approach is referred to as transfer learning, and can take a pre-trained model and use it to extract image features that are then used to train a new classifier.

During preprocessing, a set of labeled images in a Google Cloud Storage bucket are preprocessed to extract the image features from the penultimate layer of the Inception network. Each image can be processed independently and in parallel using Google Cloud Dataflow. Each image is processed to produce its feature representation in the form of a k-dimensional vector of floats (e.g., 2,048 dimensions). The preprocessing can include converting the image format, resizing images, and/or running the converted image through a pre-trained model to get the embeddings. Finally the output may be written back to Google Cloud Storage so that it can be reused for training.

Figure 8:
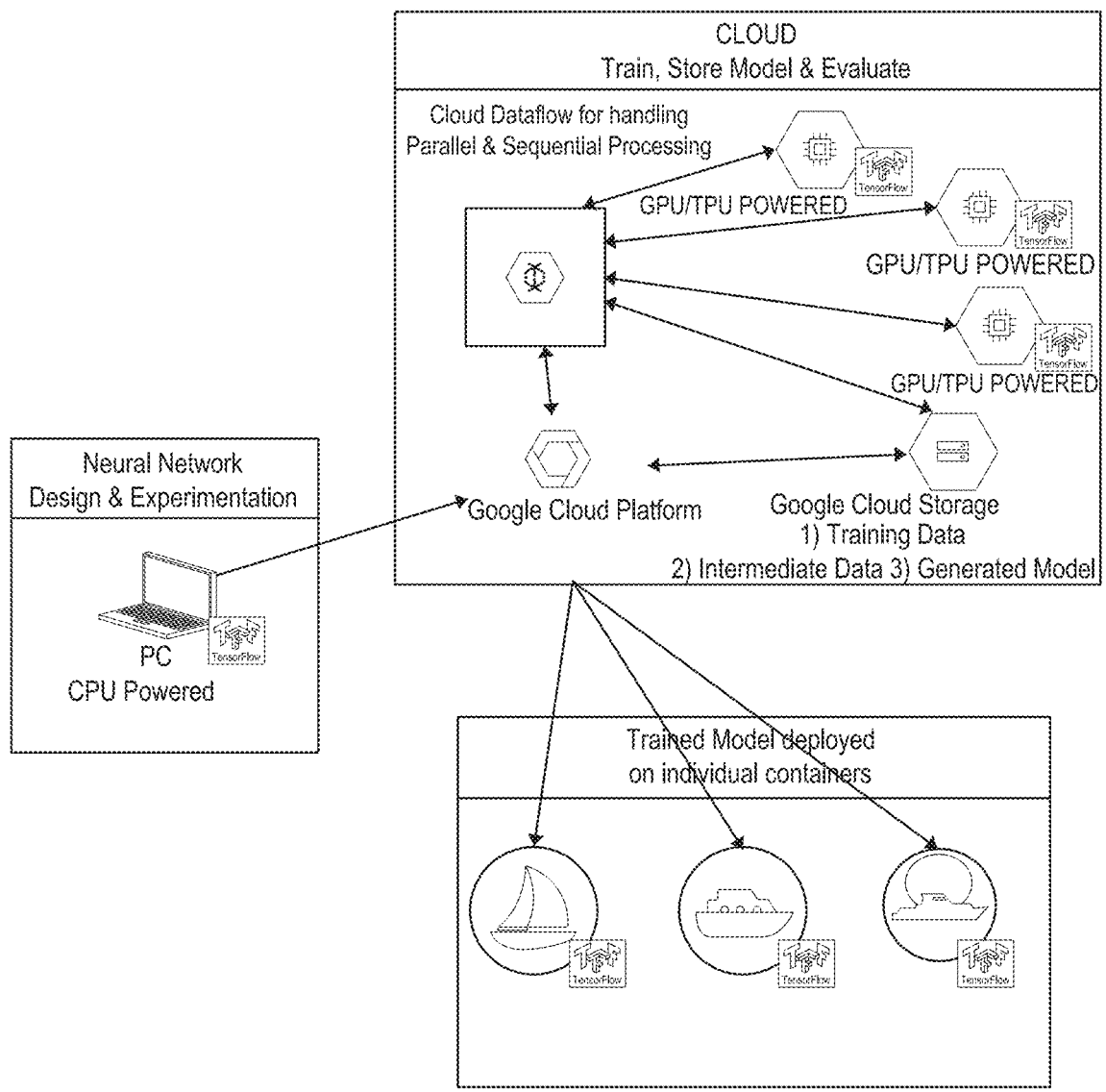
FIG. 8 is a diagram showing an individual neural network's lifecycle.
Figure 9:
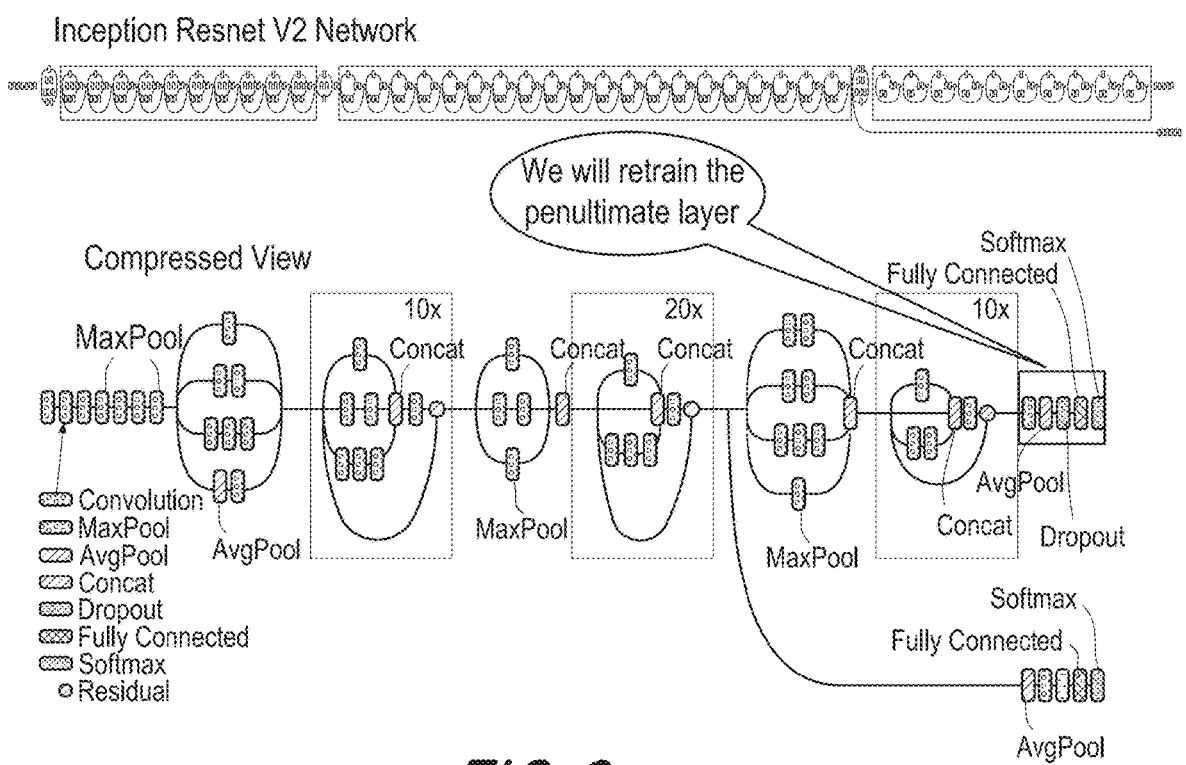
FIG. 9 is a diagram showing the inception resnet V2 network.
Figure 10:
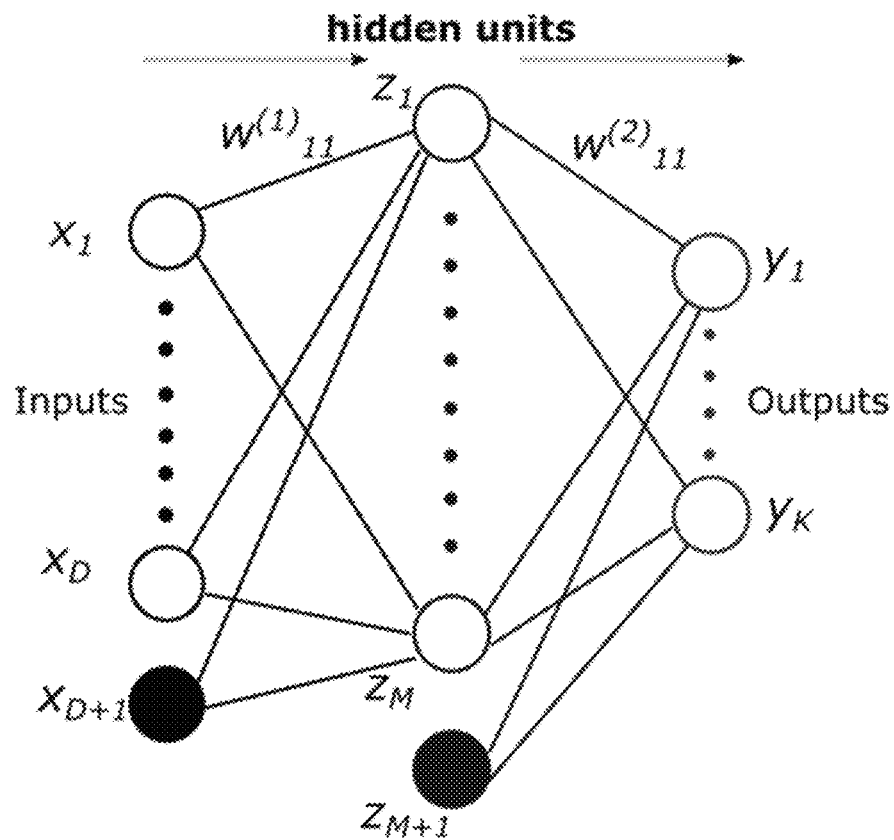
FIG. 10 illustrates a neural network for ship classifier type 2 (SCT2).

A neural network can be graphically represented as in FIG. 10. FIG. 8 is a diagram showing an individual neural network's lifecycle and FIG. 9 is a diagram showing the inception resnet V2 network. As observed in the FIG. 10, there are totally three layers in the neural network. The first layer includes (d+1) units, each represents a feature of image. There is one extra unit representing the bias.

The second layer in neural network is referred to as hidden units. Herein, m+1 denotes the number of hidden units in hidden layer. There also can be an additional bias node at the hidden layer. Hidden units can be considered as the learned features extracted from the original data set. Since a number of hidden units can represent the dimension of learned features in neural network, an appropriate number of hidden units can be selected by a user.

Too many hidden units may lead to the slow training phase while too few hidden units may cause an under-fitting problem.

The third layer is referred to as the output layer. The value of 1th unit in the output layer represents the probability of a certain image belongs to the category "1." Since twelve possible label categories are present, there are twelve units in the output layer.

The reference "k" denotes the number of output units in output layer (k=12). The parameters in neural network model are the weights associated with the hidden layer units and the output layers units. In a neural network with three layers (input, hidden, output), two matrices may be used to represent the model parameters.

W(1)∈Rm×(d+1) is the weight matrix of connections from input layer to hidden layer. Each row in this matrix corresponds to the weight vector at each hidden layer unit.

W(2)∈Rk×(m+1) is the weight matrix of connections from hidden layer to output layer. Each row in this matrix corresponds to the weight vector at each output layer unit. It can be assumed that there are n training samples when performing learning task of neural network.

The number of hidden layers will likely be more than three in a neural network that is designed for port applications. The activation function used here is sigmoid, but other activation functions are possible.

Regularization can be performed to avoid an overfitting problem. The learning model can be best fit with the training data, but may give poor generalization when tested with validation data. A regularization term can be added into an error function to control the magnitude of parameters in neural network. The objective function can be written as follows.

$$\tilde{J}(W^{(1)}, W^{(2)}) = \qquad \text{(Equation 1)}$$
$$J(W^{(1)}, W^{(2)}) + \frac{\lambda}{2n}\left(\sum_{j=1}^{m}\sum_{p=1}^{d+1}(w_{jp}^{(1)})^2 + \sum_{l=1}^{k}\sum_{j=1}^{m+1}(w_{lj}^{(2)})^2\right)$$

In these equations, d is the number of pixels in an image, m+1 is the number of hidden units, 1 is the probability of the output category, k is the number of output units in the output layer, W(1) are the weights attached to the first layer of the neural network, W(2) are the weights attached to the second layer of the neural network, J is the loss function, and λ is the regularization coefficient (e.g., hyper parameter).

With respect to data collection, a synchronizing software can update the cloud with the data present in the onboard hard disk. For example, the Intel NUC computer present in the ship may be connected to the internet using a mobile internet dongle present in the ship and/or using ports' Wi-Fi when a ship docks for loading and/or unloading.

In an example, the neural network framework may be TensorFlow 1.0. The algorithm may be written in Python.

Data about vessels or vehicles can be stored, which may be used for insurance claims or for other investigations. This can include sensor readings, videos, measurements, navigation settings for the vessel, or other data. This vessel data may be encrypted and can include a digital signature.

Weather information also can be determined. Wind speed can be determined from an ultrasound anemometer or other devices. Other weather information can be transmitted to the processor.

Figure 7B:
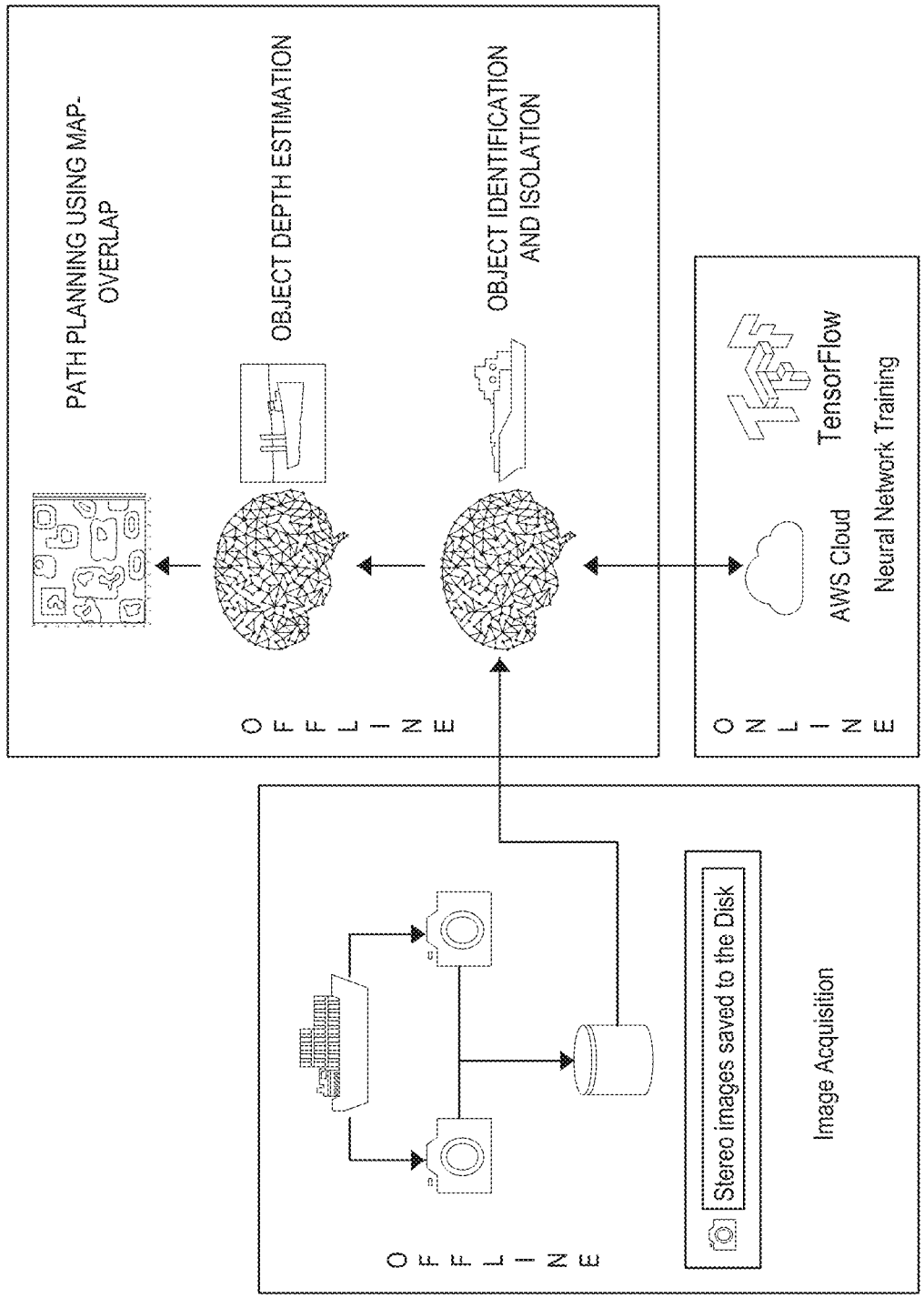
FIG. 7B is a diagram showing a high-level architecture in accordance with the present disclosure.
Figure 7C:
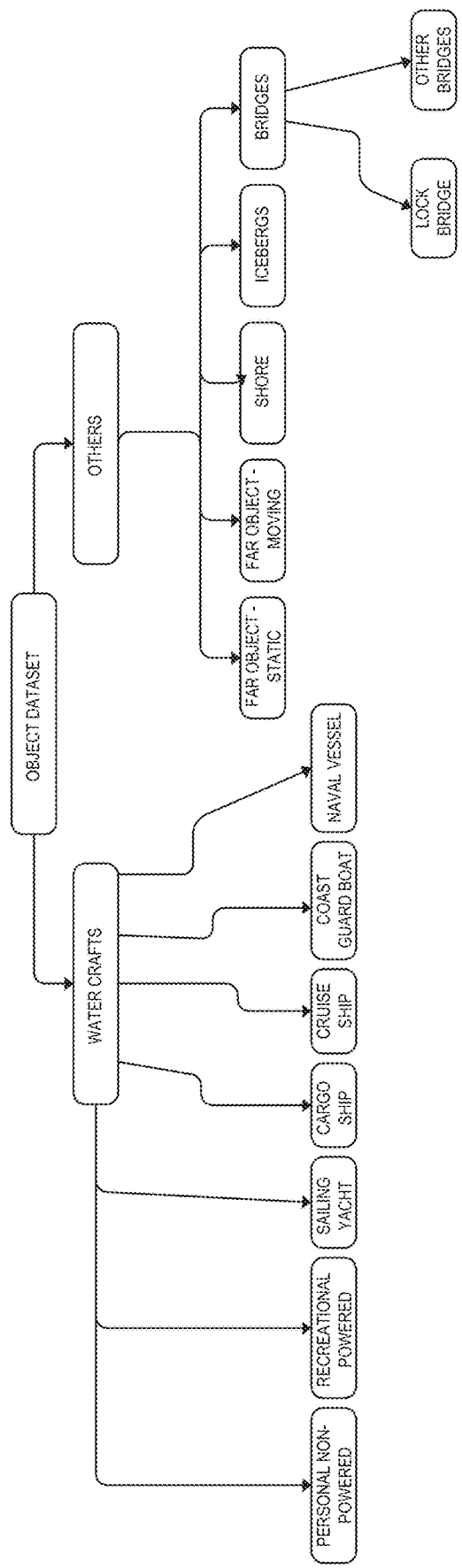
FIG. 7C is a chart showing exemplary object classification in accordance with the present disclosure.

FIG. 12 is a block diagram of a system 1200 and FIG. 7B is a diagram showing a high-level architecture in accordance with the present disclosure. The system 1200 in FIG. 12 includes a control unit 1205. The control unit 1205 includes a processor 1202 and a memory 1203. The control unit 1205 is in electronic communication with sensors and other devices, represented by the box 1201. The control unit 1205 also is in electronic communication with a port control system 1204. The control unit 1205 also may be in electronic communication with a power supply (not illustrated).

The box 1201 can include a sensor system disposed on a maritime vessel or other vehicle and/or disposed in or around a port. For example, the sensor system can include a pair of stereoscopic cameras, a radar system, and/or a compass. Fixed sensor systems may not include a compass. Other components, such as those disclosed herein, are possible.

The processor 1202 is configured to receive images from the sensor system, identify objects in the images in an offline mode, classify objects in the images in the offline mode, and send instructions regarding operation of a maritime vessel or vehicle based on the objects that are identified. The processor 1202 can send instructions to the port control system 1204, which can control speed, steering, and other functions of the maritime vessel or vehicle. The instructions can enable navigation in accordance with COLREGS.

The memory 1203, which is an example of an electronic storage device, can include a library of entries.

The processor 1202 can be configured to perform stereoscopy, generate heat maps, and/or estimate object depth. These functions can be performed in an offline mode. Object depth can be estimated by predicting a disparity map and obtaining the object depth. The processor 1202 also can be configured to infer the distance of multiple objects in an environment.

The processor 1202 can be configured to determine or predict route feasibility, which can be performed in an offline mode.

The processor 1202 can be configured to determine a navigation policy, which can be performed in an offline mode.

The processor 1202 can be configured to perform other functions described herein.

Offline mode can mean that the control unit 1205 or processor 1202 does not rely on internet. Thus, the control unit 1205 or processor 1202 may be connected to sensors, vessel systems, or other measurement devices. While the offline mode may not rely on internet, this does not include GPS, AIS, or satellite compass data. The control unit 1205 may cache the last data in offline mode, but can operate without an internet connection.

Operating in offline mode poses particular challenges. First, the neural network cannot learn from the experiences of other ports. Thus, if one sensor sees something unique it cannot quickly update the information to other ports. Second, offline mode reduces computing power because access to the cloud is lost. The neural network may need to run on a mid-range GPU without a latency. Third, existing online API services cannot be used for object detection. Fourth, intense computations like data pre-processing and training cannot be done.

Offline mode can be overcome by storing data locally on, for example, 20 TB hard disks or other large storage units. The data can be periodically uploaded onto the cloud and a series of pre-processing may be done to keep only one copy of a similar experience but keep all copies of unique experiences. Then the data may be sent for annotation. The neural network can be trained on the new set of data and the binary file is created which is periodically deployed.

While offline mode is disclosed in an embodiment, the various functions or overall operation disclosed herein can be performed in an online mode. However, offline mode can be used as a fail-safe, such as during power failures or cyber-attacks.

The control unit 1205 can include a deep learning module 1206 (e.g., an object detection network module) and/or the processor 1202 can be configured to operate a deep learning module 1206. For example, the deep learning module 1206 can be stored on the memory 1203. Thus, the processor 1202 can include TensorFlow layers. One or more of receiving the identifying the objects, classifying the objects, and sending the instructions can be based on a CNN.

The deep learning module 1206 can include a CNN with other algorithms or software components before and/or after the CNN. For example, resnet can be used before or after the CNN.

The processor 1202 may be in communication with and/or include a memory 1203. The memory 1203 can be, for example, a Random-Access Memory (RAM) (e.g., a dynamic RAM, a static RAM), a flash memory, a removable memory, and/or so forth. In some instances, instructions associated with performing the operations described herein (e.g., the method 700) can be stored within the memory 1203 and/or a storage medium (which, in some embodiments, includes a database in which the instructions are stored) and the instructions are executed at the processor 1202.

In some instances, the processor 1202 includes one or more modules and/or components. Each module/component executed by the processor 1202 can be any combination of hardware-based module/component (e.g., a field-programmable gate array (FPGA), an application specific integrated circuit (ASIC), a digital signal processor (DSP)), software-based module (e.g., a module of computer code stored in the memory 1203 and/or in the database, and/or executed at the processor), and/or a combination of hardware- and software-based modules. Each module/component executed by the processor 1202 is capable of performing one or more specific functions/operations as described herein. In some instances, the modules/components included and executed in the processor 1202 can be, for example, a process, application, virtual machine, and/or some other hardware or software module/component. The processor 1202 can be any suitable processor configured to run and/or execute those modules/components. The processor 1202 can be any suitable processing device configured to run and/or execute a set of instructions or code. For example, the processor can be a general purpose processor, a central processing unit (CPU), an accelerated processing unit (APU), a field-programmable gate array (FPGA), an application specific integrated circuit (ASIC), a digital signal processor (DSP), and/or the like.

The component(s), e.g., component(s) shown in FIG. 12, executed by the processor 202, can include a deep learning module 206 (e.g., a CNN module). It can include multiple deep learning modules (202) executed in parallel, with each graph performing either a comprehensive or redundantly parallel processes determined by architecture and training dataset. The deep learning module 206 can have one of the configurations described further herein. Rooted in neural network technology, deep learning is a probabilistic graph model with many neuron layers, commonly known as a deep architecture. Deep learning technology processes the information such as image, text, voice, and so on in a hierarchical manner. In using deep learning in the present disclosure, feature extraction is accomplished automatically using learning from data. This is advantageous over previous approaches which extract features based on experts' understanding of a set of images. For example, objects in images can be classified using the deep learning module based on the one or more extracted features.

Generally speaking, deep learning (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep network, there are many layers between the input and output, allowing the algorithm to use multiple processing layers, composed of multiple linear and non-linear transformations.

Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). Deep learning can provide efficient algorithms for unsupervised or semi-supervised feature learning and hierarchical feature extraction.

Research in this area attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain.

There are many variants of neural networks with deep architecture depending on the probability specification and network architecture, including, but not limited to, Deep Belief Networks (DBN), Restricted Boltzmann Machines (RBM), LSTMs, RNNs, GANs, and Auto-Encoders. Another type of deep neural network, a CNN, can be used for image classification. Although other deep learning neural networks can be used, an exemplary embodiment of the present disclosure is described using a TensorFlow architecture to illustrate the concepts of a CNN. The actual implementation may vary depending on the size of images, the number of images available, and the nature of the problem. Other layers may be included in the object detection network besides the neural networks disclosed herein.

In an embodiment, the deep learning model is a machine learning model. Machine learning can be generally defined as a type of artificial intelligence (AI) that provides computers with the ability to learn without being explicitly programmed. Machine learning focuses on the development of computer programs that can teach themselves to grow and change when exposed to new data. Machine learning explores the study and construction of algorithms that can learn from and make predictions on data. Such algorithms overcome following strictly static program instructions by making data driven predictions or decisions, through building a model from sample inputs.

In some embodiments, the deep learning model is a generative model. A generative model can be generally defined as a model that is probabilistic in nature. In other words, a generative model is one that performs forward simulation or rule-based approaches. The generative model can be learned (in that its parameters can be learned) based on a suitable training set of data. In one embodiment, the deep learning model is configured as a deep generative model. For example, the model may be configured to have a deep learning architecture in that the model may include multiple layers, which perform a number of algorithms or transformations.

In another embodiment, the deep learning model is configured as a neural network. In a further embodiment, the deep learning model may be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In one embodiment, the deep learning model used for the port applications disclosed herein is configured as an AlexNet. For example, an AlexNet includes a number of convolutional layers (e.g., 5) followed by a number of fully connected layers (e.g., 3) that are, in combination, configured and trained to classify images. In another such embodiment, the deep learning model used for the port applications disclosed herein is configured as a GoogleNet. For example, a GoogleNet may include layers such as convolutional, pooling, and fully connected layers such as those described further herein configured and trained to classify images. While the GoogleNet architecture may include a relatively high number of layers (especially compared to some other neural networks described herein), some of the layers may be operating in parallel, and groups of layers that function in parallel with each other are generally referred to as inception modules. Other of the layers may operate sequentially. Therefore, GoogleNets are different from other neural networks described herein in that not all of the layers are arranged in a sequential structure. The parallel layers may be similar to Google's Inception Network or other structures.

In a further such embodiment, the deep learning model used for the port applications disclosed herein is configured as a Visual Geometry Group (VGG) network. For example, VGG networks were created by increasing the number of convolutional layers while fixing other parameters of the architecture. Adding convolutional layers to increase depth is made possible by using substantially small convolutional filters in all of the layers. Like the other neural networks described herein, VGG networks were created and trained to classify images. VGG networks also include convolutional layers followed by fully connected layers.

In some such embodiments, the deep learning model used for the port applications disclosed herein is configured as a deep residual network. For example, like some other networks described herein, a deep residual network may include convolutional layers followed by fully-connected layers, which are, in combination, configured and trained for image classification. In a deep residual network, the layers are configured to learn residual functions with reference to the layer inputs, instead of learning unreferenced functions. In particular, instead of hoping each few stacked layers directly fit a desired underlying mapping, these layers are explicitly allowed to fit a residual mapping, which is realized by feedforward neural networks with shortcut connections. Shortcut connections are connections that skip one or more layers. A deep residual net may be created by taking a plain neural network structure that includes convolutional layers and inserting shortcut connections which thereby takes the plain neural network and turns it into its residual learning counterpart.

In a further such embodiment, the deep learning model used for the port applications disclosed herein includes one or more fully connected layers configured for classifying defects on the specimen. A fully connected layer may be generally defined as a layer in which each of the nodes is connected to each of the nodes in the previous layer. The fully connected layer(s) may perform classification based on the features extracted by convolutional layer(s), which may be configured as described further herein. The fully connected layer(s) are configured for feature selection and classification. In other words, the fully connected layer(s) select features from a feature map and then classify the objects in the image(s) based on the selected features. The selected features may include all of the features in the feature map (if appropriate) or only some of the features in the feature map.

If the deep learning model outputs a classification for an object detected in the image, the deep learning model may output an image classification, which may include a classification result per image with a confidence associated with each classification result. The results of the image classification can also be used as described further herein. The image classification may have any suitable format (such as an image or object ID, an object description such as "forklift," etc.). The image classification results may be stored and used as described further herein.

In some embodiments, the information determined by the deep learning model includes features of the images extracted by the deep learning model. In one such embodiment, the deep learning model includes one or more convolutional layers. The convolutional layer(s) may have any suitable configuration known in the art and are generally configured to determine features for an image as a function of position across the image (i.e., a feature map) by applying a convolution function to the input image using one or more filters. In this manner, the deep learning model (or at least a part of the deep learning model) may be configured as a CNN. For example, the deep learning model may be configured as a CNN, which is usually stacks of convolution and pooling layers, to extract local features. The embodiments described herein can take advantage of deep learning concepts such as a CNN to solve the normally intractable representation inversion problem. The deep learning model may have any CNN configuration or architecture known in the art. The one or more pooling layers may also have any suitable configuration known in the art (e.g., max pooling layers) and are generally configured for reducing the dimensionality of the feature map generated by the one or more convolutional layers while retaining the most important features.

The features determined the deep learning model may include any suitable features described further herein or known in the art that can be inferred from the input described herein (and possibly used to generate the output described further herein). For example, the features may include a vector of intensity values per pixel. The features may also include any other types of features described herein, e.g., vectors of scalar values, vectors of independent distributions, joint distributions, or any other suitable feature types known in the art.

In general, the deep learning model described herein is a trained deep learning model. For example, the deep learning model may be previously trained by one or more other systems and/or methods. The deep learning model is already generated and trained and then the functionality of the model is determined as described herein, which can then be used to perform one or more additional functions for the deep learning model.

In an exemplary embodiment, the features are extracted from images using a CNN. The CNN has one or more convolutional layers, and each convolutional layer is usually followed by a subsampling layer. Convolutional networks are inspired by visual systems structure. The visual cortex contains a complex arrangement of cells. These cells are sensitive to small sub-regions of the visual field, called a receptive field. A small region in the input is processed by a neuron in the next layer. Those small regions are tiled up to cover the entire input images.

Each node in a convolutional layer of the hierarchical probabilistic graph can take a linear combination of the inputs from nodes in the previous layer, and then applies a nonlinearity to generate an output and pass it to nodes in the next layer. To emulate the mechanism of the visual cortex, convolutional neural networks first convolve the input image with a small filter to generate feature maps (each pixel on the feature map is a neuron corresponds to a receptive field). Each map unit of a feature map is generated using the same filter. In some embodiments, multiple filters may be used and a corresponding number of feature maps will result. A subsampling layer computes the max or average over small windows in the previous layer to reduce the size of the feature map, and to obtain a small amount of shift invariance. The alternate between convolution and subsampling can be repeated multiple times. The final layer is fully connected traditional neural network. From bottom to top, the input pixel value was abstracted to local edge pattern to object part to final object concept.

As stated above, although a CNN is used herein to illustrate the architecture of an exemplary deep learning system, the present disclosure is not limited to a CNN. Other variants of deep architectures may be used in embodiments; for example, Auto-Encoders, DBNs, and RBMs, can be used to discover useful features from unlabeled images.

Training data may be inputted to model training (e.g., CNN training, RNN training, LSTM training, etc.), which may be performed in any suitable manner. For example, the model training may include inputting the training data to the deep learning model (e.g., a CNN) and modifying one or more parameters of the model until the output of the model is the same as (or substantially the same as) the labels assigned to the data. Model training may generate one or more trained models, which may then be sent to model selection, which is performed using validation data. The results that are produced by each one or more trained models for the validation data that is input to the one or more trained models may be compared to the labels assigned to the validation data to determine which of the models is the best model. For example, the model that produces results that most closely match the validation data labels may be selected as the best model. Test data may then be used for model evaluation of the model that is selected (e.g., the best model). Model evaluation may be performed in any suitable manner. For example, the test data may be input to the best model and the results produced by the best model for the test data may be compared to the labels for the test data to determine how closely the results produced by the best model match the labels. Best model may also be sent, to model deployment in which the best model may be sent to the port for use (post-training mode). The best model may then be applied to additional images, data, output, etc. generated by or provided to the port.

As can be seen from the description of the embodiments provided herein, therefore, the embodiments described herein provide a number of new and advantageous features and/or functionality.

The embodiments disclosed herein also can be applied to other water-based or land-based freight facilities. Locks, marinas, fisheries, or areas with high-density waterway traffic and interaction with land can benefit from the embodiments disclosed herein.

While disclosed specifically with ports, the embodiments disclosed herein also can be adapted for construction zones, farms, industrial plants, warehouses, mines, landfills, or other terrestrial operations. Hazardous areas can be avoided by vehicles. Vehicles may be remotely operated using information from the systems disclosed herein. Loading and unloading operations and mechanisms can be optimized.

Although the present disclosure has been described with respect to one or more particular embodiments, it will be understood that other embodiments of the present disclosure may be made without departing from the scope of the present disclosure.

The following are sample claims that are presented for illustrative purposes and are not intended to be limiting.

Example Embodiments

Various example embodiments of methods, systems and apparatuses relating to port navigation assistance can be found in one or more of the following clauses.

Clause 1. A support structure configured to be placed at or proximate to a port, the support structure comprising:
  a mounting frame; and
  a plurality of sensing devices supported by the mounting frame, wherein the plurality of sensor devices comprises a camera, a LIDAR unit, a radar unit.

Clause 2. The support structure of any of the previous clauses, further comprising one or more mounting poles supporting the mounting frame.

Clause 3. The support structure of any of the previous clauses, wherein the mounting frame comprises a vertical base and a horizontal arm projecting away from the vertical base in a first direction.

Clause 4. The support structure of clause 3, wherein the first direction is perpendicular to a longitudinal axis of the vertical base.

Clause 5. The support structure of any of clauses 3 or 4, wherein the horizontal arm is a first horizontal arm projecting away from an upper portion of the vertical base in the first direction, wherein the mounting frame further comprises a second horizontal arm projecting away from a lower portion of the vertical base in the first direction.

Clause 6. The support structure of any of the previous clauses, further comprising a camera mount coupled to the vertical base of the mounting frame and configured to support the camera.

Clause 7. The support structure of clause 6, wherein the camera is an omnidirectional camera.

Clause 8. The support structure of any of clauses 6 or 7, wherein the camera is coupled to the camera mount and extends a first distance away from the mounting frame in a first direction that is perpendicular to the vertical base of the mounting frame.

Clause 9. The support structure of any of clauses 6 to 8, wherein the camera is a thermal camera.

Clause 10. The support structure of any of clauses 6 to 9, wherein the camera is oriented in the first direction.

Clause 11. The support structure of any of clauses 6 to 10, wherein the camera is a pan tilt zoom (PTZ) camera.

Clause 12. The support structure of any of clauses 6 to 11, wherein the camera is an omnidirectional, and wherein the plurality of sensors further comprises a thermal camera.

Clause 13. The support structure of clause 12, wherein the thermal camera is proximate the LIDAR unit relative to the omnidirectional camera.

Clause 14. The support structure of any of clauses 12 or 13, wherein the thermal camera is proximate the radar unit relative to the omnidirectional camera.

Clause 15. The support structure of clauses 12 to 14, wherein the omnidirectional camera is proximate the LIDAR unit relative to the thermal camera.

Clause 16. The support structure of any of clauses 12 to 15, wherein the omnidirectional camera is proximate the radar unit relative to the thermal camera.

Clause 17. The support structure of any of the previous clauses, further comprising a LIDAR mount coupled to the horizontal arm of the mounting frame, wherein the LIDAR unit is coupled to the LIDAR mount.

Clause 18. The support structure of clause 17, wherein the LIDAR unit is a first LIDAR unit, wherein the LIDAR unit is a first LIDAR mount, and wherein the support structure further comprises:
  a second LIDAR mount coupled to the vertical base of the mounting frame; and
  a second LIDAR unit coupled to the LIDAR mount and extending a second distance away from the mounting frame in the first direction.

Clause 19. The support structure of any of the previous clauses, further comprising a LIDAR mount coupled to the vertical base of the mounting frame and configured to support the LIDAR unit.

Clause 20. The support structure of clause 19, wherein the LIDAR unit is coupled to the LIDAR mount and extends a second distance away from the mounting frame in the first direction.

Clause 21. The support structure of any of the previous clauses, wherein at least one of the LIDAR unit, the first LIDAR unit, or the second LIDAR unit is a scanning LIDAR.

Clause 22. The support structure of any of the previous clauses, further comprising a radar mount coupled to the horizontal arm of the mounting frame and extending away from the mounting frame in a second direction.

Clause 23. The support structure of clause 22, wherein the second direction is perpendicular to the first direction.

Clause 24. The support structure of any of clauses 22 or 23, wherein the second direction is parallel to a longitudinal axis of the vertical base of the mounting frame.

Clause 25. The support structure of clause 22, wherein the second direction is parallel to the first direction.

Clause 26. The support structure of any of the previous clauses, wherein the plurality of sensing devices further comprises a compass.

Clause 27. The support structure of clause 26, further comprising a compass mount configured to support the compass.

Clause 28. The support structure of any of the previous clauses, wherein the plurality of sensing devices further comprises a weather station.

Clause 29. The support structure of clause 28, further comprising a weather station mount configured to support the weather station.

Clause 30. The support structure of clause 29, wherein the weather station is an ultrasound weather station.

Clause 31. The support structure of any of the previous clauses, further comprising a radio communications unit configured for line-of-sight communications.

Clause 32. The support structure of clause 31, wherein the radio communications unit is a fluidmesh radio unit.

Clause 33. The support structure of any of clauses 31 or 32, wherein the radio communications unit is not enabled for non-line of sight communications.

Clause 34. The support structure of any of the previous clauses, further comprising a control unit coupled to the mounting frame.

Clause 35. The support structure of any of clauses 31 to 34, wherein the radio communications unit is part of or supported by the control unit.

Clause 36. The support structure of any of clauses 34 or 35, wherein the control unit is in communications with the plurality of sensing devices.

Clause 37. The support structure of any of clauses 34 to 36, wherein the control unit is in communications with the plurality of sensing devices.

Clause 38. The support structure of any of the previous clauses, wherein the radar unit comprises a Frequency-Modulated Continuous Wave radar sensor.

Clause 39. The support structure of any of clauses 2 to 38, wherein the one or more mounting poles are configured to secure to ground.

Clause 40. The support structure of any of clauses 2 to 39, wherein the one or more mounting poles are configured to secure to a high-elevation structure.

Clause 41. The support structure of any of the previous clauses, wherein the LIDAR unit is proximate the mounting frame relative to the radar unit.

Clause 42. The support structure of any of the previous clauses, wherein the radar unit is proximate the mounting frame relative to the LIDAR unit.

Clause 43. The support structure of any of clauses 22 to 42, wherein the radar mount is the LIDAR mount.

Clause 44. The support structure of any of the previous clauses, wherein the vertical base is coupled to the horizontal arm at a 90 degree angle.

Clause 45. The support structure of any of clauses 37 to 44, wherein the compass mount extends away from the radar mount in a third direction.

Clause 46. The support structure of clause 45, wherein the third direction is opposite the first direction.

Clause 47. A system for providing maritime navigation assistance, comprising:
  a plurality of support structures spatially distributed in fixed locations at or proximate to a maritime port, each of the plurality of support structures comprising:
  a plurality of sensors configured to collect port information corresponding to at least one of one or more nautical features of the port, one or more maritime vessels in or around the port, or one or more maritime objects in or around the port, and
  a control unit in communication with the plurality of sensors and configured to obtain the port information.

Clause 48. The system of clause 47, wherein the plurality of support structures includes a support structure of any of clauses 1 to 46.

Clause 49. The system of any of clauses 47 or 48, wherein the plurality of sensors comprises at least a LIDAR unit, a radar unit, a compass unit, a thermal camera, and an omnidirectional camera.

Clause 50. The system of any of clauses 47 to 49, wherein the plurality of support structures is spatially distributed such that a particular support structure of the plurality of support structures is within a line-of-sight of at least one other support structure of the plurality of support structures.

Clause 51. The system of any of clauses 47 to 50, wherein the plurality of support structures is spatially distributed such that each support structure of the plurality of support structures is within a line-of-sight of at least one other support structure of the plurality of support structures.

Clause 52. The system of any of clauses 47 to 51, wherein the plurality of support structures is spatially distributed such that a particular support structure of the plurality of support structures is within a line-of-sight of at least two other support structures of the plurality of support structures.

Clause 53. The system of any of clauses 47 to 52, wherein the plurality of support structures is spatially distributed such that each support structure of the plurality of support structures is within a line-of-sight of at least two other support structures of the plurality of support structures.

Clause 54. The system of any of clauses 47 to 53, wherein at least one of the plurality of support structures is positioned onshore.

Clause 55. The system of any of clauses 47 to 54, wherein each of the plurality of support structures is positioned onshore.

Clause 56. The system of any of clauses 47 to 54, wherein at least one of the plurality of support structures is positioned offshore.

Clause 57. The system of any of clauses 47 to 56, wherein the control unit of each of the plurality of support structures is further configured to generate a graphical display of at least a portion of the port based at least in part on the port information.

Clause 58. The system of clause 57, wherein the control unit of each of the plurality of support structures is further configured to:
exchange port data with at least one other support structure of the plurality of support structures; and
update the graphical display of at least a portion of the port based at least in part on the port data received from the at least one other support structure.

Clause 59. The system of any of clauses 57 or 58, wherein a user computing device can communicate with a particular support structure of the plurality of support structures to remotely access the graphical display of the particular support structure.

Clause 60. The system of any of clauses 47 to 59, further comprising a remote server in communication with the plurality of support structures, wherein the remote server is configured to generate a master graphical display based at least in part on communications with the plurality of support structures.

Clause 61. The system of any of clauses 47 to 60, wherein the one or more maritime objects comprises at least one of an iceberg, debris, a bridge, a shoreline, an on-shore vehicle, a person, or animal.

Clause 62. The system of any of clauses 47 to 61, the one or more maritime objects comprises at least one of a range, angle, velocity, or distance of corresponding to the one or more maritime vessels.

Clause 63. The system of any of clauses 47 to 62, wherein the port information comprises data relating to at least one of weather formations, safety alerts, safety bulletins, sea conditions, wind speed, wind direction, sunlight, UV Index, or accumulation, rain duration, or rain intensity.

Clause 64. The system of any of clauses 47 to 63, wherein the one or more nautical features of the port include at least one of a shoreline, a landmark, a shoal, a wreck, an obstruction, a boundary of a regulated area, a fixed aid for navigation, or a floating aid for navigation.

Clause 65. A system for generating a three dimensional map of objects in a port, the three dimensional map configured to be used for navigating one or more ships in the port, the system comprising:
a first sensor assembly fixed in location and in proximity to water of the port;
a second sensor assembly fixed in location at a first distance away from the first sensor assembly;
a first hardware processor in electronic communication with the first sensor assembly, the first hardware processor configured to maintain a first local copy of a first three dimensional map of objects in the port;
a second hardware processor in electronic communication with the second sensor assembly, the second first hardware processor configured to maintain a second local copy of a second three dimensional map of the objects in the port;
a first radio associated with the first sensor assembly, the first radio having a first range;
a second radio associated with the second sensor assembly, the second radio having a second range, wherein the first distance is less than a smaller of the first range and the second range, and
wherein the second hardware processor is configured to update the second local copy based on the first local copy.

Clause 66. The system of clause 65, wherein the first distance is at least one of about 5%, 10%, 15%, 20%, 25%, 30%, 35%, 40%, 45%, 50%, 55%, 60%, 65%, 70%, 75%, 80%, 85%, 90%, 95%, or 100% of at least one of the first range of the second range.

Clause 67. The system of any of clauses 65 or 66, further comprising a first support structure and a second support structure, wherein the first support structure includes the first sensor assembly, the first hardware processor, and the first radio, and wherein the second support structure includes the second sensor assembly, the second hardware processor, and the second radio.

Clause 68. The system of any of clauses 65 to 67, wherein the second hardware processor is configured to receive the first local copy as part of a transmission from the first radio to the second radio.

Clause 69. The system of any of clauses 65 to 68, wherein the second hardware processor is configured to receive the first local copy from a wired connection associated with the first hardware processor.

Clause 70. The system of any of clauses 65 to 69, wherein the first hardware processor is configured to generate the first three dimensional map of objects in the port.

Clause 71. The system of any of clauses 65 to 70, wherein the second hardware processor is configured to generate the second three dimensional map of objects in the port.

Clause 72. The system of any of clauses 65 to 71, wherein the first hardware processor is configured to generate the first three dimensional map of objects in the port based at least in part on data collected by one or more sensors of the first sensor assembly.

Clause 73. The system of any of clauses 65 to 72, wherein the second hardware processor is configured to generate the second three dimensional map of objects in the port based at least in part on data collected by one or more sensors of the second sensor assembly.

Clause 74. The system of any of clauses 65 to 73, wherein the first hardware processor is configured to maintain the second three dimensional map of objects in the port based at least in part on data collected by one or more sensors of the first sensor assembly or the second local copy.

Clause 75. The system of any of clauses 65 to 74, wherein at least one of the first radio of the second radio is configured for line-of-sight communications and is not enabled for non-line of sight communications.

Clause 76. The system of any of clauses 65 to 75, wherein at least one of the first support structure or the second support structure is the support structure of any of clauses 1 to 46.

Clause 77. A method for generating a three dimensional map of objects in a port, the three dimensional map configured to be used for navigating one or more ships in the port, the method comprising:
  maintaining, using a first hardware processor in electronic communication with a first sensor assembly, a first three dimensional map of objects in the port, wherein the first sensor assembly is fixed in location and is in proximity to water of the port;
  receiving a copy of a second three dimensional map of the objects in the port, wherein the second three dimensional map of the objects in the port is maintained using a second hardware processor in electronic communication with a second sensor assembly, wherein the second sensor assembly is fixed in location at a first distance away from the first sensor assembly; and
  updating the first three dimensional map based at least in part on the copy of the second three dimensional map.

Clause 78. The method of clause 77, further comprising communicating a copy of the first three dimensional map to the second hardware processor.

Clause 79. The method of clause 77, further comprising communicating a copy of the first three dimensional map to the second hardware processor via a wired connection associated with the first sensor assembly.

Clause 80. The method of clause 77, further comprising communicating a copy of the first three dimensional map to the second hardware processor via a first radio associated with the first sensor assembly, the first radio having a first range.

Clause 81. The method of clause 79, wherein the copy of the first three dimensional map is received by a second radio associated with the second sensor assembly, the second radio having a second range.

Clause 82. The method of clause 80, wherein the first distance is less than a smaller of the first range and the second range.

Clause 83. The method of any of clauses 80 or 81, wherein the first distance is at least one of about 5%, 10%, 15%, 20%, 25%, 30%, 35%, 40%, 45%, 50%, 55%, 60%, 65%, 70%, 75%, 80%, 85%, 90%, 95%, or 100% of at least one of the first range of the second range.

Clause 84. The method of any of clauses 77 to 83, wherein at least one of the first radio of the second radio is configured for line-of-sight communications.

Clause 85. The method of any of clauses 77 to 84, wherein at least one of the first radio of the second radio is a fluidmesh radio unit.

Clause 86. The method of any of clauses 77 to 85, wherein at least one of the first radio of the second radio is not enabled for non-line of sight communications.

Clause 87. The method of any of clauses 79 or 86, wherein a first support structure includes the first sensor assembly, the first hardware processor, and the first radio, and wherein a second support structure includes the second sensor assembly, the second hardware processor, and the second radio.

Clause 88. The method of any of clauses 77 to 87, further comprising generating the first three dimensional map of objects in the port.

Clause 89. The method of any of clauses 77 to 88, further comprising generating the first three dimensional map of objects in the port based at least in part on data collected by one or more sensors of the first sensor assembly.

Clause 90. The method of any of clauses 77 to 89, further comprising generating the first three dimensional map of objects in the port based at least in part on data collected by one or more sensors of the first sensor assembly and the second local copy.

Clause 91. The method of any of clauses 77 to 90, wherein at least one of the first support structure or the second support structure is the support structure of any of clauses 1 to 46.

Clause 92. A support structure configured to be placed at or proximate to a port, the support structure comprising:
  one or more mounting poles;
  a mounting frame supported by the one or more mounting poles, the mounting frame comprising a vertical base and a horizontal arm projecting away from the vertical base in the first direction;
  a first camera mount coupled to the vertical base of the mounting frame;
  an omnidirectional camera coupled to the first camera mount and extending a first distance away from the mounting frame in a first direction that is perpendicular to the vertical base of the mounting frame;
  a second camera mount coupled to the vertical base of the mounting frame;
  a thermal camera coupled to the second camera mount and oriented in the first direction;
  a LIDAR mount coupled to the horizontal arm of the mounting frame;
  a LIDAR unit coupled to the LIDAR mount;
  a radar mount coupled to the horizontal arm of the mounting frame and extending away from the mounting frame in a second direction that is perpendicular to the first direction and parallel to the vertical base of the mounting frame; and
  a radar unit coupled to the radar mount.

Clause 93. The support structure of clause 95, further comprising any of the aspect or features of the support structure of any of clauses 1 to 46 and/or the system of any of clauses 94-115.

Clause 94. A system for generating a three dimensional map of objects in a port, the three dimensional map configured to be used for navigating one or more ships in the port, the system comprising:
  a first LIDAR unit having a first range;
  a second LIDAR unit having a second range, wherein the first range is substantially larger than the second range; and
  a hardware processor configured to generate a three dimensional map based on first data received from the first LIDAR unit and second data received from second LIDAR unit.

Clause 95. The system of clause 94, further comprising a mounting frame, where the first LIDAR unit is coupled to an upper portion of the mounting frame and the second LIDAR unit is coupled to a lower portion of the mounting frame.

Clause 96. The system of any of clauses 94 or 95, wherein the first LIDAR is positioned vertically above the second LIDAR.

Clause 97. The system of any of clauses 94 to 96, wherein the first LIDAR is positioned vertically above the second LIDAR.

Clause 98. The system of any of clauses 94 to 87, wherein the second LIDAR is coupled to the mounting frame via a LIDAR mount that extends away from the mounting frame in a first direction such that the second LIDAR is located a first distance away from the mounting frame.

Clause 99. The system of any of clauses 94 to 98, wherein the second LIDAR is configured to rotate around a first axis.

Clause 100. The system of clause 99, further comprising an apparatus configured to rotate the second LIDAR around a second axis that is perpendicular to the first axis.

Clause 101. The system of any of clauses 94 to 100, wherein the second LIDAR is concurrently rotated along two axes.

Clause 102. The system of clause 101, wherein the two axes are orthogonal.

Clause 103. The system of clause 101, wherein the two axes are perpendicular.

Clause 104. The system of any of clauses 94 to 103, wherein the second LIDAR is a spherically scanning rotated LIDAR.

Clause 105. The system of any of clauses 94 to 104, wherein the first LIDAR is a scanning LIDAR.

Clause 106. The system of any of clauses 94 to 105, wherein at least one of the first LIDAR or the second LIDAR is a panoramic LIDAR.

Clause 107. The system of any of clauses 94 to 106, wherein the second range is about 120 meters.

Clause 108. The system of any of clauses 94 to 107, wherein the first range is about 1000 meters.

Clause 109. The system of any of clauses 94 to 108, wherein the first range is at least two times larger than the second range.

Clause 110. The system of any of clauses 94 to 109, wherein the first range is at least 3 times larger than the second range.

Clause 111. The system of any of clauses 94 to 110, wherein the first range is at least 4 times larger than the second range.

Clause 112. The system of any of clauses 94 to 111, wherein the first range is at least 5 times larger than the second range.

Clause 113. The system of any of clauses 94 to 112, wherein the first range is at least 10 times larger than the second range.

Clause 114. The system of any of clauses 94 to 113, wherein the first range corresponds to a conical or spherical boundary of an area.

Clause 115. The system of any of clauses 94 to 114, wherein a scanned area of the first LIDAR at least partially overlaps with a scanned area of the second LIDAR.

Clause 116: The support structure of any of the preceding claims, wherein the support structure comprises the system of any of clauses 94-115.

Terminology

The term "and/or" herein has its broadest least limiting meaning which is the disclosure includes A alone, B alone, both A and B together, or A or B alternatively, but does not require both A and B or require one of A or one of B. As used herein, the phrase "at least one of" A, B, "and" C should be construed to mean a logical A or B or C, using a non-exclusive logical or.

The following description is merely illustrative in nature and is in no way intended to limit the disclosure, its application, or uses. For purposes of clarity, the same reference numbers will be used in the drawings to identify similar elements. It should be understood that steps within a method may be executed in different order without altering the principles of the present disclosure.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes illustrated or disclosed may differ from those shown in the figures. Depending on the embodiment, certain of the steps described above may be removed, others may be added. For example, the actual steps or order of steps taken in the disclosed processes may differ from those shown in the figures. Depending on the embodiment, certain of the steps described above may be removed, others may be added. For instance, the various components illustrated in the figures may be implemented as software or firmware on a processor, controller, ASIC, FPGA, or dedicated hardware. Hardware components, such as processors, ASICs, FPGAs, and the like, can include logic circuitry. Furthermore, the features and attributes of the specific embodiments disclosed above may be combined in different ways to form additional embodiments, all of which fall within the scope of the present disclosure.

User interface screens illustrated and described herein can include additional or alternative components. These components can include menus, lists, buttons, text boxes, labels, radio buttons, scroll bars, sliders, checkboxes, combo boxes, status bars, dialog boxes, windows, and the like. User interface screens can include additional or alternative information. Components can be arranged, grouped, displayed in any suitable order.

Although the present disclosure includes certain embodiments, examples and applications, it will be understood by those skilled in the art that the present disclosure extends beyond the specifically disclosed embodiments to other alternative embodiments or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A support structure configured to be placed at or proximate to a port, the support structure comprising:
    one or more mounting poles;
    a mounting frame supported by the one or more mounting poles, the mounting frame comprising a vertical base and a horizontal arm projecting away from the vertical base in a first direction;
    a first camera mount coupled to the vertical base of the mounting frame;
    an omnidirectional camera coupled to the first camera mount and extending a first distance away from the mounting frame in a first direction that is perpendicular to the vertical base of the mounting frame;
    a second camera mount coupled to the vertical base of the mounting frame;
    a thermal camera coupled to the second camera mount and oriented in the first direction;
    a LIDAR mount coupled to the horizontal arm of the mounting frame;
    a LIDAR unit coupled to the LIDAR mount;
    a radar mount coupled to the horizontal arm of the mounting frame and extending away from the mounting frame in a second direction that is perpendicular to the first direction and parallel to the vertical base of the mounting frame; and
    a radar unit coupled to the radar mount.

2. The support structure of claim 1, further comprising a compass and a compass mount configured to support the compass.

3. The support structure of claim 1, further comprising a weather station and a weather station mount configured to support the weather station.

4. The support structure of claim 1, further comprising a radio communications unit configured for line-of-sight communications with other support structures.

5. The support structure of claim 4, wherein the radio communications unit is not enabled for non-line of sight communications.

6. The support structure of claim 1, wherein the thermal camera is proximate the LIDAR unit and the radar unit relative to the omnidirectional camera.

7. The support structure of claim 1, further comprising a hardware processor configured to generate a three dimensional map based on data received from the omnidirectional camera, the thermal camera, the LIDAR unit, and the radar unit.

8. The support structure of claim 1, wherein the LIDAR unit is a first LIDAR unit, wherein the LIDAR unit is a first LIDAR mount, and wherein the support structure further comprises:
    a second LIDAR mount coupled to the vertical base of the mounting frame; and
    a second LIDAR unit coupled to the LIDAR mount and extending a second distance away from the mounting frame in the first direction.

9. The support structure of claim 8, wherein a scanned area of the first LIDAR unit at least partially overlaps with a scanned area of the second LIDAR unit.

10. The support structure of claim 9, wherein the first LIDAR unit has a first range and the second LIDAR unit has a second range, wherein the first range is substantially larger than the second range.

11. The support structure of claim 9, wherein the first LIDAR unit is coupled to an upper portion of the mounting frame and the second LIDAR unit is coupled to a lower portion of the mounting frame such that the first LIDAR unit is positioned vertically higher than the second LIDAR unit.

12. The support structure of claim 9, wherein the second LIDAR unit is a spherically scanning rotated LIDAR that concurrently rotates along two orthogonal axes.

13. A system for providing maritime navigation assistance, comprising:
    a plurality of support structures spatially distributed in fixed locations at or proximate to a maritime port, each of the plurality of support structures comprising:
        one or more mounting poles;
        a mounting frame supported by the one or more mounting poles, the mounting frame comprising a vertical base and a horizontal arm projecting away from the vertical base in a first direction;

a first camera mount coupled to the vertical base of the mounting frame;

an omnidirectional camera coupled to the first camera mount and extending a first distance away from the mounting frame in the first direction that is perpendicular to the vertical base of the mounting frame;

a second camera mount coupled to the vertical base of the mounting frame;

a thermal camera coupled to the second camera mount and oriented in the first direction;

a LIDAR mount coupled to the horizontal arm of the mounting frame;

a LIDAR unit coupled to the LIDAR mount;

a radar mount coupled to the horizontal arm of the mounting frame and extending away from the mounting frame in a second direction that is perpendicular to the first direction and parallel to the vertical base of the mounting frame; and a radar unit coupled to the radar mount.

14. The system of claim 13, wherein each of the plurality of support structures further comprises a hardware processor configured to generate a three dimensional map based on data received from the omnidirectional camera, the thermal camera, the LIDAR unit, and the radar unit.

15. The system of claim 13, wherein each of the plurality of support structures further comprises a compass and a compass mount configured to support the compass.

16. The system of claim 13, wherein each of the plurality of support structures further comprises a weather station and a weather station mount configured to support the weather station.

17. The system of claim 13, wherein each of the plurality of support structures further comprises a radio communications unit configured for line-of-sight communications with at least one other support structure of the plurality of support structures.

18. The system of claim 13, wherein the LIDAR unit is a first LIDAR unit, wherein the LIDAR unit is a first LIDAR mount, and each of the plurality of support structures further comprises:

a second LIDAR mount coupled to the vertical base of the mounting frame; and a second LIDAR unit coupled to the LIDAR mount and extending a second distance away from the mounting frame in the first direction.

19. The system of claim 18, wherein the first LIDAR unit has a first range and the second LIDAR unit has a second range, wherein the first range is substantially larger than the second range.

20. The system of claim 18, wherein the second LIDAR unit is a spherically scanning rotated LIDAR that concurrently rotates along two orthogonal axes, and wherein a scanned area of the first LIDAR unit at least partially overlaps with a scanned area of the second LIDAR unit.

* * * * *